US011441356B2

(12) United States Patent
Maxfield et al.

(10) Patent No.: US 11,441,356 B2
(45) Date of Patent: Sep. 13, 2022

(54) LADDERS, TOP CAP FOR LADDERS AND TRAYS FOR LADDERS

(71) Applicant: Wing Enterprises, Incorporated, Springville, UT (US)

(72) Inventors: Bradley Scott Maxfield, Spanish Fork, UT (US); N. Ryan Moss, Mapleton, UT (US); Brian B. Russell, Saratoga Springs, UT (US); Benjamin Lynn Cook, Provo, UT (US); Travis Mittanck, Springville, UT (US); Steve Miner, Springville, UT (US)

( * ) Notice: Subject to any disclaimer, the term of this patent is extended or adjusted under 35 U.S.C. 154(b) by 265 days.

(21) Appl. No.: 16/435,232

(22) Filed: Jun. 7, 2019

(65) Prior Publication Data

US 2019/0376343 A1 Dec. 12, 2019

Related U.S. Application Data

(60) Provisional application No. 62/834,076, filed on Apr. 15, 2019, provisional application No. 62/732,997,
(Continued)

(51) Int. Cl.
*E06C 7/48* (2006.01)
*E06C 1/32* (2006.01)
(Continued)

(52) U.S. Cl.
CPC .................. *E06C 7/48* (2013.01); *E06C 1/32* (2013.01); *E06C 7/14* (2013.01); *E06C 7/182* (2013.01);
(Continued)

(58) Field of Classification Search
CPC ..... E06C 1/32; E06C 7/14; E06C 7/42; E06C 7/48; E06C 7/482; E06C 1/182
See application file for complete search history.

(56) References Cited

U.S. PATENT DOCUMENTS 507,784 A * 10/1893 CongDon
1,024,380 A * 4/1912 Vierheller ................ E06C 1/32
182/22
(Continued)

FOREIGN PATENT DOCUMENTS

CA 2881525 A1 * 9/2015 ............ E06C 1/393
CN 206636475 U 11/2017
(Continued)

OTHER PUBLICATIONS

International Search Report and Written Opinion dated Nov. 13, 2019 for International Application No. PCT/US2019/036172.
(Continued)

*Primary Examiner* — Colleen M Chavchavadze
(74) *Attorney, Agent, or Firm* — Dorsey & Whitney LLP

(57) ABSTRACT

Ladders and ladder components are described herein, including multipurpose and adjustable ladders. In one embodiment, a ladder includes a first assembly having rails and rungs, a second assembly having rails and rungs, and one or more hinges coupling the first and second assemblies together such that the first and second assembly may be positioned relative to one another in at least a position or state and at least a second position or state. A top cap is coupled to the rails of the first assembly, such that when the first and second assemblies are in the first position, the rails of the second assembly do not contact the top cap. When the first and second assemblies are in the second position, each rail of the second assembly is at least partially nested in one of a pair of channels formed in the top cap.

27 Claims, 64 Drawing Sheets

Related U.S. Application Data filed on Sep. 18, 2018, provisional application No. 62/682,673, filed on Jun. 8, 2018.

(51) Int. Cl.

| | |
|---|---|
| ***E06C 7/50*** | (2006.01) |
| ***E06C 7/46*** | (2006.01) |
| ***E06C 7/14*** | (2006.01) |
| ***E06C 7/18*** | (2006.01) |
| ***E06C 7/42*** | (2006.01) |
| ***F16C 11/10*** | (2006.01) |
| *E06C 1/383* | (2006.01) |

(52) U.S. Cl.

CPC .................. *E06C 7/42* (2013.01); *E06C 7/46* (2013.01); *E06C 7/50* (2013.01); *F16C 11/10* (2013.01); *E06C 1/383* (2013.01); *E06C 7/482* (2013.01)

(56) References Cited

U.S. PATENT DOCUMENTS

| | | | | |
|---|---|---|---|---|
| 2,316,939 | A | 4/1943 | De Luca | |
| 2,639,853 | A * | 5/1953 | Pierce | E06C 1/393 182/22 |
| 2,899,008 | A * | 8/1959 | Larson | E06C 1/32 182/25 |
| 2,982,373 | A | 5/1961 | Henry | |
| 4,155,422 | A | 5/1979 | Larson et al. | |
| 4,182,431 | A | 1/1980 | Wing et al. | |
| 4,210,224 | A | 7/1980 | Kummerlin et al. | |
| 4,376,470 | A | 3/1983 | Ashton | |
| 4,407,045 | A | 10/1983 | Boothe | |
| 4,415,062 | A | 11/1983 | Shaw | |
| 4,560,030 | A | 12/1985 | Mucelli | |
| 4,566,150 | A | 1/1986 | Boothe | |
| 4,593,790 | A * | 6/1986 | Brewer | E06C 7/48 182/214 |
| 4,666,327 | A | 5/1987 | Su | |
| 4,666,328 | A | 5/1987 | Ryu | |
| 4,697,305 | A | 10/1987 | Boothe | |
| D310,884 | S | 9/1990 | Patton et al. | |
| 5,062,179 | A | 11/1991 | Huang | |
| 5,228,511 | A | 7/1993 | Boquel et al. | |
| D340,773 | S | 10/1993 | Bartnicki et al. | |
| 5,511,285 | A | 4/1996 | Bush et al. | |
| 5,573,081 | A | 11/1996 | Bartnicki et al. | |
| D388,883 | S | 1/1998 | Thivierge et al. | |
| 5,850,894 | A | 12/1998 | Busenhart | |
| 5,937,968 | A | 8/1999 | Gibson et al. | |
| 6,220,389 | B1 | 4/2001 | Krause | |
| 6,343,406 | B1 | 2/2002 | Yeh | |
| 6,443,260 | B1 * | 9/2002 | Katz | E06C 7/14 248/238 |
| 6,711,780 | B2 | 3/2004 | Lee | |
| 6,866,117 | B2 | 3/2005 | Moss | |
| 7,032,711 | B1 * | 4/2006 | Katz | B25H 3/06 248/238 |
| D549,356 | S | 8/2007 | Gibson | |
| D576,290 | S | 9/2008 | Meyers et al. | |
| D576,291 | S | 9/2008 | Latimer | |
| D597,685 | S | 8/2009 | Gibson et al. | |
| 7,575,097 | B2 | 8/2009 | Sheridan et al. | |
| 7,753,170 | B1 | 7/2010 | Gibson | |
| 7,886,872 | B2 | 2/2011 | Astor et al. | |
| 8,186,481 | B2 | 5/2012 | Moss et al. | |
| 8,210,313 | B2 | 7/2012 | Astor | |
| 8,251,180 | B1 * | 8/2012 | Paige | E06C 7/48 182/214 |
| 9,016,434 | B2 | 4/2015 | Moss et al. | |
| D764,073 | S * | 8/2016 | Wang | D25/65 |
| D766,461 | S | 9/2016 | Peterson et al. | |
| D766,462 | S | 9/2016 | Peterson et al. | |
| D766,463 | S | 9/2016 | Peterson et al. | |
| D819,834 | S | 6/2018 | Fiedeler | |
| 10,030,448 | B2 * | 7/2018 | Miller | E06C 7/482 |
| 10,087,682 | B2 | 10/2018 | Pfeifer | |
| 10,138,680 | B2 * | 11/2018 | Williams | E06C 7/14 |
| D835,807 | S | 12/2018 | Lentine et al. | |
| D840,055 | S | 2/2019 | Skubic et al. | |
| 10,487,576 | B2 | 11/2019 | Ballard et al. | |
| 10,487,578 | B2 | 11/2019 | Smith et al. | |
| 10,590,703 | B2 * | 3/2020 | Parker | E06C 1/18 |
| 10,597,941 | B2 | 3/2020 | Moss et al. | |
| 10,612,305 | B2 | 4/2020 | Mora et al. | |
| D885,607 | S | 5/2020 | Miner et al. | |
| 10,648,234 | B2 | 5/2020 | Skubic et al. | |
| 10,801,261 | B2 | 10/2020 | Peterson et al. | |
| 10,871,031 | B1 | 12/2020 | Moss et al. | |
| D911,555 | S | 2/2021 | Maxfield et al. | |
| D912,847 | S | 3/2021 | Maxfield et al. | |
| D912,848 | S | 3/2021 | Maxfield et al. | |
| D920,541 | S | 5/2021 | Mittanck et al. | |
| D921,224 | S | 6/2021 | Mittanck et al. | |
| D935,054 | S | 11/2021 | Maxfield et al. | |
| D943,772 | S | 2/2022 | Maxfield et al. | |
| D944,417 | S | 2/2022 | B., et al. | |
| 11,274,494 | B2 | 3/2022 | Leng | |
| 2003/0188923 | A1 | 10/2003 | Moss | |
| 2005/0173194 | A1 | 8/2005 | Pate et al. | |
| 2006/0060423 | A1 | 3/2006 | Astor | |
| 2008/0107529 | A1 | 5/2008 | Friedman | |
| 2010/0200331 | A1 | 8/2010 | Hager | |
| 2011/0024232 | A1 | 2/2011 | Leng | |
| 2012/0097481 | A1 | 4/2012 | Schienke et al. | |
| 2012/0211305 | A1 | 8/2012 | Moss et al. | |
| 2016/0076304 | A1 | 3/2016 | Smith et al. | |
| 2016/0348434 | A1 | 12/2016 | Williams et al. | |
| 2017/0130530 | A1 * | 5/2017 | Lawler | E06C 7/14 |
| 2017/0152710 | A1 | 6/2017 | Miller | |
| 2017/0356244 | A1 | 12/2017 | Peterson et al. | |
| 2018/0002982 | A1 * | 1/2018 | Dressel | E06C 9/06 |
| 2018/0171714 | A1 | 6/2018 | Dings | |
| 2018/0187489 | A1 | 7/2018 | Parker et al. | |
| 2018/0230746 | A1 | 8/2018 | Maxfield et al. | |
| 2018/0258698 | A1 * | 9/2018 | Minock | E06C 7/48 |
| 2018/0298691 | A1 | 10/2018 | Cook et al. | |
| 2018/0347278 | A1 | 12/2018 | Russell et al. | |
| 2019/0376341 | A1 | 12/2019 | Maxfield et al. | |
| 2019/0376343 | A1 | 12/2019 | Maxfield et al. | |
| 2020/0048962 | A1 * | 2/2020 | Moreno Moncada | E06C 1/393 |
| 2021/0246725 | A1 | 8/2021 | Wernberg et al. | |

FOREIGN PATENT DOCUMENTS

| | | | |
|---|---|---|---|
| JP | S5342040 | U | 4/1978 |
| JP | S62173500 | U | 11/1987 |
| KR | 200146389 | Y1 | 6/1999 |
| WO | 9429561 | A2 | 12/1994 |

OTHER PUBLICATIONS

Design U.S. Appl. No. 29/667,356, filed Oct. 19, 2018.
Design U.S. Appl. No. 29/667,352, filed Oct. 19, 2018.
Design U.S. Appl. No. 29/667,354, filed Oct. 19, 2018.
Design U.S. Appl. No. 29/667,357, filed Oct. 19, 2018.
Design U.S. Appl. No. 29/679,726, filed Feb. 8, 2019.
Design U.S. Appl. No. 29/679,733, filed Feb. 8, 2019.
U.S. Appl. No. 62/514,348, filed Jun. 2, 2017.
U.S. Appl. No. 62/732,997, filed Sep. 18, 2018.
International Search Report and Written Opinion for International Application No. PCT/US2020/015074 dated Apr. 1, 2020.

* cited by examiner

LADDERS, TOP CAP FOR LADDERS AND TRAYS FOR LADDERS

CROSS-REFERENCE TO RELATED APPLICATIONS

The present application claims the benefit of U.S. Provisional Patent Application No. 62/682,673, filed Jun. 8, 2018, U.S. Provisional Patent Application No. 62/732,997, filed Sep. 18, 2018, and U.S. Provisional Patent Application No. 62,834,076, filed Apr. 15, 2019, the disclosures of which are incorporated by reference herein in their entireties.

This application is also related to U.S. patent application Ser. No. 29/679,726, filed on Feb. 8, 2019, now U.S. Design Pat. No. D911,555, U.S. patent application Ser. No. 29/679,733, filed Feb. 8, 2019, now U.S. Design Pat. No. D912,848, U.S. patent application Ser. No. 29/667,352, filed Oct. 19, 2018, now U.S. Design Pat. No. D935,054, U.S. patent application Ser. No. 29/667,354, filed Oct. 19, 2018, now U.S. Design Pat. No. D943,772, U.S. patent application Ser. No. 29/667,356, filed Oct. 19, 2018, now U.S. Design Pat. No. D912,847, and U.S. patent application Ser. No. 29/667,357, filed Oct. 19, 2018, now U.S. Design Pat. No. D885,607, the disclosures of which are incorporated by reference herein in their entireties.

BACKGROUND

The present invention relates generally to ladders including various embodiments of combination ladders, as well as various ladder components. Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders, sometimes referred to as A-frame ladders, are self-supporting ladders, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Ladders such as combination ladders are highly utilized by various tradesman as well as homeowners. Such ladders are "self-supporting" in one configuration (e.g., in step ladder configuration) such that they do not need to have the upper end of the ladder to be positioned against a supporting structure (e.g., a wall or the edge of a roof). Rather, when in such a configuration, combination ladders conventionally utilize four feet, spaced from one another, to provide a stable structure and to support the ladder and a user when placed on, for example, a floor or the ground. This enables a user of the ladder to gain access to elevated areas even though the accessed area may be, for example, in the middle of a room, away from walls or other potential supporting structures that are conventionally required when using a straight ladder or an extension ladder.

Combination ladders may be placed in other configurations, including one wherein the ladder substantially extends in a single plane, such as a straight ladder or an extension ladder, providing access to increased height (as compared to when it is in the step ladder configuration) but typically requiring some elevated structure to support the ladder (e.g., a wall or the edge of a roof).

For these reasons and others, combination ladders have become a popular form of ladders and comprise a substantial segment of the ladder market. However, there are always areas of potential improvement.

SUMMARY

The present disclosure sets forth various embodiments of ladders and ladder components including adjustable, multipurpose ladders.

In accordance with one embodiment, a ladder is provided that includes a first assembly and a second assembly. The first assembly comprises a first pair of spaced apart rails and a plurality of rungs extending between and coupled to the first pair of spaced apart rails. The second assembly comprises a second pair of spaced apart rails and at least one rung extending between and coupled to the second pair of spaced apart rails. The ladder further includes a pair of hinges pivotally coupling the first pair of spaced apart rails with the second pair of spaced apart rails such that the first pair of rails are selectively positionable relative to the second pair of rails in at least a first, a second and a third position. A top cap is coupled to the first pair of spaced apart rails, wherein the first and second pair of spaced apart rails are in the first position, the second pair of rails do not contact the top cap, and wherein, when the first and second pair of spaced apart rails are in the second position, each rail of the second pair of spaced apart rails is at least partially nested in one of a pair of channels formed in the top cap.

In one embodiment, when the first and second pair of spaced apart rails are in the third position, the second pair of rails do not contact the top cap.

In one embodiment, the ladder further comprises a selectively positionable rail coupled with at least one of the first assembly, the second assembly and the top cap.

In one embodiment, the selectively positionable rail includes a pair of side members and at least one cross member coupled between the pair of side members.

In one embodiment, the ladder further comprises an accessory coupled with the second pair of spaced apart rails, the accessory including a first pair of engagement surfaces forming an interior 90 degree angle, and a second pair of engagement surfaces forming an exterior 90 degree angle.

In one embodiment, the ladder further comprises a pair of feet, each foot of the pair of feet coupled to an associated rail of the second pair of spaced apart rails, wherein the accessory is coupled with the second pair of rails at a location between the pair of feet and the at least one rung.

In one embodiment, the first pair of engagement surfaces includes a first engagement surface and a second engagement surface, and wherein a notch is formed between the first engagement surface and the second engagement surface, the notch including a rear wall, a first side wall and a second side wall, wherein the first side wall and the second side wall are spaced from each other a distance of approximately 1.5 inches or greater.

In one embodiment the accessory is removably coupled with the second pair of rails.

In one embodiment, each hinge of the pair of hinges includes a first lock ring, a second lock ring selectively rotatable relative to the first lock ring about an axis, a geared member having at least one cog on a periphery thereof and disposed axially between the first lock ring and the second lock ring, the geared member having an axially protruding shaft including a ramped portion, an annular recess and an abutment shoulder between the ramped portion and the annular recess, and an annular coiled spring disposed about a portion of the shaft and configured to contract within the annular recess upon displacement of the geared member towards the second lock ring.

In one embodiment, the first pair of spaced apart rails exhibits a first width at a first height of the first assembly and a second width at a second height of the first assembly, the second width being greater than the first width.

In one embodiment, the second pair of spaced apart rails are substantially parallel to each other.

In one embodiment, the second assembly exhibits a width of approximately 14.5 inches or less.

In one embodiment, the top cap includes a first body portion and a second body portion selectively displaceable relative to the first body portion.

In one embodiment, the ladder further comprises a cushion disposed on a surface of the second body portion.

In another embodiment of the present disclosure, a ladder is provided that comprises a first assembly and a second assembly. The first assembly includes a first pair of spaced apart rails, a plurality of rungs extending between and coupled to the first pair of spaced apart rails, and a first pair of feet coupled with the pair of spaced apart rails. The second assembly includes a second pair of spaced apart rails extending substantially parallel to one another, at least one rung extending between and coupled to the second pair of spaced apart rails, and a second pair of feet coupled with the second pair of spaced apart rails. The ladder further includes a pair of hinges pivotally coupling the first pair of spaced apart rails with the second pair of spaced apart rails and a top cap coupled to the first pair of spaced apart rails. The first assembly exhibits a first width at a location adjacent the pair of hinges and a second width adjacent the first pair of feet, the second width being greater than the first width.

In one embodiment, the second assembly exhibits an overall width of approximately 14.5 inches or less.

In one embodiment, each rail of the first pair of spaced apart rails includes a first section and a second section, the first section being substantially linear and being coupled with a hinge of the pair of hinges, the second section being flared and extending between the first section and a foot of the pair of feet.

In one embodiment the second section is arcuate.

In one embodiment the first pair of space apart rails are formed of a material comprising fiberglass.

In one embodiment, the first sections of the first pair of spaced apart rails are substantially parallel with each other.

In one embodiment, the first pair of rails are selectively positionable relative to the second pair of rails in at least a first, a second and a third position.

In one embodiment, the first and second pair of spaced apart rails are in the first position, the second pair of rails do not contact the top cap, and wherein, when the first and second pair of spaced apart rails are in the second position, each rail of the second pair of spaced apart rails are at least partially nested in one of a pair of channels formed in the top cap.

In one embodiment, the top cap includes a first body portion and a second body portion selectively displaceable relative to the first body portion.

In one embodiment, the second body portion includes a first, substantially flat engagement surface, and a pair of protruding members extending away from the substantially flat engagement surface.

In one embodiment, the pair of protruding members includes a first protruding member having a first angled surface and a second angled surface, a second protruding member having a third angled surface and a fourth angled surface, wherein the first angled surface and the third angled surface form an interior 90 degree angle relative to each other and wherein the second angled surface and the fourth angles surface form an exterior angle relative to each other.

In one embodiment, the ladder further comprises a channel disposed between the first protruding member and the second protruding member.

In one embodiment, the channel exhibits a width of approximately 1.5 to approximately 1.625 inches.

In a further embodiment of the present disclosure, a ladder is provided that includes a first assembly and a second assembly. The first assembly includes a first pair of spaced apart rails and a plurality of rungs extending between and coupled to the first pair of spaced apart rails. The second assembly includes a second pair of spaced apart rails and at least one rung extending between and coupled to the second pair of spaced apart rails. The ladder further includes a pair of hinges pivotally coupling the first pair of spaced apart rails with the second pair of spaced apart rails such that the first pair of rails are selectively positionable relative to the second pair of rails in at least a first a first position and a second position, wherein the second pair of rails extend from the first pair of rails at an acute angle when in the first position, and wherein the second pair of rails extend from the first pair of rails in a generally parallel direction when in the second position. The ladder additionally includes pair of feet, each foot of the pair of feet being coupled to a lower portion of an associated rail of the second pair of rails. Each foot includes a body having a first side wall, a second side wall, a front wall and a rear wall defining an opening that engages the associated rail, a first surface-engaging portion opposite the opening, and a second surface-engaging portion extending along the rear wall.

In one embodiment, the second surface-engaging portion forms an acute projected angle with a rear surface of its associated rail.

In one embodiment, the acute projected angle is between approximately 14 degrees and approximately 16 degrees.

In one embodiment, the acute projected angle is approximately 15 degrees.

In one embodiment, the ladder further comprises a first cushioned portion between the rear wall and the second surface-engaging portion.

In one embodiment, the first wall, the second wall, the front wall and the rear wall are formed of a first material, and wherein the first surface-engaging portion, the second surface-engaging portion and the first cushioned portion are formed of a second material, the second material being different from the first material.

In one embodiment, the second material is overmolded onto the first material.

In one embodiment, the ladder further comprises a third surface-engaging portion positioned adjacent the first side wall.

In one embodiment, the third surface-engaging portion is positioned at an angle of approximately 45 degrees relative to the second surface-engaging portion.

In one embodiment, the ladder further comprises a fourth surface-engaging portion positioned adjacent the second side wall.

In one embodiment, the fourth surface-engaging portion is positioned at an angle of approximately 45 degrees relative to the second surface-engaging portion.

In one embodiment, the first surface-engaging portion comprises a first set of ridges and the second surface-engaging portion comprises a second set of ridges.

In one embodiment, the first set of ridges extend lengthwise in a direction that is substantially perpendicular to the first sidewall.

In one embodiment, the second set of ridges extend lengthwise in a direction that is substantially perpendicular to the direction of the first set of ridges.

In one embodiment, the ladder further comprises a top cap coupled to the first pair of spaced apart rails, wherein the first and second pair of spaced apart rails are in the first position, the second pair of rails do not contact the top cap, and wherein, when the first and second pair of spaced apart rails are in the second position, each rail of the second pair of spaced apart rails are at least partially nested in one channel of a pair of channels formed in the top cap.

In accordance with yet another embodiment of the present disclosure, a ladder foot is provided that comprises a body having a first side wall, a second side wall, a front wall and a rear wall defining an opening that engages the associated rail, a first surface-engaging portion opposite the opening and a second surface-engaging portion extending along the rear wall.

In one embodiment, the second surface-engaging portion forms an acute angle with a surface the rear wall.

In one embodiment the acute angle is between approximately 14 degrees and approximately 16 degrees.

In one embodiment the acute angle is approximately 15 degrees.

In one embodiment, the ladder foot further comprises a third surface-engaging portion adjacent the first side wall.

In one embodiment, the third surface-engaging portion forms an angle of approximately 45 degrees with the second surface-engaging portion.

In one embodiment, the ladder foot further comprises a first cushioned portion between the rear wall and the second surface-engaging portion and a second cushion portion between the first side wall and the third surface-engaging portion.

In one embodiment, the first wall, the second wall, the front wall and the rear wall are formed of a first material, and wherein the first surface-engaging portion, the second surface-engaging portion, the third surface-engaging portion, the first cushioned portion and the second cushioned portion are formed of a second material, the second material being different from the first material.

In one embodiment, the second material is overmolded onto the first material.

In yet a further embodiment of the present disclosure, another ladder is provided that comprises a first assembly and second assembly. The first assembly comprises a first pair of spaced apart rails and a plurality of rungs extending between and coupled to the first pair of spaced apart rails, The second assembly comprises a second pair of spaced apart rails and at least one rung extending between and coupled to the second pair of spaced apart rails. The ladder further includes a pair of hinges pivotally coupling the first pair of spaced apart rails with the second pair of spaced apart rails. Each hinge of the pair of hinges comprises a first lock ring, a second lock ring selectively rotatable relative to the first lock ring about an axis, a geared member having at least one cog on a periphery thereof and disposed axially between the first lock ring and the second lock ring, the geared member having an axially protruding shaft including a ramped portion, an annular recess and an abutment shoulder between the ramped portion and the annular recess, and an annular coiled spring disposed about a portion of the shaft and configured to contract within the annular recess upon displacement of the geared member towards the second lock ring.

In one embodiment, the first lock ring further includes a plurality of radially inwardly extending protrusions, each protrusion including a first inclined surface and a second inclined surface, wherein upon relative rotation of the first lock ring and the second lock ring, at least one of the first and second inclined surfaces engage the at least one cog to displace the geared member axially towards the first lock ring.

In one embodiment, the pair of hinges are configured to selectively lock the second assembly relative the first assembly in a first position and at least a second position.

In one embodiment, the second pair of rails extend from the first pair of rails at an acute angle when in the first position, and wherein the second pair of spaced rails extend from the first pair of rails in a generally parallel direction when in the second position.

In one embodiment, the pair of hinges are configured to selectively lock the second assembly relative to the first assembly in a third position, wherein the second pair of spaced apart rails are positioned adjacent to, and extend generally parallel to, the first pair of spaced apart rails.

In yet another embodiment of the present disclosure, a ladder rail and hinge assembly is provided what includes a first rail, a second rail, and a hinge assembly pivotally coupling the first rail with the second rail. The hinge assembly comprises a first lock ring, a second lock ring selectively rotatable relative to the first lock ring about an axis, a geared member having at least one cog on a periphery thereof and disposed axially between the first lock ring and the second lock ring, the geared member having an axially protruding shaft including a ramped portion, an annular recess and an abutment shoulder between the ramped portion and the annular recess, and an annular coiled spring disposed about a portion of the shaft and configured to contract within the annular recess upon displacement of the geared member towards the second lock ring.

In one embodiment, the first lock ring further includes a plurality of radially inwardly extending protrusions, each protrusion including a first inclined surface and a second inclined surface, wherein upon relative rotation of the first lock ring and the second lock ring, at least one of the first and second inclined surfaces engage the at least one cog to displace the geared member axially towards the first lock ring.

In one embodiment, the hinge assembly is configured to selectively lock the first rail relative the second rail in a first position, a second position, and at least a third position.

In another embodiment according to the present disclosure, a ladder is provided that comprises a first assembly and a second assembly. The first assembly includes a first pair of spaced apart rails and a plurality of rungs extending between and coupled to the first pair of spaced apart rails. The second assembly includes a second pair of spaced apart rails and at least one rung extending between and coupled to the second pair of spaced apart rails. The ladder further includes a pair of hinges pivotally coupling the first pair of spaced apart rails with the second pair of spaced apart rails such that the first pair of rails are selectively positionable relative to the second pair of rails in at least a first a first position and a second position, wherein the second pair of rails extend from the first pair of rails at an acute angle when in the first position, and wherein the second pair of rails extend from the first pair of rails in a generally parallel direction when in the second position. A top cap is coupled with the first pair of rails and an an accessory coupled with the second pair of rails. The accessory includes a first pair of engagement surfaces forming an interior 90 degree angle, and a second pair of engagement surfaces forming an exterior 90 degree angle.

In one embodiment, the first pair of engagement surfaces include a first engagement surface and a second engagement surface, and wherein a notch is formed between the first engagement surface and the second engagement surface, the notch including a rear wall, a first side wall and a second side wall, wherein the first side wall and the second side wall are spaced from each other a distance of approximately 1.5 inches or greater.

In one embodiment, the second pair of engagement surfaces include a third engagement surface and a fourth engagement surface, and wherein a fifth engagement surface extends between the first engagement surface and the third engagement surface and wherein the sixth engagement surface extends between the second engagement surface and the fourth engagement surface.

In one embodiment, the first pair of engagement surfaces and the second pair of engagement surfaces include grooves and ridges extending between an upper surface of the accessory and a lower surface of the accessory.

In one embodiment, the accessory is removably coupled with the second pair of rails.

In one embodiment, the accessory includes an upper surface having at least one recess formed therein.

In one embodiment, the first and second pair of spaced apart rails are in the first position, the second pair of rails do not contact the top cap, and wherein, when the first and second pair of spaced apart rails are in the second position, each rail of the second pair of spaced apart rails are at least partially nested in one of a pair of channels formed in the top cap.

In one embodiment, the top cap includes a front face, a top face, a rear face, and a pair of protruding members extending from the rear face, wherein the pair of protruding members include: a first protruding member having a first angled surface and a second angled surface, and a second protruding member having a third angled surface and a fourth angled surface, wherein the first angled surface and the third angled surface form an interior 90 degree angle relative to each other and wherein the second angled surface and the fourth angles surface form an exterior angle relative to each other.

In one embodiment, a channel is disposed between the first protruding member and the second protruding member.

In one embodiment, the second assembly further includes a pair of feet coupled with the second pair of spaced apart rails, and wherein the accessory is positioned between the pair of feet and the at least one rung.

In one embodiment, the at least one rung includes a second plurality of rungs including a rung closest to the pair of feet, and wherein accessory is positioned between the pair of feet and the rung closest to the pair of feet.

In a further embodiment according the present disclosure, an accessory for a ladder is provided. The accessory comprises a body having a first engagement surface and a second engagement surface forming an interior 90 degree angle, a third engagement surface and a fourth engagement surface forming an exterior 90 degree angle, a fifth engagement surface and a sixth engagement surface that are substantially coplanar, and a pair of notches sized, shaped and configured to engage a pair of rails of a ladder.

In one embodiment, the accessory further comprises a third notch disposed between the first and second engagement surfaces, the third notch including a rear wall, a first side wall and a second side wall, wherein the first side wall and the second side wall are spaced from each other a distance of approximately 1.5 inches or greater.

In one embodiment, the first engagement surface and the second engagement surface each are located between the third engagement surface and the fourth engagement surface.

In one embodiment, the fifth engagement surface extends between the first engagement surface and the third engagement surface and wherein the sixth engagement surface extends between the second engagement surface and the fourth engagement surface.

In one embodiment, the accessory includes an upper surface having at least one recess formed therein.

In another embodiment according the present disclosure, another ladder is provided. The ladder comprises a first assembly and second assembly. The first assembly comprises a first pair of spaced apart rails and a plurality of rungs extending between and coupled to the first pair of spaced apart rails. The second assembly comprises a second pair of spaced apart rails and at least one rung extending between and coupled to the second pair of spaced apart rails. The ladder further includes a pair of hinges pivotally coupling the first pair of spaced apart rails with the second pair of spaced apart rails such that the first pair of rails are selectively positionable relative to the second pair of rails in at least a first a first position and a second position, wherein the second pair of rails extend from the first pair of rails at an acute angle when in the first position, and wherein the second pair of rails extend from the first pair of rails in a generally parallel direction when in the second position. Additionally, the ladder includes a pair of extension members slidably coupled with the first pair of rails and a top cap coupled with the pair of extension members, wherein the top cap is displaceable between a first top cap position, wherein the top cap is immediately adjacent upper ends of the first of rails, and a second top cap position wherein the top cap is spaced apart from the upper ends of the first pair of rails.

In one embodiment, the ladder further comprises at least one locking mechanism configured to selectively lock at least one of the extension members in at least two different positions relative to its associated rail of the first pair of rails.

In one embodiment, the first top cap position and the second top cap position are spaced a distance of at least approximately 1 foot apart.

In one embodiment, an uppermost rung of the plurality of rungs exhibits a depth that is greater than a depth of the rails of the first pair of rails.

In yet another embodiment, a ladder is provided that comprises a first assembly and second assembly. The first assembly comprises a first pair of spaced apart rails and a plurality of rungs extending between and coupled to the first pair of spaced apart rails. The second assembly comprises a second pair of spaced apart rails. The ladder further includes a pair of hinges pivotally coupling the first assembly with the second assembly and a top cap. The top cap includes a first body portion coupled with the first assembly, and a second body portion pivotally coupled with the first body portion, wherein when in a first position, the second body portion presents a substantially planar surface for engagement with a vertical support structure, and wherein when in a second position, the second body presents at least one pair of angled engagement surfaces for engagement with a vertical support structure.

In one embodiment, the second body includes at least one canister.

In one embodiment, the at least one canister includes a lid hingedly coupled with a body of the canister.

In one embodiment, the top cap includes a pair of channels formed in the first body portion including first channel adjacent a first side of the second body portion and a second channel adjacent a second side of the second body portion, wherein the pair of channels are configured to receive portions of the second pair of spaced apart rails when the second pair of spaced apart rails are rotated to a position such that they extend upward beyond the top cap and are substantially parallel with the first pair of spaced apart rails.

In one embodiment, the pair of angled surfaces form a 90 degree interior angle.

In one embodiment, the pair of angled surfaces form a 90 degree exterior angle.

In one embodiment, the second body portion further includes a second pair of angled surfaces forming a 90 degree interior angle.

In one embodiment, the second body portion further includes a channel disposed between the first protruding member and the second protruding member.

In one embodiment, the channel exhibits a width of approximately 1.5 to approximately 1.625 inches.

In accordance with another embodiment of the present disclosure, a top cap is provided. The top cap comprises a first body portion configured for coupling with a pair of rails of a ladder and a second body portion pivotally coupled with the first body portion, wherein when in a first position, the second body portion presents a substantially planar surface for engagement with a vertical support structure, and wherein when in a second position, the second body presents at least one pair of angled engagement surfaces for engagement with a vertical support structure.

In one embodiment, the second body includes at least one canister and a lid hingedly coupled with a body of the canister.

In one embodiment, the top cap further includes a pair of channels formed in the first body portion including first channel adjacent a first side of the second body portion and a second channel adjacent a second side of the second body portion, wherein the pair of channels are configured to receive portions of the second pair of spaced apart rails when the second pair of spaced apart rails are rotated to a position such that they extend upward beyond the top cap and are substantially parallel with the first pair of spaced apart rails.

In one embodiment, the pair of angled surfaces form a 90 degree interior angle and wherein the top cap includes a second pair of angled surfaces forming a 90 degree exterior angle.

In one embodiment, the second body portion further includes a channel disposed between the first protruding member and the second protruding member, wherein the channel exhibits a width of approximately 1.5 to approximately 1.625 inches.

The described embodiments are not mutually exclusive of each other. Rather, various features, components or elements of one described embodiment may be used in conjunction with features, components or elements of other described embodiments.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
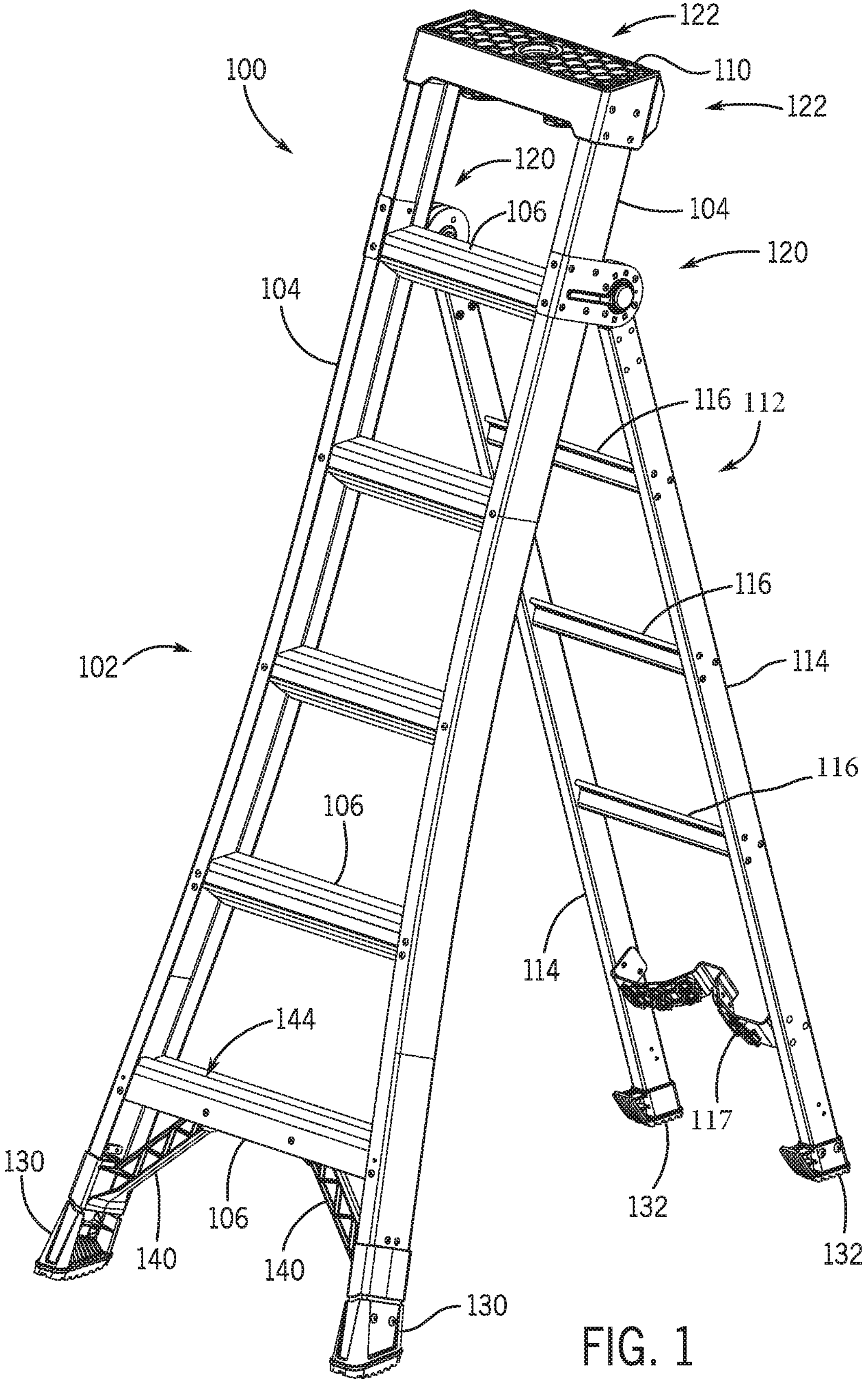
FIG. 1 is a front perspective view of a ladder in a first state according to an embodiment of the present disclosure.

Various embodiments of ladders and ladder components are described herein. The described embodiments are not mutually exclusive of each other. Rather, various features, components or elements of one described embodiment may be used in conjunction with features, components or elements of other described embodiments.

Referring to FIGS. 1-4 a ladder 100 is shown in accordance with an embodiment of the present disclosure. The ladder 100 includes a first assembly 102 having a pair of spaced apart rails 104 and a plurality of rungs 106 extending between and coupled to the rails 104. For purposes of convenience, the rungs 106 and rails 104 of the first assembly 102 may be referred to herein as "front rungs 106" or "front rails 104" respectively.

The front rungs 106 are spaced apart, substantially parallel to one another, and are configured to be substantially level when the ladder 100 is in an orientation of intended use so that the rungs 106 may be used as "steps" for a user to ascend the ladder 100 as will be appreciated by those of ordinary skill in the art. In various embodiments, the upper surface of the rungs 106 may include traction features (e.g., grooves and ridges, grip tape or other anti-slip features) to provide traction to a user while standing on the rungs 106. A top cap 110 may be coupled with the upper portions of the front rails 104 and configured to support the weight of a user in the event that a user stands on the top cap 110. The upper surface of the top cap 110 may also include traction or anti-slip features to provide traction to a user while standing thereon.

The ladder 100 also includes a second assembly 112 having a pair of spaced apart rails 114. A plurality of rungs 116 extend between and are coupled to the spaced apart rails 114. For purposes of convenience, the rungs 116 and rails 114 of the second assembly may be referred to herein as "rear rungs 116" and "rear rails 114" respectively. It is noted that the use of the terms "front" and "rear" herein is not to be considered limiting although describing relative positions of the components when the ladder 100 is in a step ladder configuration. Rather, use of "front" and "rear" is for purposes of convenience and clarity in describing various components or assemblies of the embodiments of the present disclosure.

Figure 2:
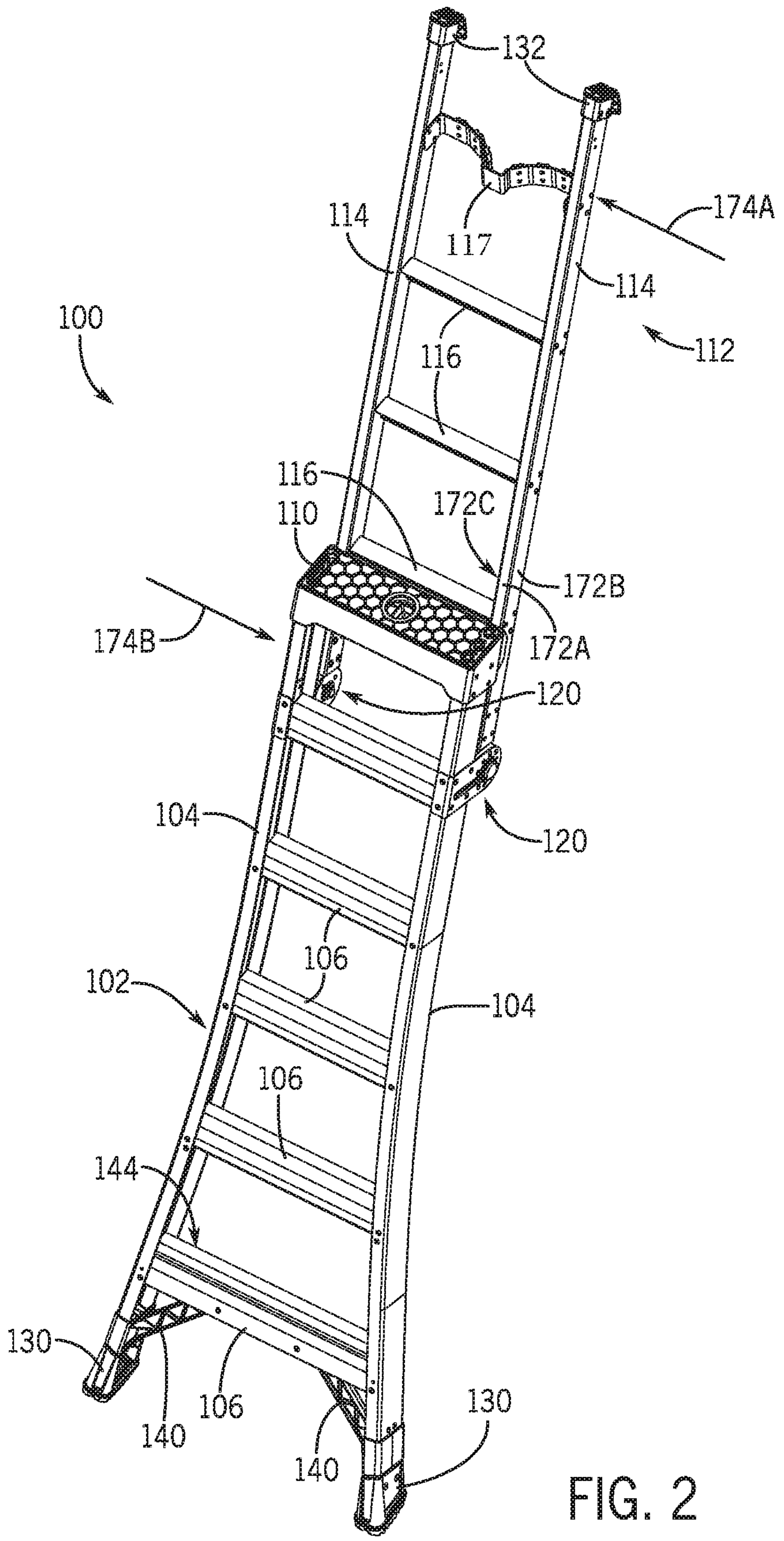
FIG. 2 is a front perspective of the ladder shown in FIG. 1 while in a second state.

The rear rungs 116 are spaced apart, substantially parallel to one another, and are configured to be substantially level when the ladder 100 is in an orientation for intended use so that the rear rungs 116 may be used as "steps" for a user to ascend the ladder 100. In various embodiments, the upper surface (considering the orientation of the ladder as viewed in FIG. 1) of the rear rungs 116 may include traction features (e.g., grooves and ridges, grip tape or other anti-slip features) to provide traction to a user while standing on the rear rungs 116. Additionally, or alternatively, in some embodiments, the rear rungs 116 may include traction features or anti-slip features formed the lower surface thereof (again, as viewed in FIG. 1). In some embodiments, the second assembly 112 may include support structure 117 which may be used, for example, to engage the wall, post, stud or vertical support when the ladder 100 is in a straight-ladder or extended state such as shown in FIG. 2. In other embodiments, the support structure 117 may be replaced with another rung or with some other structure such as discussed herein below.

The second assembly 112 is pivotally coupled with the first assembly 102 via a pair of hinge assemblies 120 (sometimes referred to as "hinges" herein for purposes of brevity). In the embodiment shown, the hinges 120 are spaced away from the top cap 110 along the length of the front rails 104 of the first assembly 102. For example, the hinges 120 may be positioned adjacent the rung 106 that is closest to the top cap 110. In one embodiment, this may be approximately 12 inches from the top of the first assembly 102. The hinges 120 are configured to selectively lock the first assembly 102 and the second assembly 112 in one or more desired positions relative to each other. Thus, for example, in FIG. 1, the first and second assemblies 102 and 112 are locked such that the rear rails 114 extend at an acute angle relative to the front rails 104, placing the ladder in a step ladder configuration.

It is noted that, in some embodiments, the ladder 100 does not include any spreader mechanisms (e.g., hinged, folding braces or other structures that extend between the first and second assemblies) that are conventionally used to accommodate the folding of the ladder as well as the "locking" of the first and second assemblies 102 and 112 relative to each other in a step ladder configuration. Instead, in various embodiments of the present disclosure, the locking of the hinges 120 maintain the desired positioning of the first and second assemblies 102 and 112 in a deployed, step ladder configuration as shown in FIG. 1.

Figure 3:
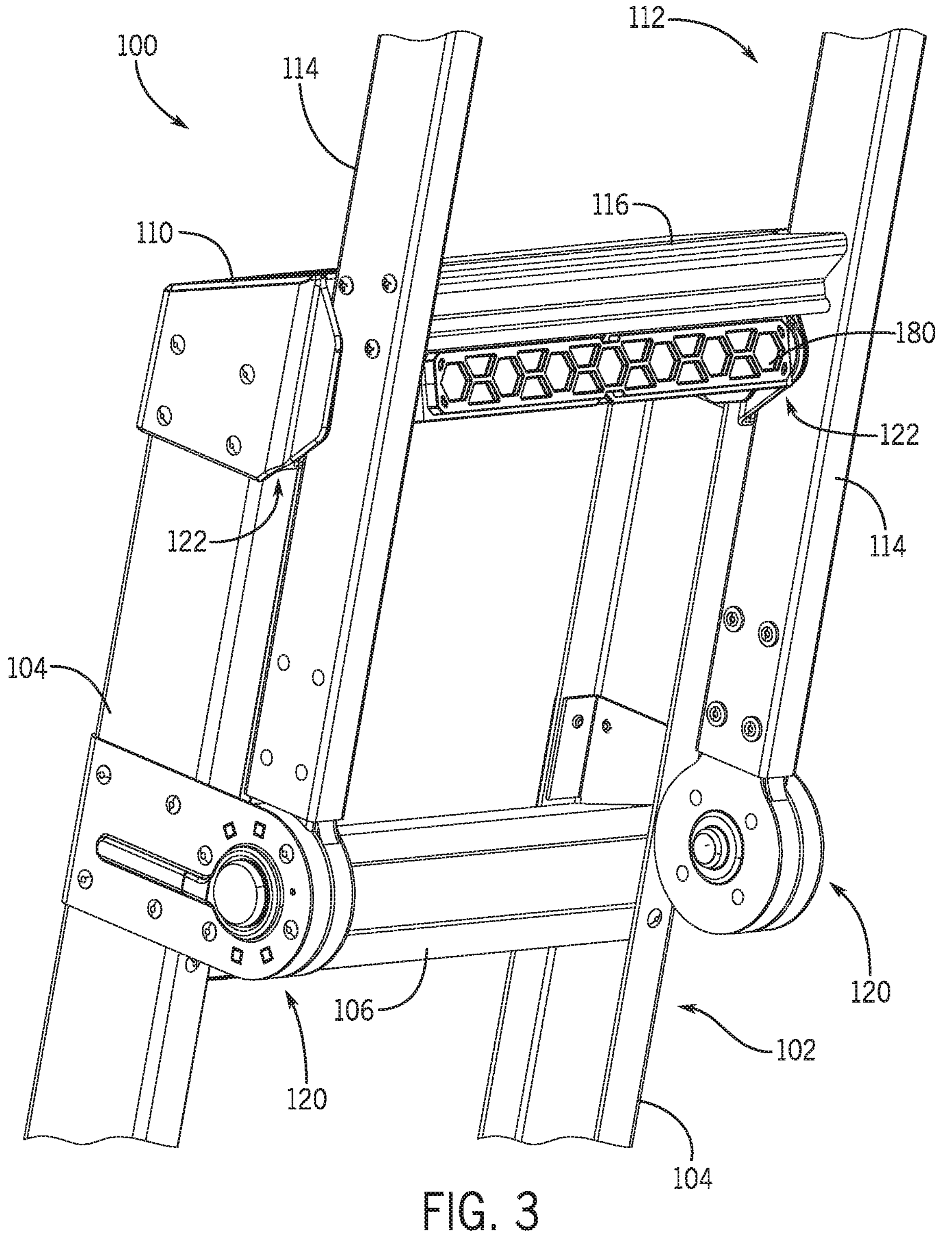
FIG. 3 is an enlarged rear perspective of the ladder shown in FIG. 2.

As seen in FIGS. 2 and 3, the hinges 120 also enable the second assembly 112 to selectively rotate relative to the first assembly 102 such that the rear rails 114 may be positioned to extend at an angle of substantially 180 degrees from the front rails 104. Stated another way, the front rails 104 and rear rails 114 extend from each other in a generally parallel manner with a significant portion of the second assembly 112 extending upwards and beyond the top cap 110. The hinges 120 may also be configured to lock the first and second assemblies 102 and 112 in this relative position, which may be considered a straight ladder configuration, providing a user with the ability to reach extended heights (beyond that of the step ladder configuration) when the ladder 100 is leaned against an appropriate support surface (e.g., a wall or the edge of a roof).

When the ladder 100 is in a straight ladder configuration, such as shown in FIGS. 2 and 3, portions of the rails 114 of the second assembly 112 are received by, and abut against one or more surfaces of channels 122 that are formed in the rear face of the top cap 110 such that the rear rails 114 (or at least a portion thereof) nest within the channels 122. As will be detailed further below, the positioning of a portion of the rear rails 114 within the channels 122 forms a structure that might be referred to as an open-mortise and through-tenon arrangement. This configuration provides strength and stability to the resultant straight ladder, with an overlap of the front rails 104 and rear rails 114 occurring between the hinges 120 and the channels 122.

It is noted that with the second assembly 112 "flipped up" into a position that places the ladder 100 in a straight ladder configuration (e.g., FIGS. 2 and 3), one of the rear rungs 116 may align with the upper surface of the top cap 110, providing an extended support surface (i.e., the combined surface areas of the upper surface of the top cap 110 and the tread surface of the adjacent rung 116) on which a user may stand. Additionally, the other rungs 116 of the second assembly 112 are spaced similarly to the rungs 106 of the first assembly 102 so that a user may continue to climb from the rungs 106 of the first assembly 102, onto the top cap 110, and on to the rungs 116 of the second assembly 112 in a continuous and uninterrupted manner, and without a change in spacing from one step to another, as the user ascends and descends the ladder 100.

As noted above, the hinges 120 may be configured to lock when in the position shown in FIGS. 2 and 3, providing a certain amount of structural rigidity between the two assemblies 102 and 112. Additionally, the rear rails 114 may each abut a back surface of their corresponding channel 122 such that force (e.g., from a user climbing the ladder 100) is transferred through the first assembly 102, via the top cap 110, to the rear rails 114. In addition to the transfer of this type of force, it is noted that lateral forces (e.g., forces extending in a direction along an axis that passes through both front rails 104) may also be distributed through the top cap 110, through the sidewalls of the channels 122 to the rear rails 114 (or vice versa), and in combination with the connections provided by the hinges 120, again providing significant strength and stability to the ladder 100 when in the configuration shown in FIGS. 2 and 3.

Figure 4:
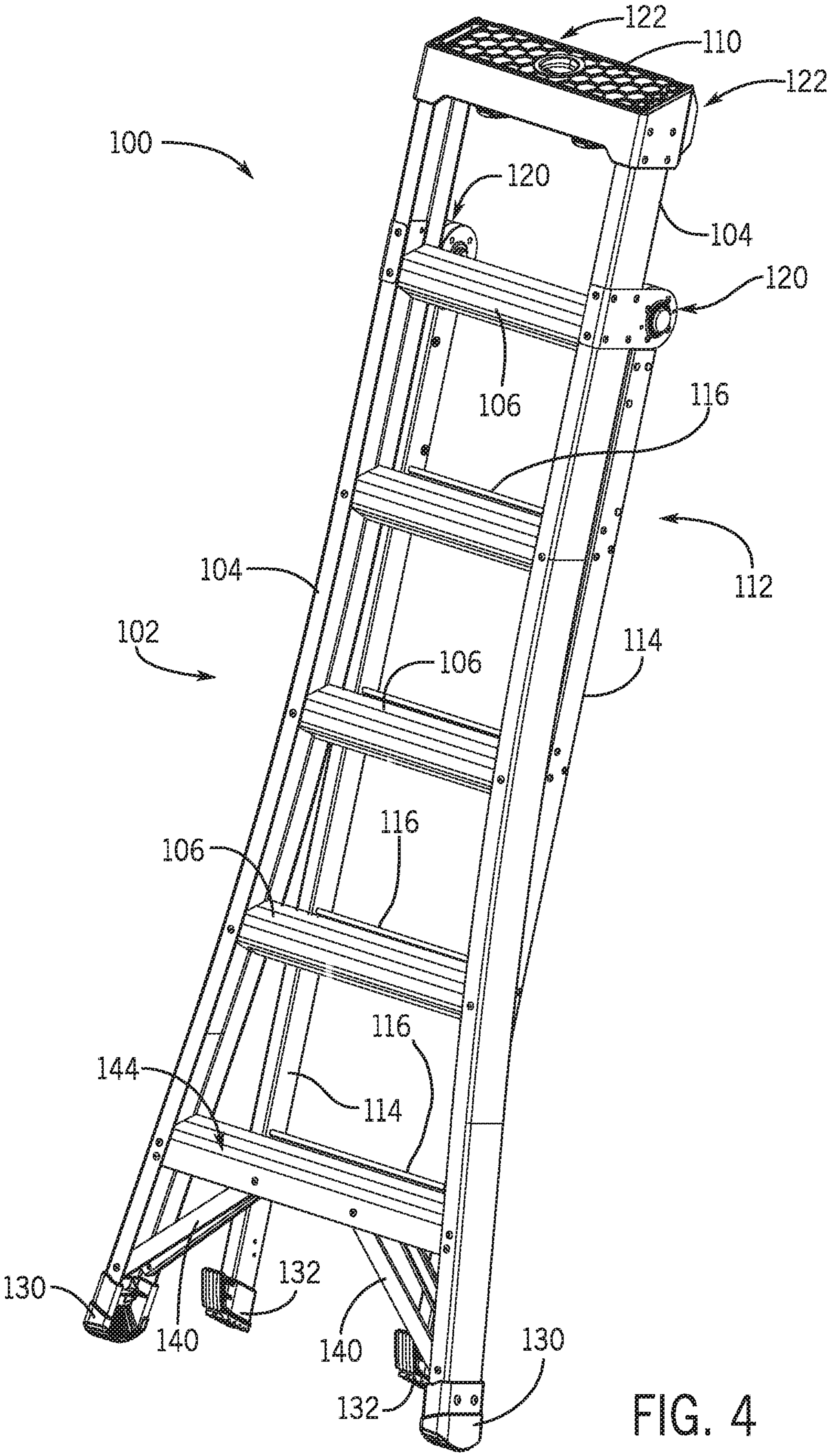
FIG. 4 is a front perspective view of the ladder shown in FIGS. 1 and 2 while in a third state.

Referring to FIG. 4, the second assembly 112 may be selectively positioned, relative to the first assembly, in a storage or leaning configuration, wherein the rear rails 114 are placed adjacent to, and extend substantially parallel to, the front rails 104. In this configuration, no portion of the second assembly extends upwards beyond the top cap 110 (or otherwise contacts the top cap 110) as occurs in the straight ladder configuration. In this configuration, the ladder 100 may be stored in relatively compact space, or it may be used to lean up against a supporting surface or an object (e.g., a wall or a pole), placing the user closer to the supporting surface. As will be discussed in further detail below, a cushion or other resilient and/or non-marking material may be located on a back face of the top cap 110 to engage with a support surface (e.g., a wall) so that the ladder does not scratch or otherwise mar the support surface.

The first assembly 102 and the second assembly 112 may additionally include feet 130 and 132 formed at, or coupled to, the end of the front and rear rails 104 and 114, respectively. The feet 130 and 132 may be configured to engage a supporting surface such as the ground when in a step ladder configuration, while the feet 132 may also be configured to engage a supporting surface such as a wall when in a straight ladder configuration.

The feet 130 and 132 may exhibit any of a variety of configurations depending on, for example, the type of environment in which the ladder is anticipated to be used. For example, the feet 130 and 132 may be formed of a plastic or polymer material and be configured with a plurality of ridges, knobs or other engagement features configured to provide increased friction between the ladder and a relatively rigid supporting surface (e.g., concrete, tile or wood). Additionally, or alternatively, the feet 130 and 132 may include features such as barbs or other sharp protrusions configured to dig into a relatively softer supporting surface (e.g., dirt or grass). In some embodiments, the feet may be configured such as described in U.S. Pat. No. 9,016,434 to Moss et al., the disclosure of which is incorporated by reference herein in its entirety. In other embodiments, the feet may be configured such as described in U.S. patent application Ser. No. 15/897,995, filed on Feb. 15, 2018, the disclosure of which is incorporated by reference herein in its entirety. As will be discussed in further detail below, in some embodiments, the feet may be configured to be selectively positionable relative to their associated rails.

In some embodiments, the ladder 100 may include other components including, for example, various bracing members or other structural components. For example, one or more brace members may be used to provide increased strength, rigidity, and/or durability to the ladder. In one example, with reference to FIGS. 1-6, brace members 140 may be coupled between the rails (e.g., the front rails 104) and their associated rungs (e.g., the front rungs 106). Such a brace 140 may be coupled to the various members by mechanical fastening, material joining, use of adhesives, or other techniques. In one particular example, the brace may be fastened to one component (e.g., to a rung 106) by way of a mechanical fastener, while being coupled with another component (e.g., to a front rail 104) merely by encircling the component. Examples of some potential braces, along with techniques of coupling braces with associated components, are described in U.S. patent application Ser. No. 15/952,437, filed on Apr. 13, 2018, the disclosure of which is incorporated by reference herein in its entirety.

In some embodiments, a mechanism or assembly 144, configured as a last-step indicator, may be incorporated into or otherwise associated with a lowermost rung or the ladder (e.g., the lowermost rung 106 of the first assembly 102). The assembly 144 may be configured such that, when a user is descending the ladder 100 and places their weight on the lowermost rung, an alert (e.g., a sound, light, or vibrational signal) is provided to the user, indicating that this is the last rung in their descent, and that their next "step down" will be to the supporting surface (e.g., the floor or ground). Some examples of mechanisms or assemblies used as last-step indicators are described in U.S. patent application Ser. No. 14/849,917, filed on Sep. 10, 2015, the disclosure of which is incorporated by reference herein in its entirety.

The first and second assemblies 102 and 112 may be formed of a variety of materials and using a variety of manufacturing techniques. For example, in one embodiment, the front and rear rails 104 and 114 may be formed of a composite material, such as fiberglass, while the rungs 106 and 116 and other structural components may be formed of aluminum or an aluminum alloy. In some embodiments, the top cap 110 may be formed of a plastic material and may be molded. In other embodiments, the assemblies 102 and 112 (and their various components) may be formed of a variety of other materials including, for example, other composites, plastics, polymers, metals and metal alloys.

Figure 5:
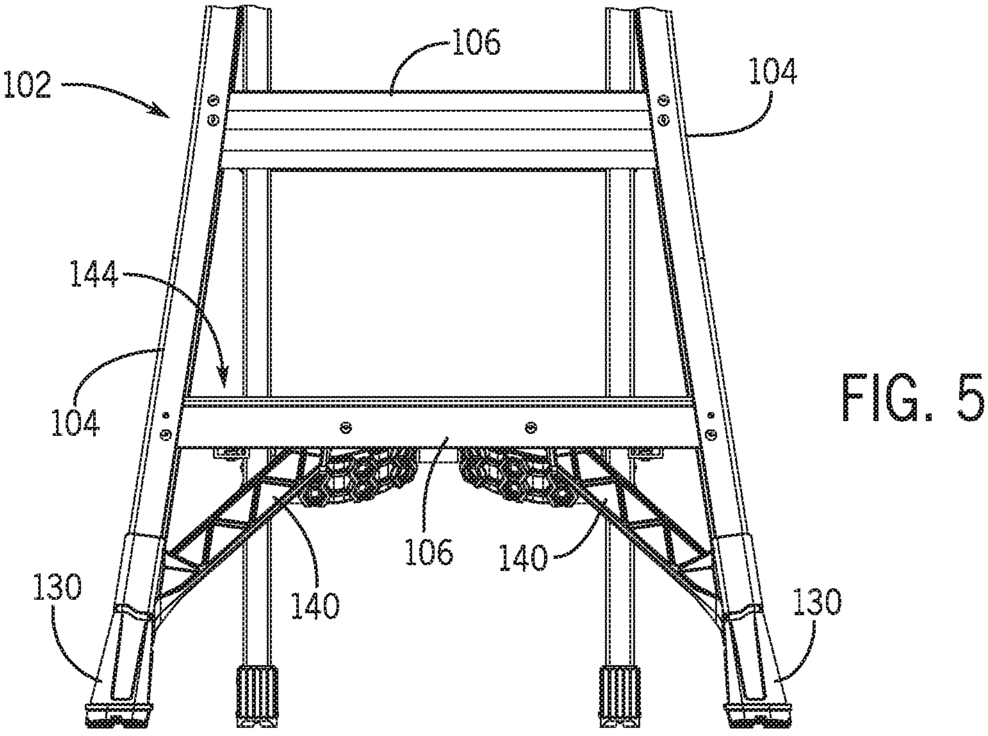
FIGS. 5 and 6 show a lower portion of a ladder in accordance with an embodiment of the present disclosure.
Figure 6:
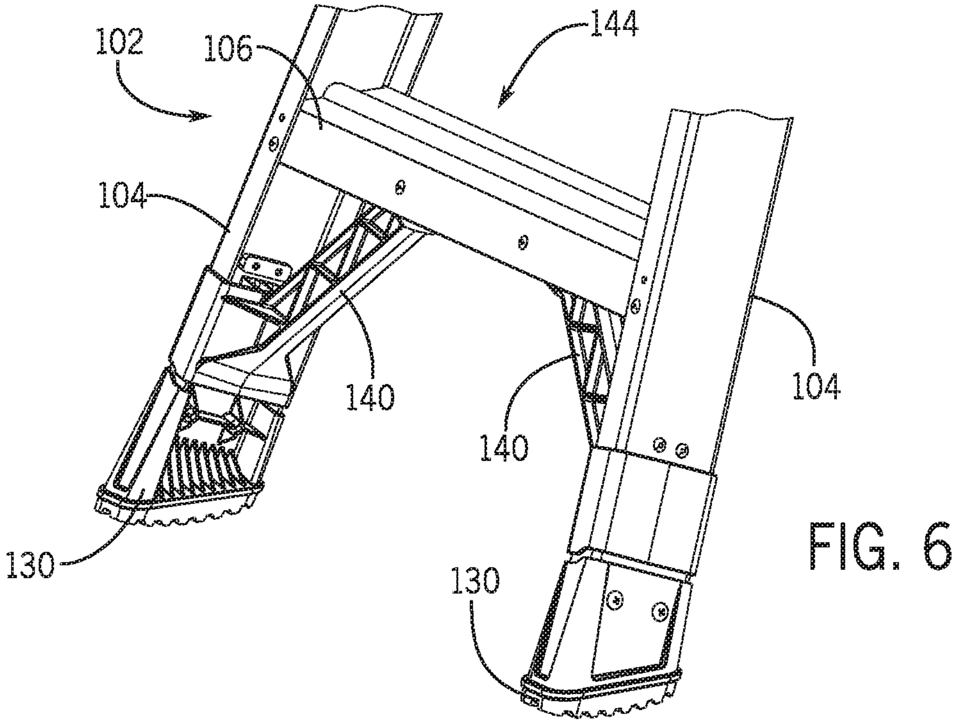

It is noted that, in some embodiments, the front rails 104 may be tapered, angled or curved such that the lowermost portions of the two front rails 104 are spaced further from one another than the uppermost portions of the two front rails 104. In some embodiments, such as best seen in FIG. 5, the front rails 104 exhibit a curved geometry in at least a lower portion of the rails, bending outwards from each other. This may be the case even in embodiments where the rails 104 are formed of composite materials such as, for example, fiberglass. The curved portion of the front rails 104 at their lower ends provides a widened base which increases the lateral stability of the ladder 100. Additionally, the straight portions, or parallel sections, at the upper ends of the front rails 104 enable the hinges 120 to be assembled to two parallel components, preventing binding of the hinges 120 when the second assembly 112 transitions between its various positions or states.

It is noted that in other embodiments, the first and/or second assemblies 102 and 112 may each include rails that are straight and parallel to each other; straight and flared (e.g., the lower portions of the rails exhibiting a greater distance from each other than the upper portions of the rails); bent with an angular change; bent with a curved portion; or some combination of the above.

Figure 7:
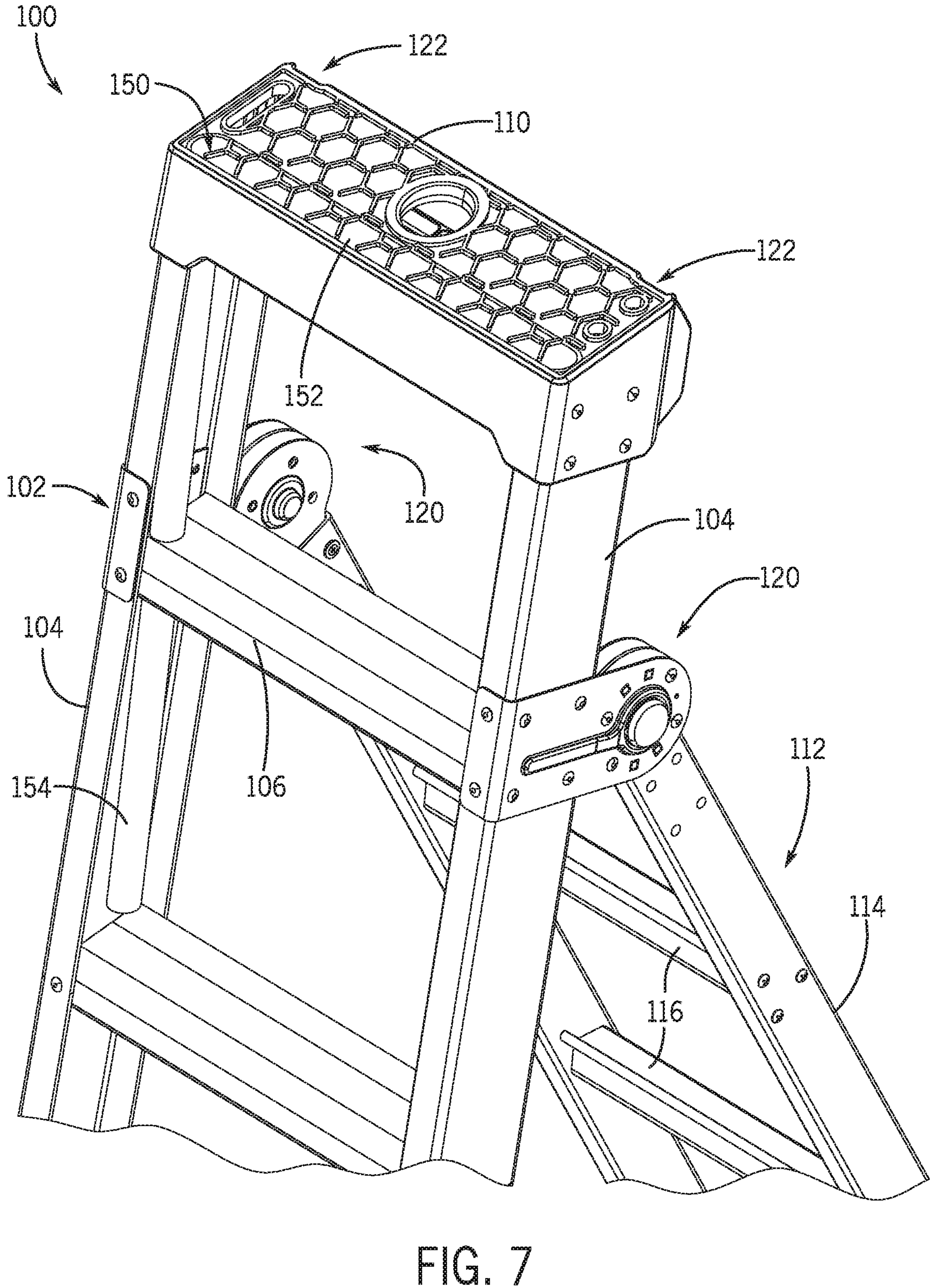
FIGS. 7-10 are various views of a ladder in accordance with an embodiment of the present disclosure.
Figure 8:
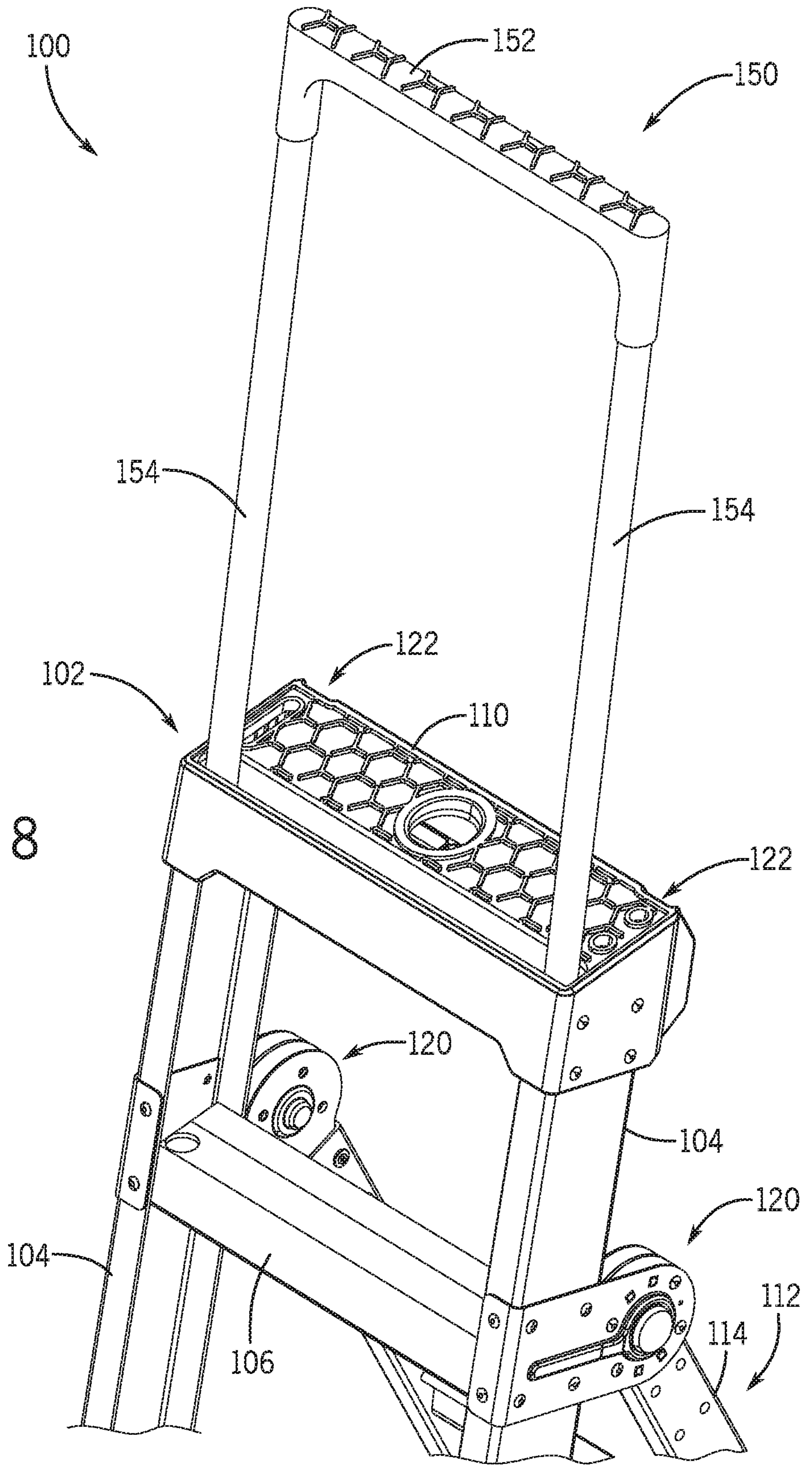
Figure 9:
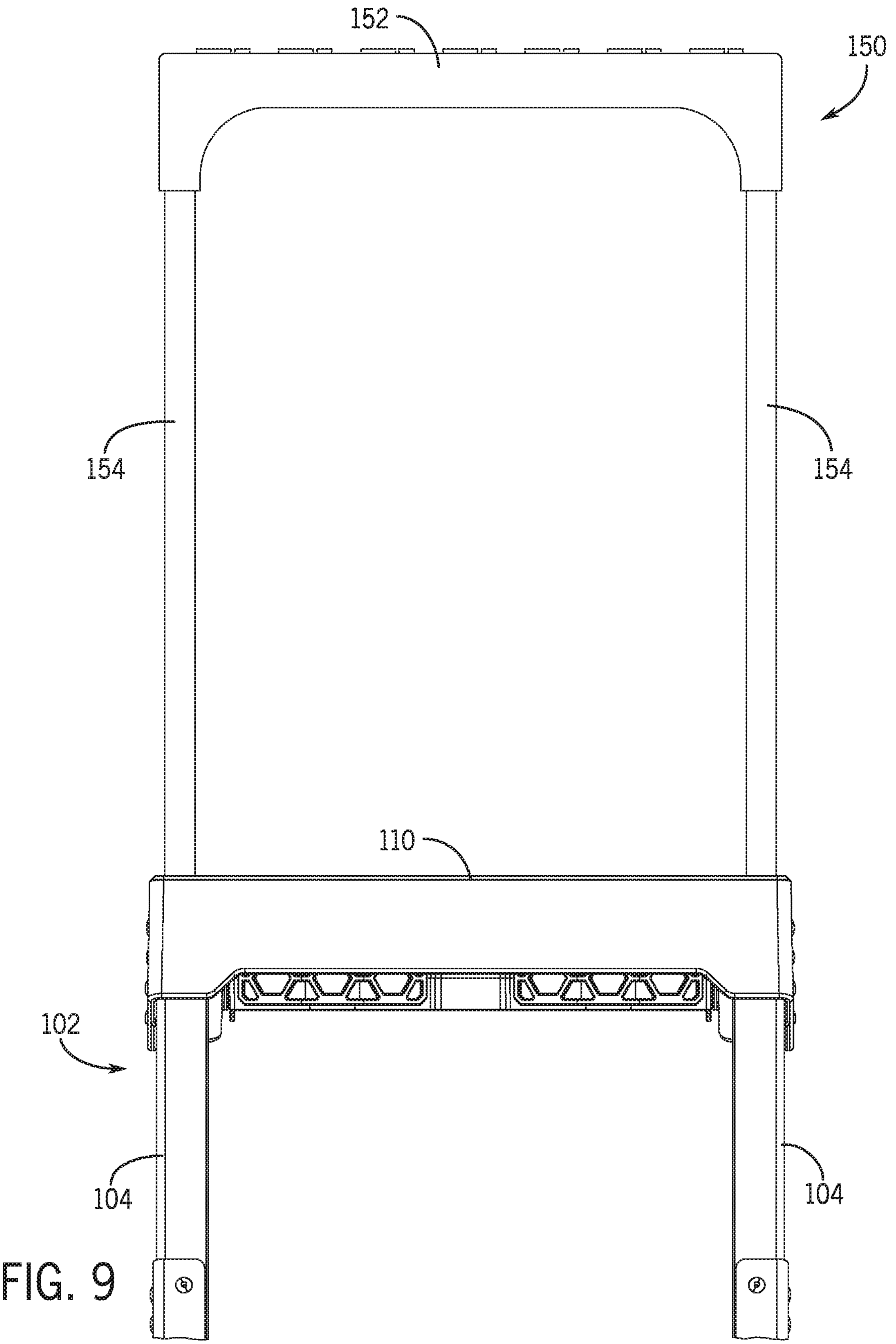
Figure 10:
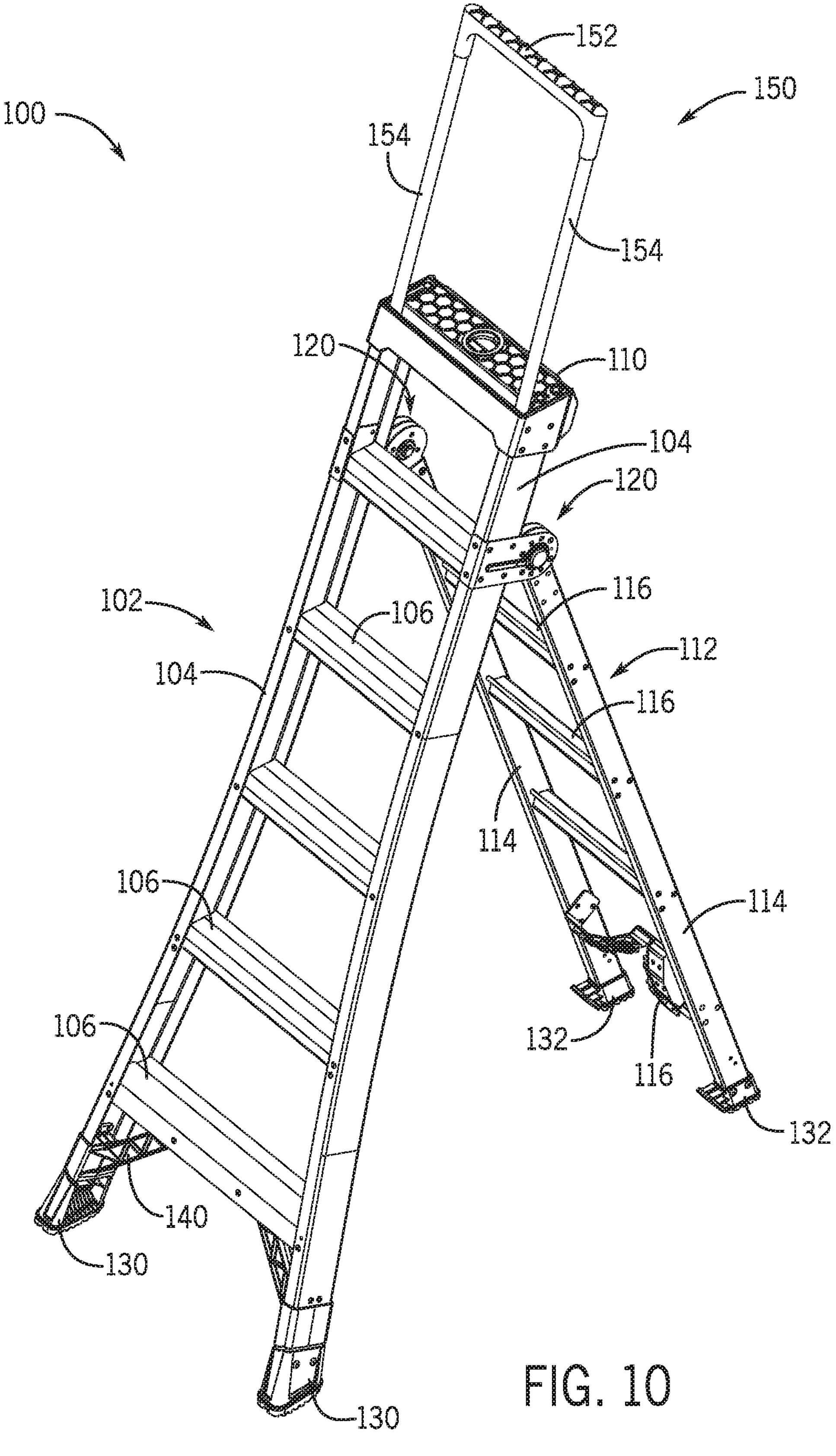

Referring now to FIGS. 7-10, in some embodiments, the ladder 100 may include a component such as a retractable rail 150 that extends from the top cap 110 and may assist a user in maintaining their balance and stability while standing on one of the upper rungs 106 of the first assembly 102. The rail 150 may include a cross member 152 coupled between a pair of spaced apart legs 154. The cross member 152 may include a surface that generally matches or mirrors the upper surface of the top cap 110 (e.g., in terms of traction or anti-slip features or materials) so as to become substantially integrated with the top cap 110 when it is in a stored position. The rail 150 is displaceable between a stored position or configuration (see FIG. 7) and an extended or deployed position or configuration (see FIGS. 8-10). In some embodiments, the rail 150 may be maintained in an extended position by a locking mechanism (e.g., a spring biased button, a detent mechanism, a latch, etc.). In other embodiments, the rail 150 may be maintained in an extended position by way of a frictional force or a biasing force exhibited between, for example, the legs 154 and adjacent surfaces of the top cap 110. As seen in FIG. 7, when the rail 150 is in the stored or retracted position, the legs 154 may extend down through one or more of the rungs 106 along the inner surfaces of the front rails 104. In some embodiments, the front rails 104 of the first assembly 102 may be formed as channels (e.g., c-shaped channels), wherein the legs 154 are positioned within the hollow or recessed portion of the channel, keeping the legs 154 out of the path of a user's feet as they climb the rungs 106 of the first assembly 102.

In some embodiments, the feet of one or both of the assemblies 102 and 112 may be selectively positionable by a user. For example, referring to FIGS. 11-14, the feet 132 coupled to the ends of the rear rails 114 may each include a coupling portion 160 coupled to an associated rear rail 114. The feet 132 may each further include a lateral extension portion 162 extending laterally away from the associated rear rail 114, and a surface engagement portion 164 that is configured to engage a supporting surface. The feet 132 are each independently rotatable about an axis that extends substantially along the length of the associated rear rail 114, and may each be locked or maintained in a variety of positions by detent mechanisms, push button locks, clamping mechanisms, or a variety of other mechanisms or devices.

Figure 11:
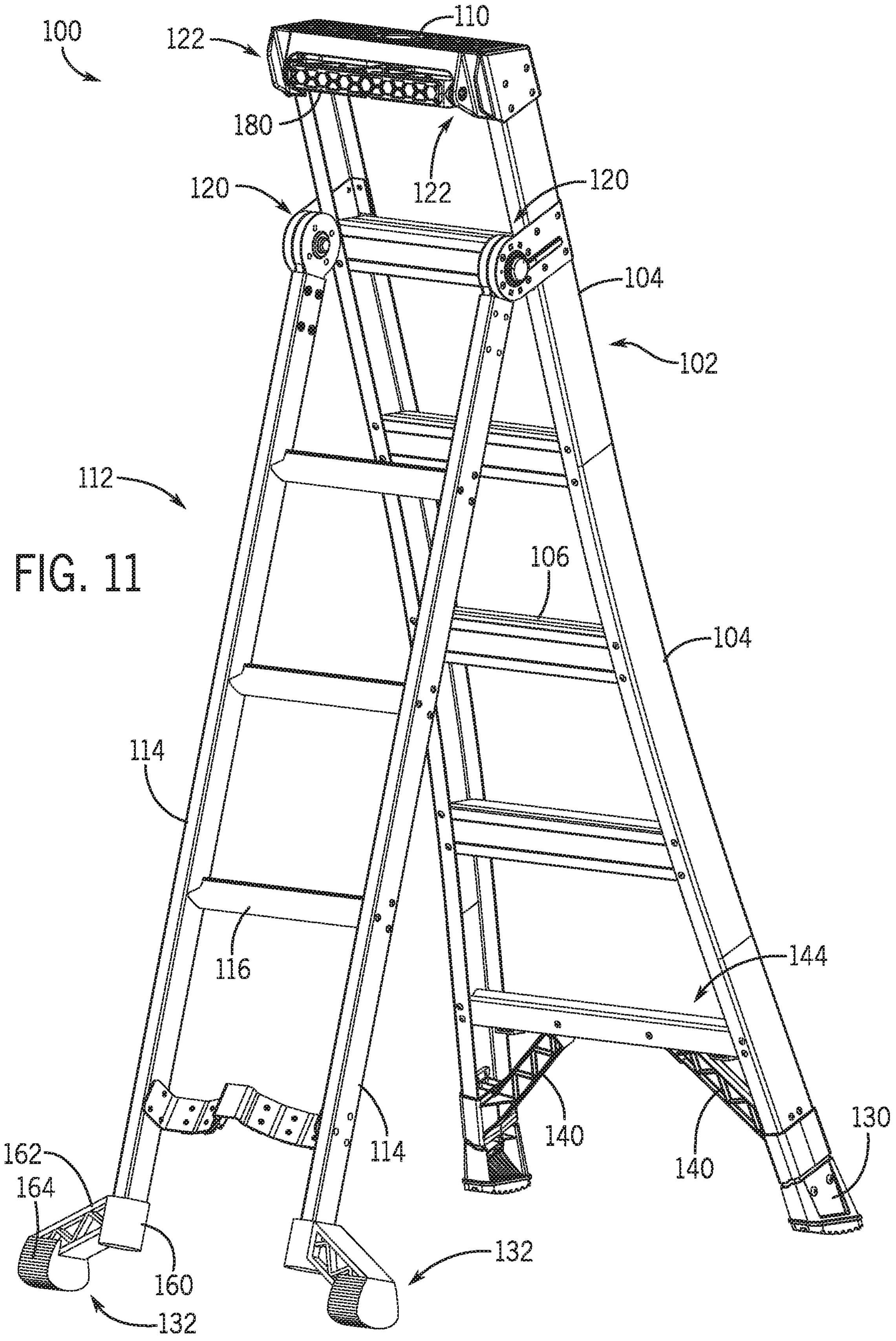
FIGS. 11-14 are various views of a ladder in accordance with another embodiment of the present disclosure.
Figure 12:
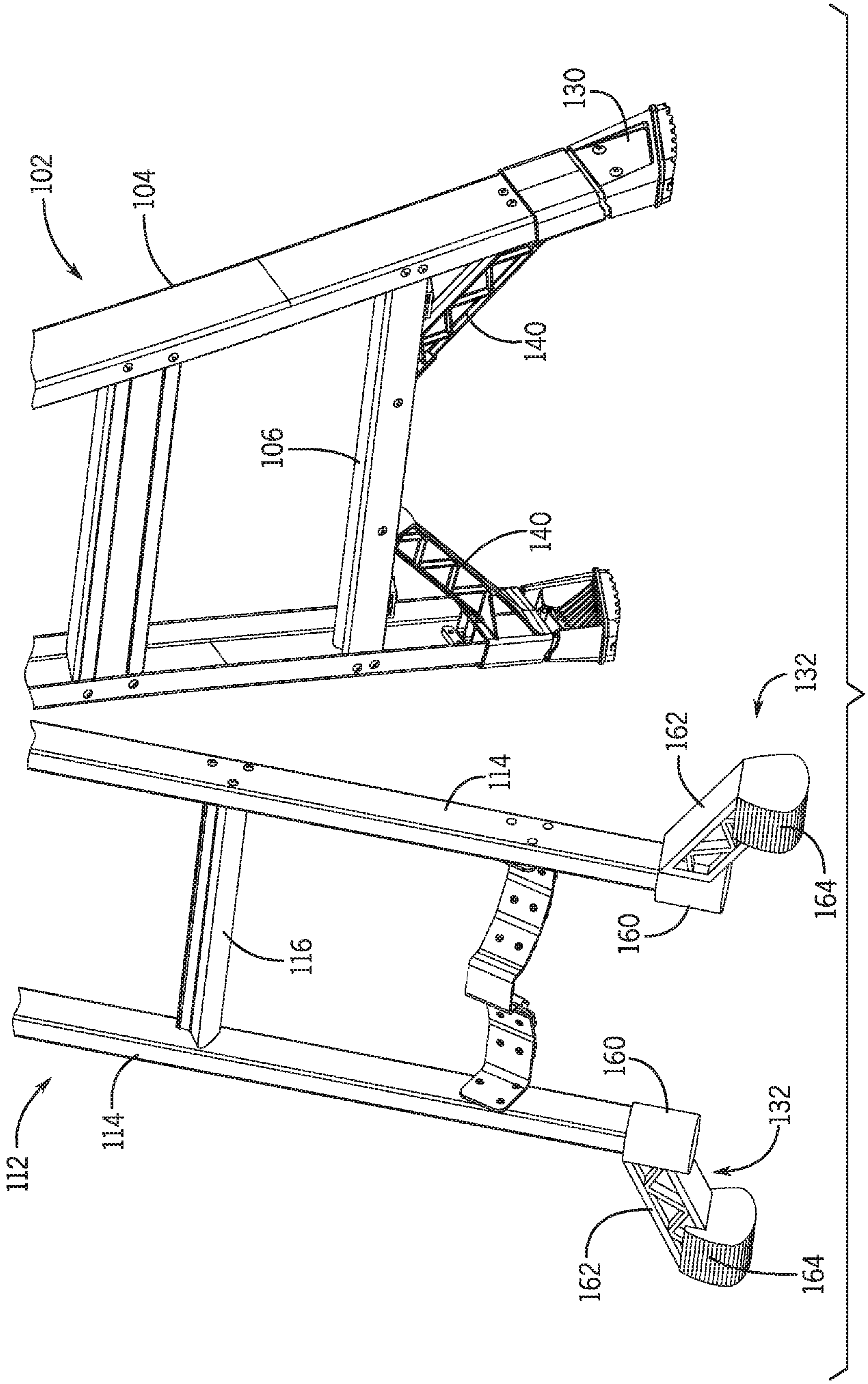

Referring to FIGS. 11 and 12, when the ladder is in a step ladder configuration, the feet 132 may be positioned relative to the rear rails 114 such that the surface engagement portions 164 are positioned laterally outward from the rear rails 114 (e.g., at 180 degrees) and such that the feet engage a supporting surface (e.g., the ground, a floor or other generally horizontal structure) at a width that is greater than the width of the rear rails 114. In some embodiments, the surface engagement portions 164 may extend in substantially the same plane as the associated rear rails 114, maximizing the width at which the surface engagement portions 164 engage the supporting surface. Thus, for example, in some embodiments, the rear rails 114 may exhibit a width of approximately 14.5 inches or less (and in some embodiments 14 inches or less), while the feet 132 may be configured to exhibit a width of approximately 18 to approximately 24 inches or greater, providing substantial stability to the ladder 100 when used in a step ladder configuration.

In some embodiments, the feet 132 may be rotated to a position that is substantially 90 degrees, in either rotational direction, from the position shown in FIGS. 11 and 12. It is noted that in embodiments where the rear rails 114 are configured to exhibit a width of 14.5 inches or less, that the second assembly 112 may be placed between adjacent studs of typical wall construction (prior to sheet rock or other surfaces being installed), enabling a user to get closer to a wall (e.g., the top cap 110 moves closer to the wall when the second assembly 112 is passed through the space between two adjacent studs) providing enhanced access to a desired work location.

Figure 13:
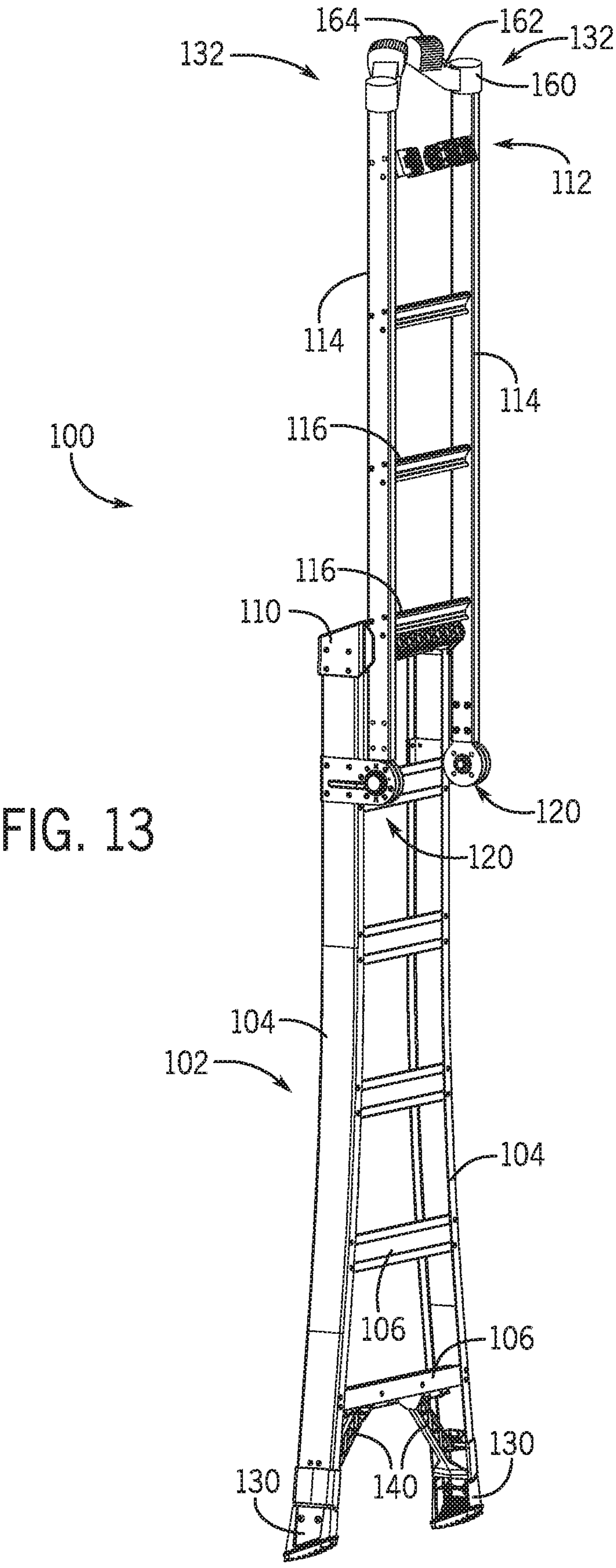
Figure 14:
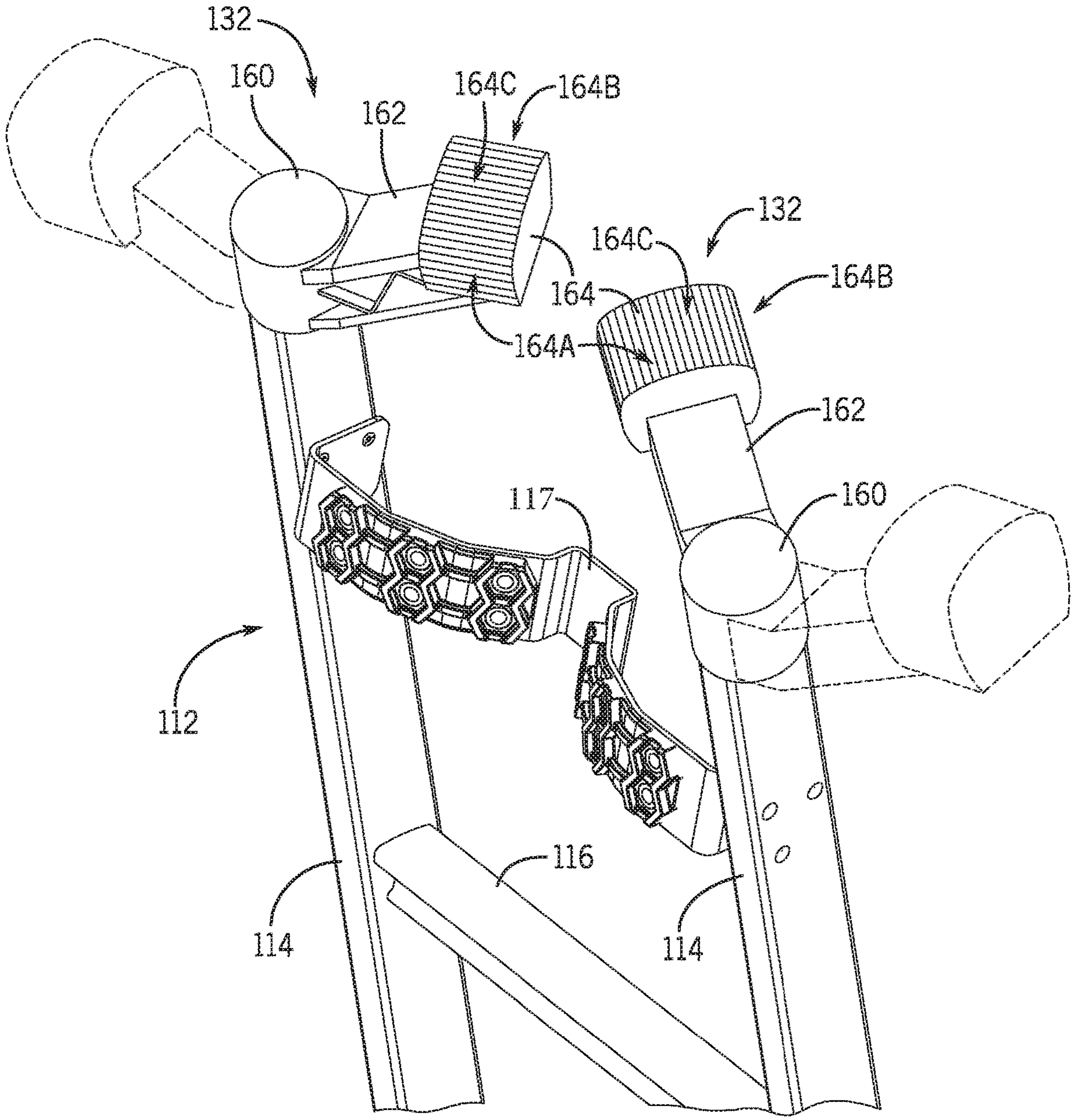

The feet 132 may be rotated to, and locked at, other positions as well. For example, as shown in FIGS. 13 and 14, when the ladder is in a straight ladder configuration, it may be desirable in some circumstances to rotate the feet 132 such that the surface engagement portions 164 extend generally inward (generally toward each other) from the rear rails 114 but at an angle (e.g., in a direction back toward the first assembly 102) relative to the plane in which the rear rails 114 extend. The surface engagement portions 164 may thus be configured to generally mimic or function as a v-rung for engagement with a pole (e.g., a power pole, telephone pole, etc.) or other vertical structure when the ladder 100 is in a straight ladder configuration. In one embodiment, the feet 132 may be rotated so that the surface engagement portions 164 extend at an angle of between approximately 20 degrees and approximately 45 degrees relative to the plane in which the rear rails 114 extend. Of course, the feet 132 may be placed in other angular positions as well.

In some embodiments, the feet 132 may be configured to be rotated to, and locked at, angular positions such that the surface engagement portions 164 extend generally outward from the rear rails 114 (away each other) but at an angle (away the first assembly 102) relative to the plane in which the rear rails 114 extend such as is shown in dashed lines in FIG. 14. The surface engagement portions 164 may then function as a wall stand-off device, providing increased width of contact with a wall (or gutter, or other supporting structure) when the ladder 100 is in a straight ladder configuration. In one embodiment, the feet 132 may be rotated so that the surface engagement portions 164 extend at an angle of between approximately 5 degrees and approximately 45 degrees relative to the plane in which the rear rails 114 extend. In some embodiments, the feet 132 may be rotated such that the surface engagement portions 164 extend directly towards each other (at 0 degrees) to minimize the width of the feet 132 in certain circumstances, including for storage or transportation. Of course, the feet 132 may be placed in other angular positions as well.

It is noted that, because the surface engagement portions 164 may engage a variety of different structures (e.g., ground, poles, walls, etc.), the surface engagement portions 164 may include a variety of surfaces (e.g., 164A, 164B and 164C) having grooves, ribs, or other traction features formed therein. Thus, for example, a first surface 164A may be configured to engage poles or other vertical structures when in a straight ladder configuration, a second surface 164B may be configured to engage gutters or walls when in a straight ladder configuration, and a third surface 164C may be configured to engage a ground surface when in a stepladder configuration.

Referring now to FIGS. 15A-18C, a top cap 110 may include a variety of features. For example, as previously noted, a pair of channels 122 may be formed in a rear portion of the top cap 110, the channels 122 being sized and configured to receive portions of the rear rails 114 therein when the ladder 100 is placed in a straight ladder configuration. When in a straight ladder configuration, a bottom (or innermost) surface 170A of each channel 122 may contact a surface 172A of an associated rear rail 114 (see, e.g., FIGS. 2 and 3). Additionally, side surfaces 170B and 170C may be configured to provide lateral support by engaging corresponding side surfaces 172B and 172C, respectively, of an associated rear rail 114. Thus, for example, if a force is applied to the ladder 100 in a lateral direction (e.g., as shown by directional arrows 174A and 174B in FIG. 2), a minor amount of lateral deflection may occur in the rear rails 114 (and/or front rails 104), wherein the side surfaces 170B and 170C act as stops or abutment members to limit further lateral deflection or displacement of the rear rails 114 relative to the front rails 104 due to the nesting of the rear rails 114 within the channels 122.

As also previously mentioned, a cushion or pad 180 or other structure may be positioned along a rear face of the top cap 110 such that the top cap 110 may be leaned or pressed against, for example, a wall when used in a leaning configuration. As seen in FIGS. 15A-18C, the top cap 110 may include a first body portion 182 that is coupled to the front rails 104, and a second body portion 184 (which may include a detachable accessory) that is selectively positionable (and lockable) relative to the first body portion 182. For example, the second body portion 184 may be positioned in a first position such that a surface 186 (on which the cushion or pad 180 may be located) is positioned generally adjacent to the rear face 188 of the first body portion 182. It is noted that in some embodiments, the surface 186 and adjacent rear face 188 may be angled relative to each other (e.g., an angle measuring greater than 180 degrees when measuring from the surface 186 to the rear face 188). In some embodiments, the rear face 188 may be angled such that it abuts against a surface of a rear rung 116 when in a straight ladder position or configuration, providing enhanced strength and rigidity to the ladder 100. In other embodiments, there may be a gap or small space between the rear face 188 and the adjacent rear rung 116.

Figure 15A:
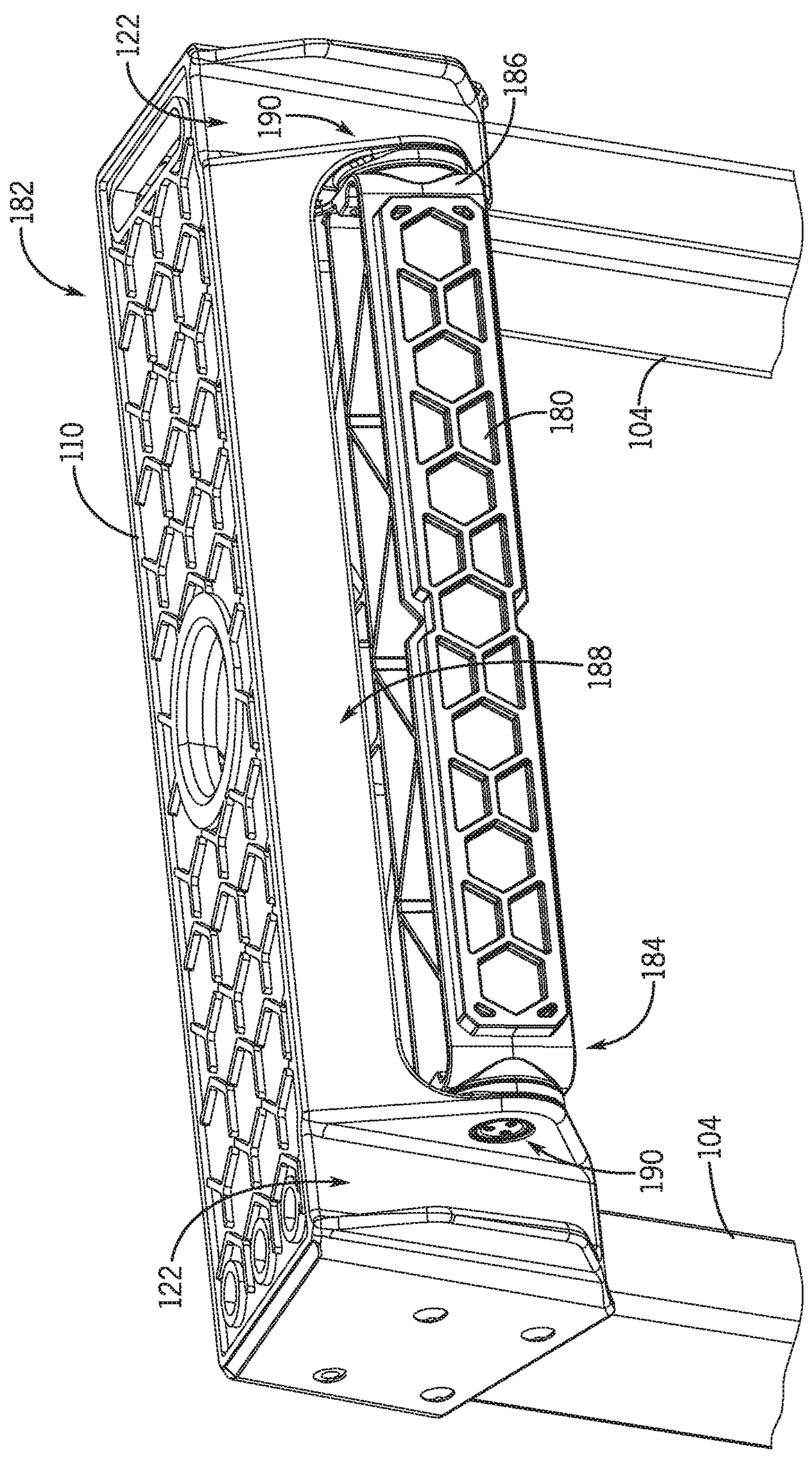
FIGS. 15A-18C depict a top cap of a ladder in accordance with an embodiment of the present disclosure.
Figure 15B:
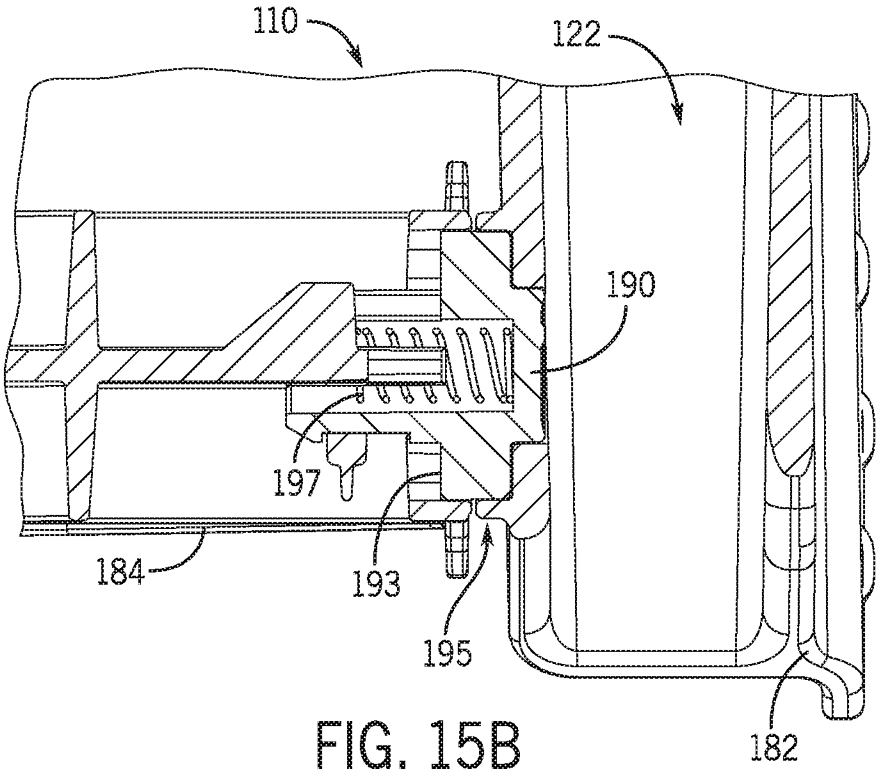
Figure 15C:
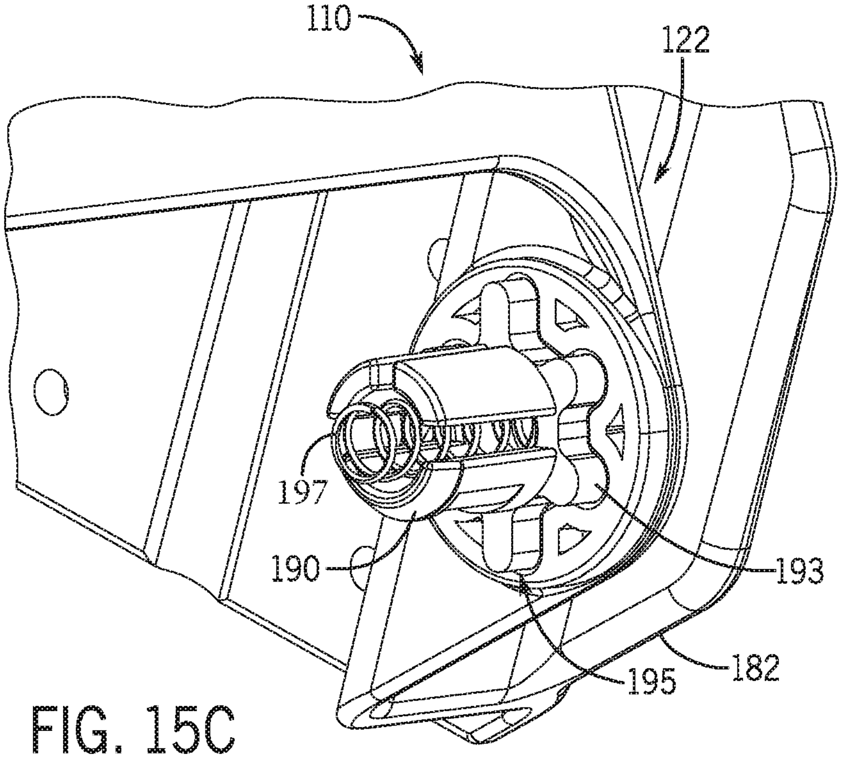
Figure 16A:
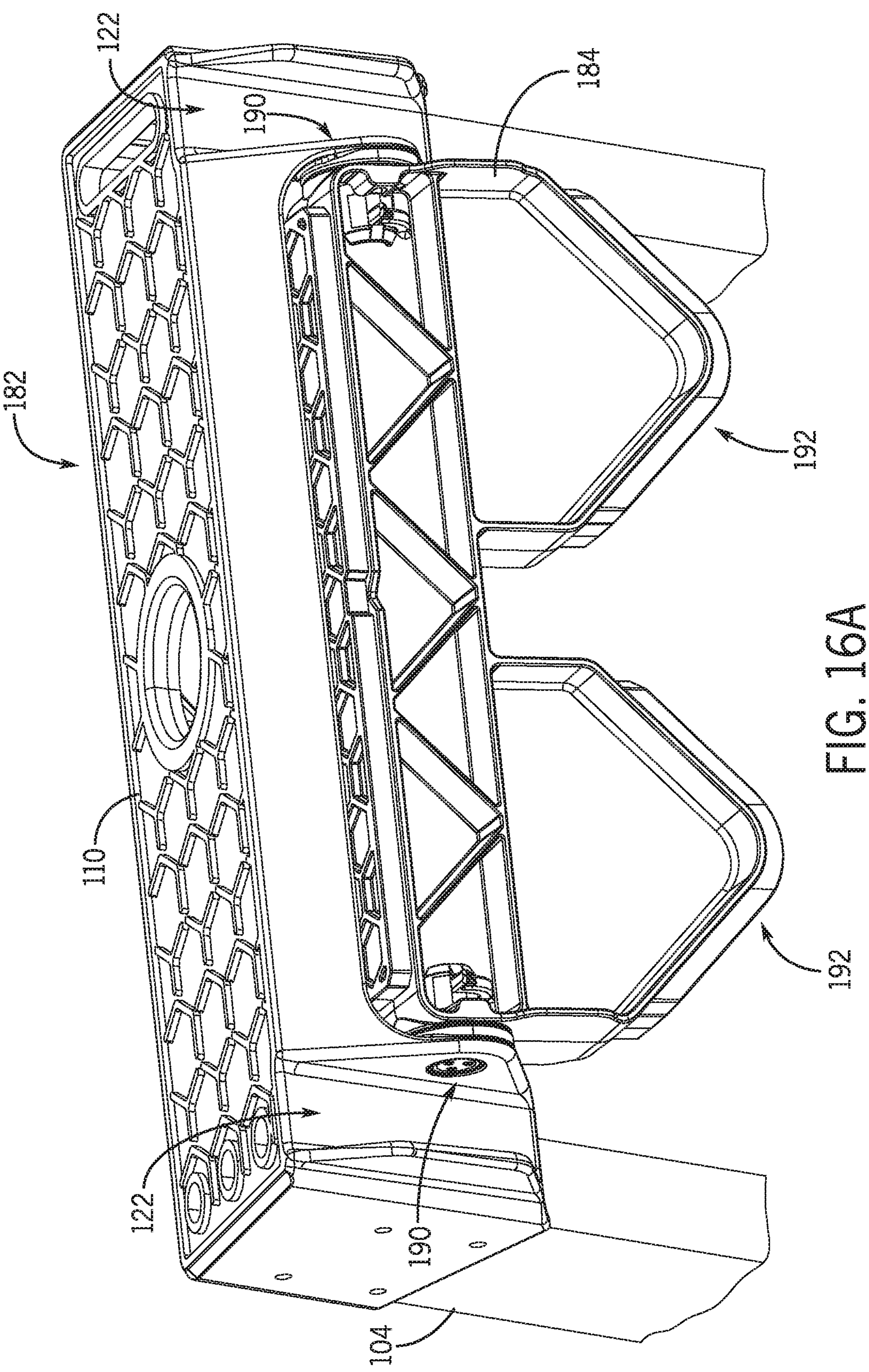
Figure 16B:
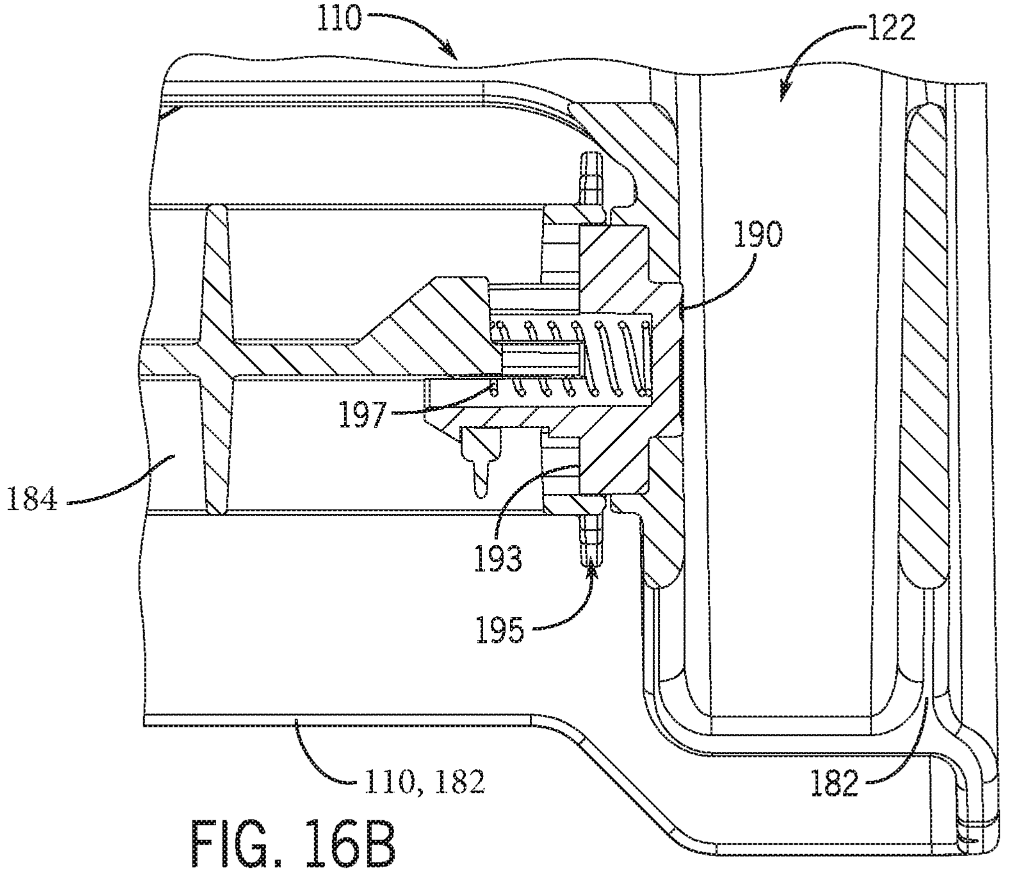
Figure 16C:
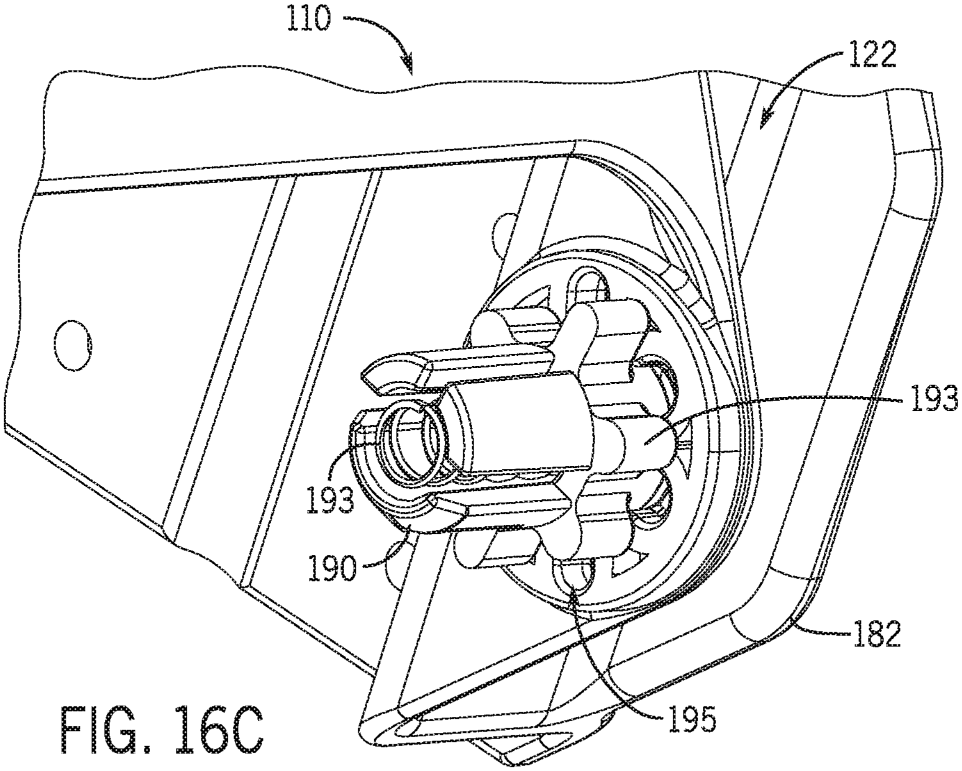

In some embodiments, the second body portion 184 may be pivotally coupled with the first body portion 182 by way of a pivoting structure such that the second body portion 184 may rotate to at least a second position relative to the first body portion 182. As seen in FIGS. 15B and 15C, a pivoting structure may include a pair of locking buttons 190 having keyed or geared portions 193 configured to engage corresponding openings 195 (e.g., openings that have portions sized and shaped to receive the keyed portions 193) formed in the first body portion 182 of the top cap 110. When the keyed portions 193 are engaged in corresponding openings 195, as shown in FIGS. 15B and 15C (note that FIG. 15C depicts the top cap 110 with the second body portion 184 removed for purposes of clarity), the second body portion 184 is locked in place and prevented from rotating relative to the first body portion 182. However, when the locking buttons are displaced axially along a pivot axis such that the keyed portions 193 disengage the openings 195 (see FIGS. 16B and 16C—with FIG. 16C depicting the top cap 110 with the second body portion 184 removed for purposes of clarity), the second body portion 184 and lock button may rotate relative to the first body portion 182 such as depicted in FIG. 16A.

Figure 17:
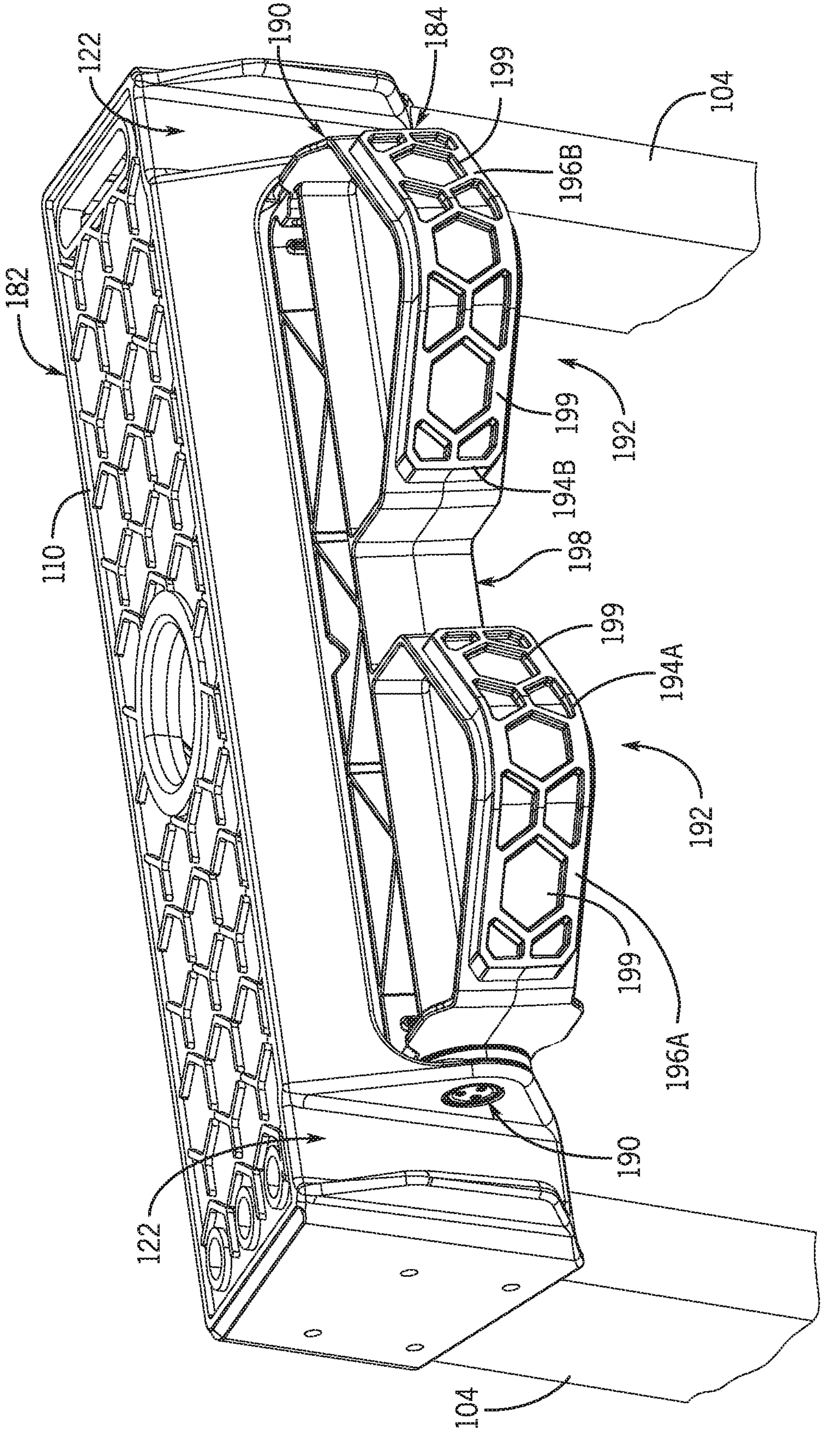

When the second body portion 184 is rotated to a second position (e.g., such as shown in FIG. 17), and upon alignment of the keyed portions 193 with corresponding features in the opening 195, the lock buttons 190 may be displaced axially by a biasing member 197, such as a spring, such that they keyed portions 193 engage the openings 195 and the second portion 184 is locked into place relative to the first portion 182 in the second position.

As seen in FIG. 17, when the second body portion 184 is rotated into a second position, various features of the second body portion 184 may protrude outwardly from the rear face 188 of the first body portion 182. For example, the second body portion 184 may include a pair of protruding structures 192 providing a first pair of angled engagement surfaces 194A and 194B, a second pair of angled engagement surfaces 196A and 196B, and a channel 198 that is located adjacent to, and in between, the first pair of engagement surfaces 194A and 194B.

With the second body portion 184 selectively locked in the second position by locking buttons 190 (or by other appropriate mechanisms or structures such as detent mechanisms, latches, frictional arrangements, etc.), the first pair of angled engagement surfaces 194A and 194B may be positioned and oriented to define an interior angle of a desired magnitude therebetween (e.g., approximately 90 degrees). The second pair of engagement surfaces 196A and 196B may be positioned and oriented to define an exterior angle of a desired magnitude (e.g., approximately 90 degrees). In some embodiments, cushions or pads 199 may be placed on each of the engagement surfaces 194A, 194B, 196A and 196B such as best seen in FIG. 17.

Figure 18A:
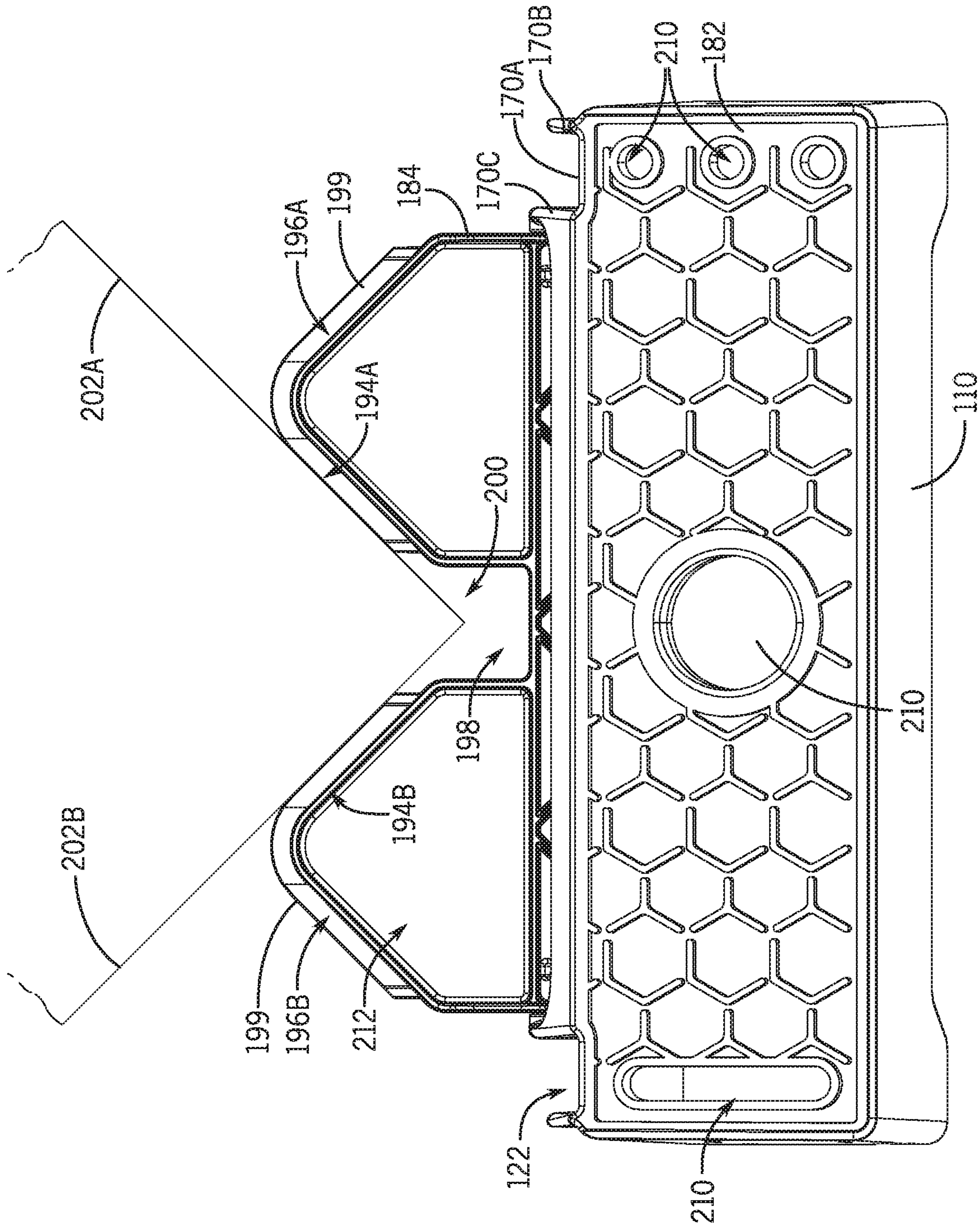

Referring to FIG. 18A, when used in a leaning configuration (see, e.g., FIG. 4), the ladder 100 may be leaned against an exterior wall corner 200 such that the first pair of engagement surfaces 194A and 194B each engage adjacent walls 202A and 202B that form the exterior corner 200, providing balance and stability to the ladder 100 and enabling a user to get laterally closer to the wall.

Figure 18B:
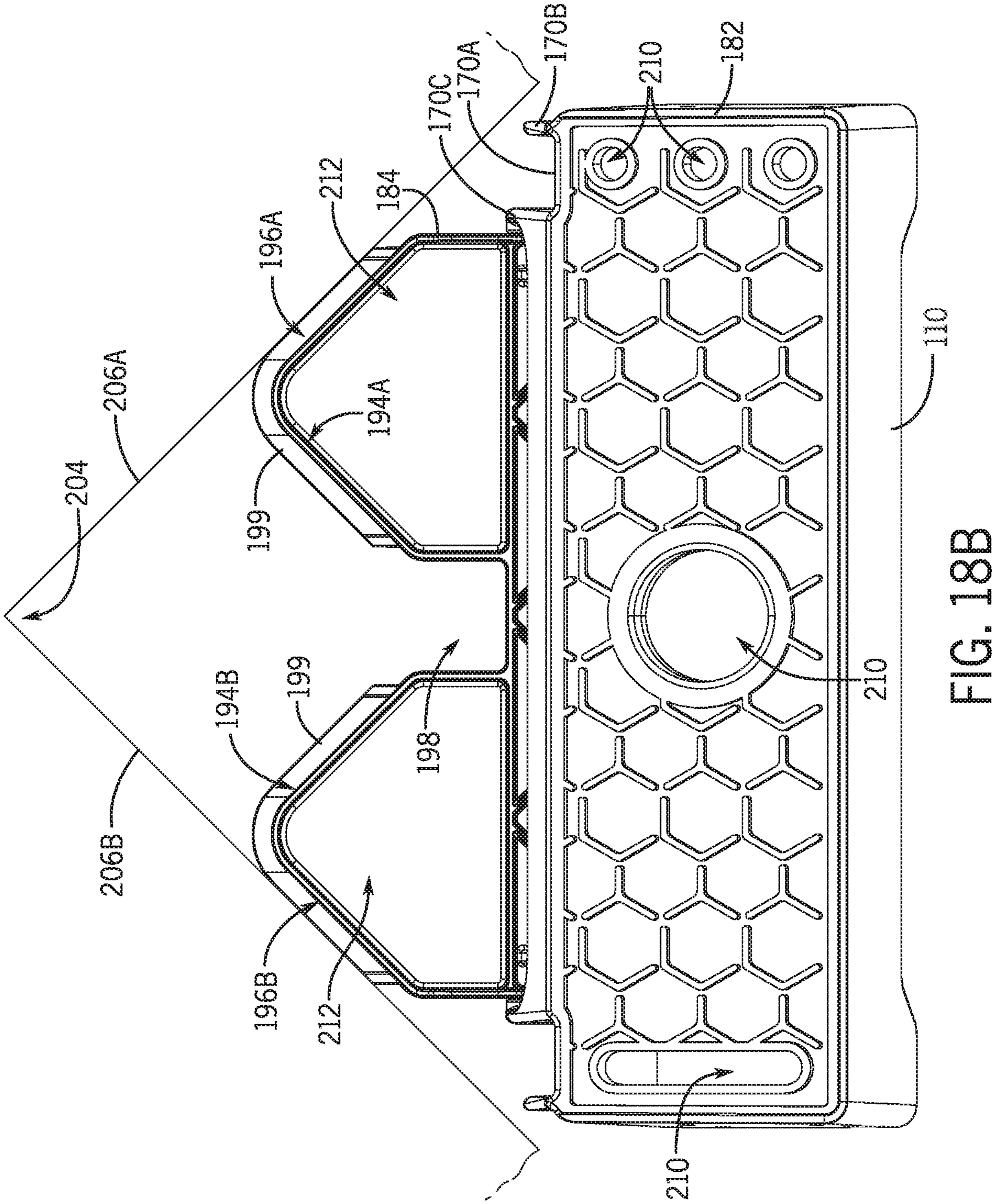
Figure 18C:
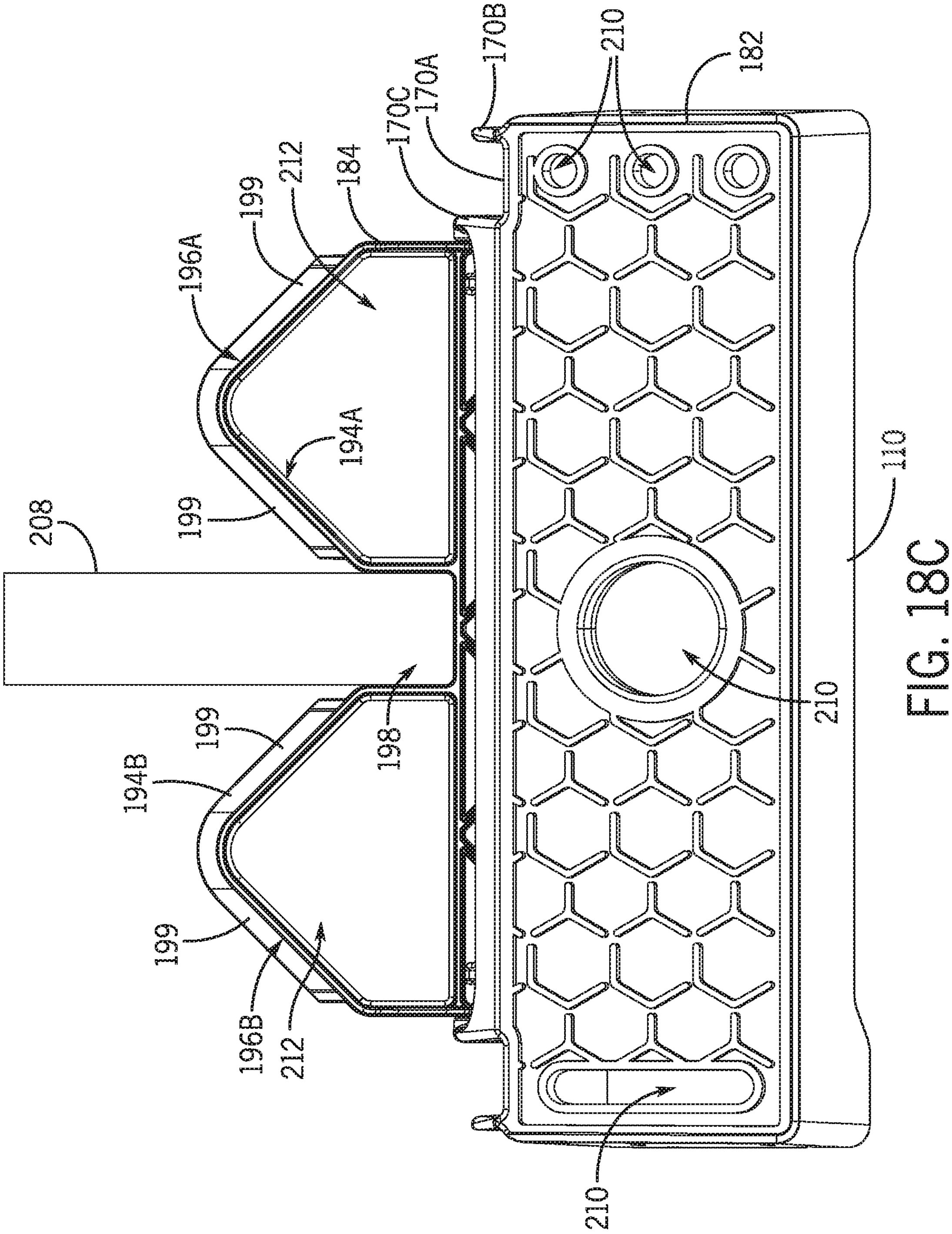

Referring to FIG. 18B, when used in a leaning configuration, the ladder 100 may be leaned against an interior wall corner 204 such that the second pair of engagement surfaces 196A and 196B each engage adjacent walls 206A and 206B that form the interior corner 204, again providing balance and stability to the ladder 100 and enabling a user to get laterally closer to the wall.

Further, when used in a leaning configuration the ladder 100 may be braced against a vertical support structure, such as a stud 208 (e.g., a vertically oriented 2×4, 2×6, etc.) of a framed wall, by positioning the stud 208 within the channel 198, providing balance and stability to the ladder 100 and enabling a user to get laterally closer to the wall. Thus, in some embodiments, the channel 198 may be configured to exhibit a width between its side walls of approximately 1.5 inches or slightly larger (e.g., approximately 1.5625 to approximately 1.625 inches) to provide a sliding fit of a standardized stud within the channel 198.

The top cap 110 may also include other features including, for example, openings 210 for placing tools or other components therein (e.g., screwdrivers, handles of hammers, etc.), recesses 212 for holding tools or supplies (e.g., nails or screws), or features for coupling accessories with the top cap. In some embodiments, such features may be formed in the first body portion 182, in the second body portion 184, or in both.

Referring to FIG. 19-23, in some embodiments, the ladder 100 may include a selectively positionable rail member 220. In one example, the rail member 220 may include a pair of side members 222, with each side member 222 being rotatably coupled with an associated one of the rear rails 114. The side members 222 may extend a substantial portion of the length of the rear rails 114. In one embodiment, the cross-members 224 may extend between and be coupled with the side members 222. When the rail member 220 is in the position or state shown in FIGS. 19-21, at least some of the cross-members 224 may be spaced from each other such that they are located adjacent to associated rear rungs 116. These cross-members 224 may serve as "depth extensions" of the rear rungs 116, providing increased surface area on which a user may stand.

Figure 22:
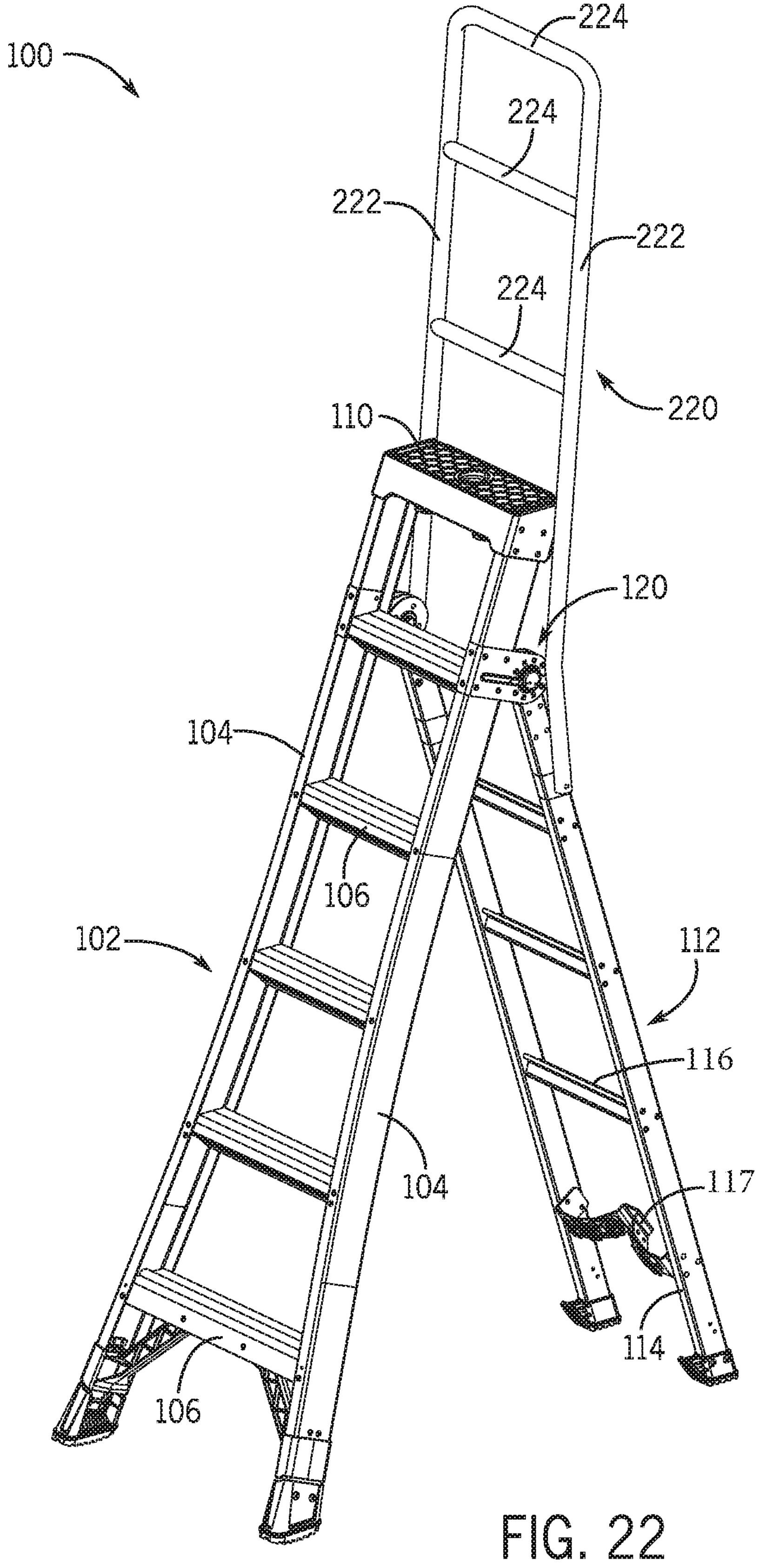

As seen in FIG. 22, the rail member 220 may be rotated upwards relative to the rear rails 114 such that a substantial portion (e.g., half or more) of the rail member 220 extends upward above the top cap 110. The rail member 220 may be locked in this, or other positions, relative to the first and second assemblies 102 and 112 (e.g., by way of detent mechanisms, latches, locking hinges, interference fits with the top cap 110 or other components, etc.). When locked in the position shown in FIG. 22, the rail member 220 provides a stable device for a user to grasp while they are, for example, standing on the front rungs 106. This enables a user to more safely stand on higher rungs of the ladder than without such a rail member 220.

Figure 19:
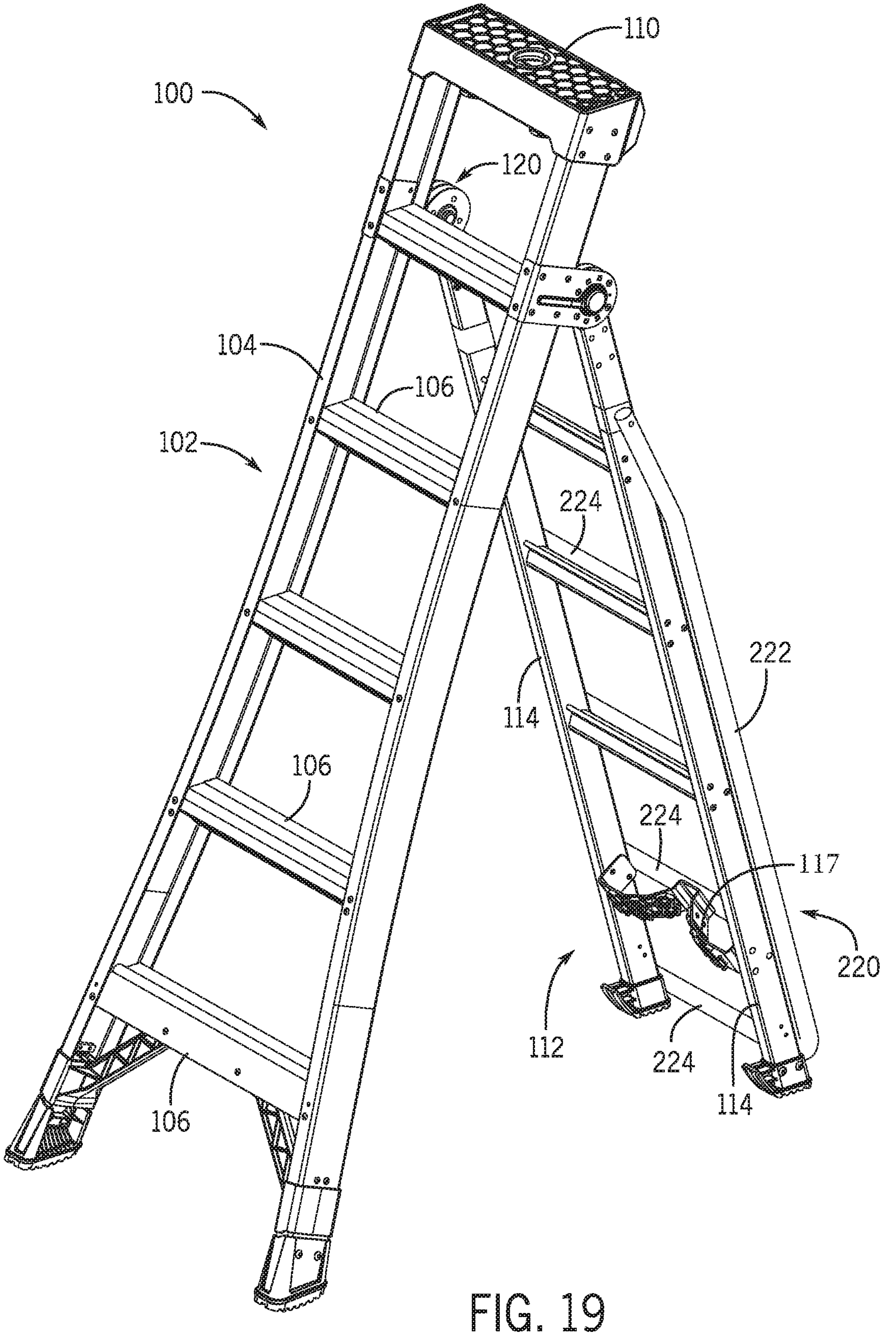
FIGS. 19 and 20 are perspective and rear views, respectively, of a ladder in accordance with an embodiment of the present disclosure.
Figure 20:
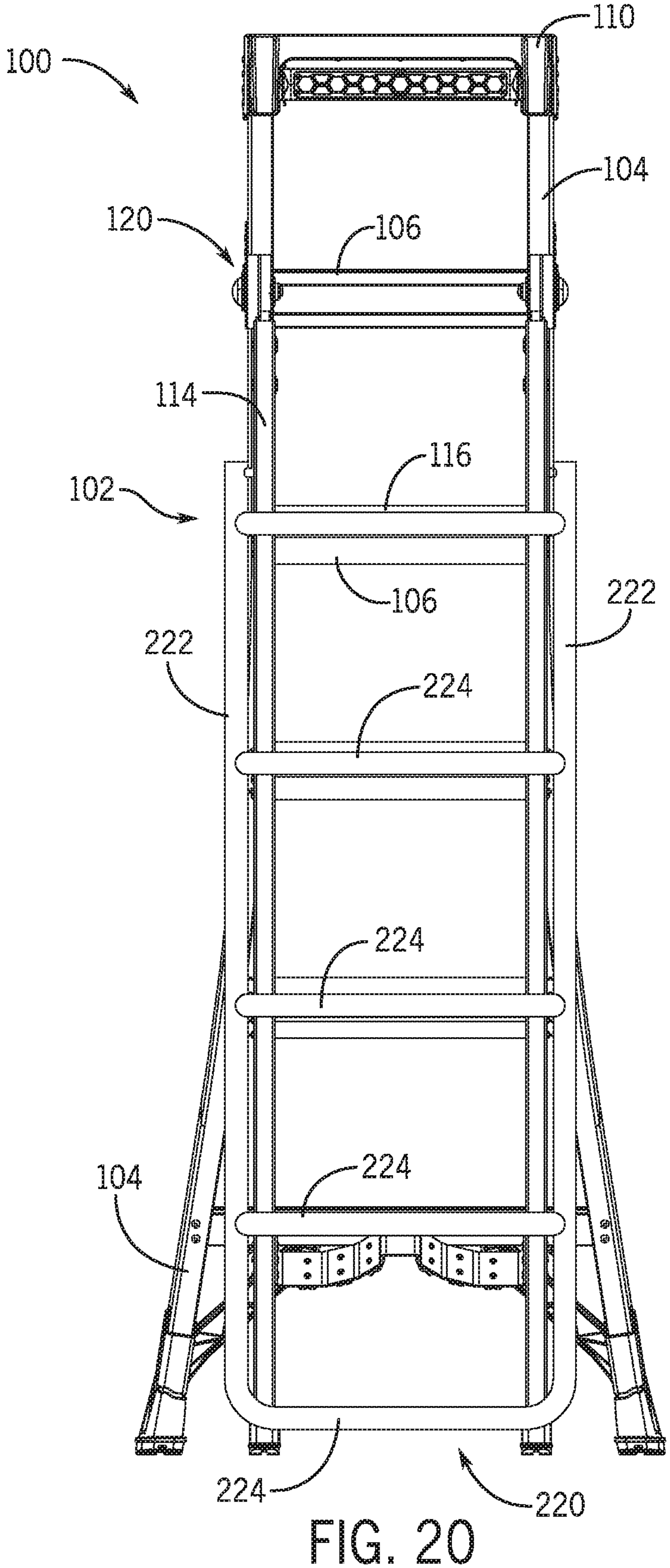
Figure 21:
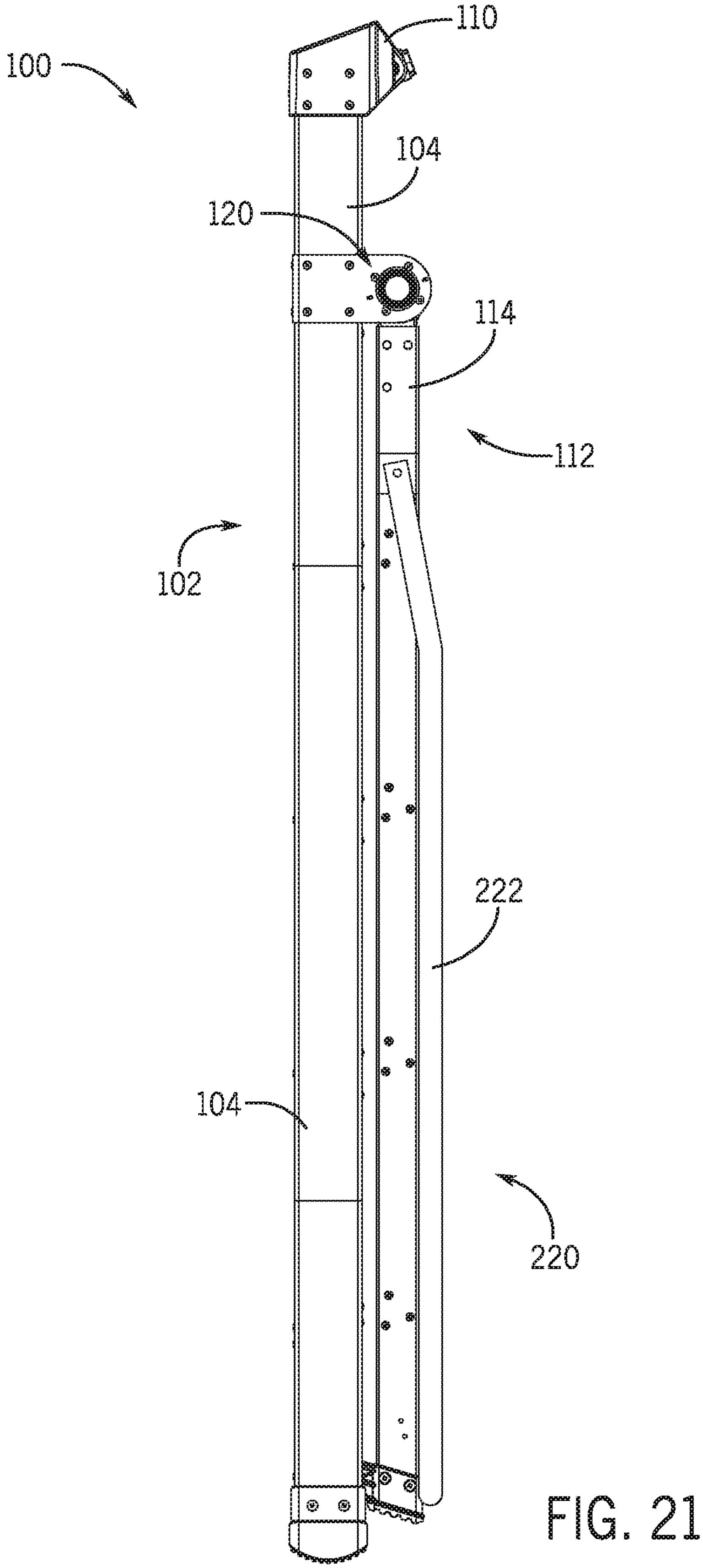
FIGS. 21-23 are various views of the ladder shown in FIGS. 19 and 20 in various states.
Figure 23:
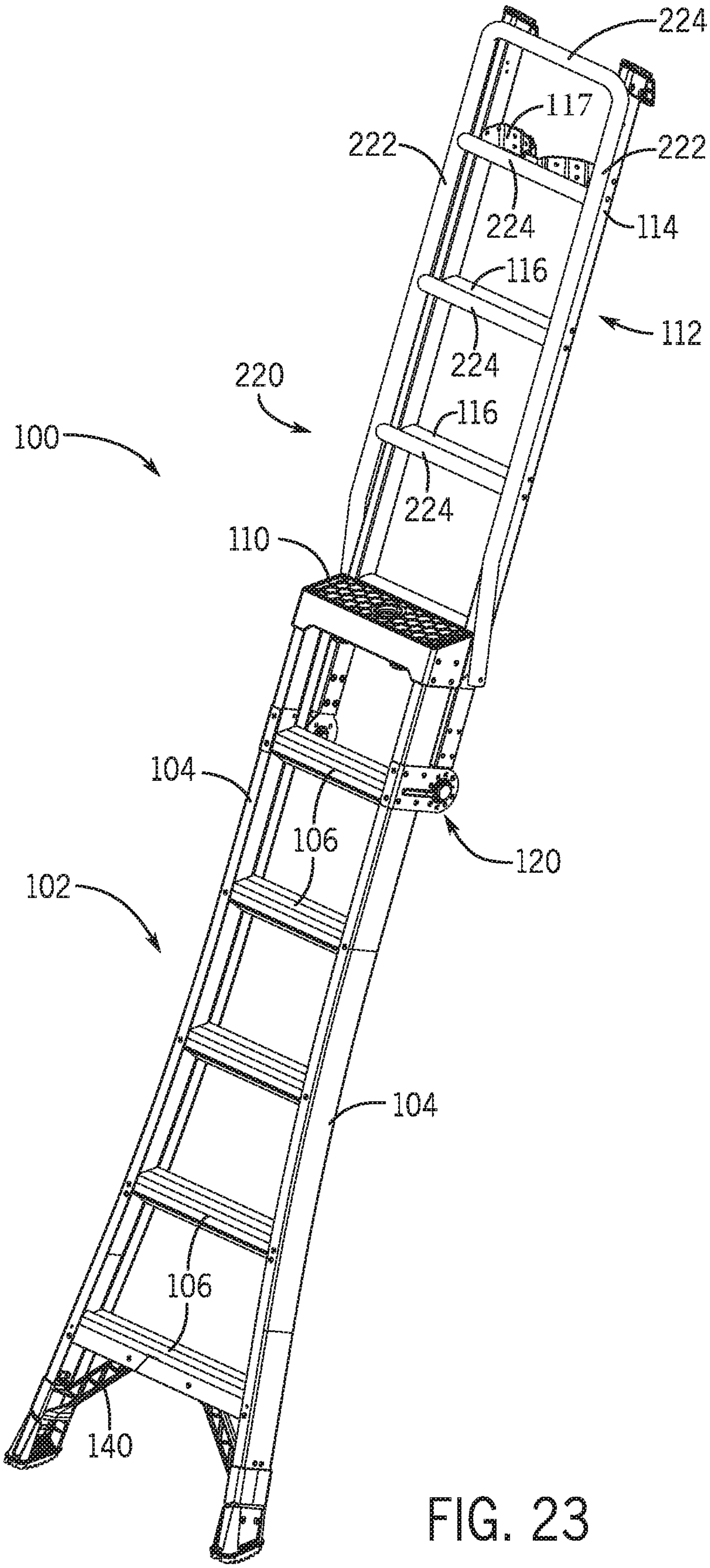

When the rail member 220 is positioned in a "stored" position relative to the rear rails 114, such as shown in FIGS. 19-21, the ladder 100 may still be placed in other configurations such as a straight ladder or a leaning ladder configuration. For example, as shown in FIG. 23, the rail member 220 may rotate with the second assembly 112 relative to the first assembly 102, into a straight ladder configuration, where at least some of the cross-members 224 are aligned with the rear rungs 116, enabling a user to climb and stand on the rear rungs 116, with the cross-members 224 providing increased surface area on which they may stand.

Figure 24:
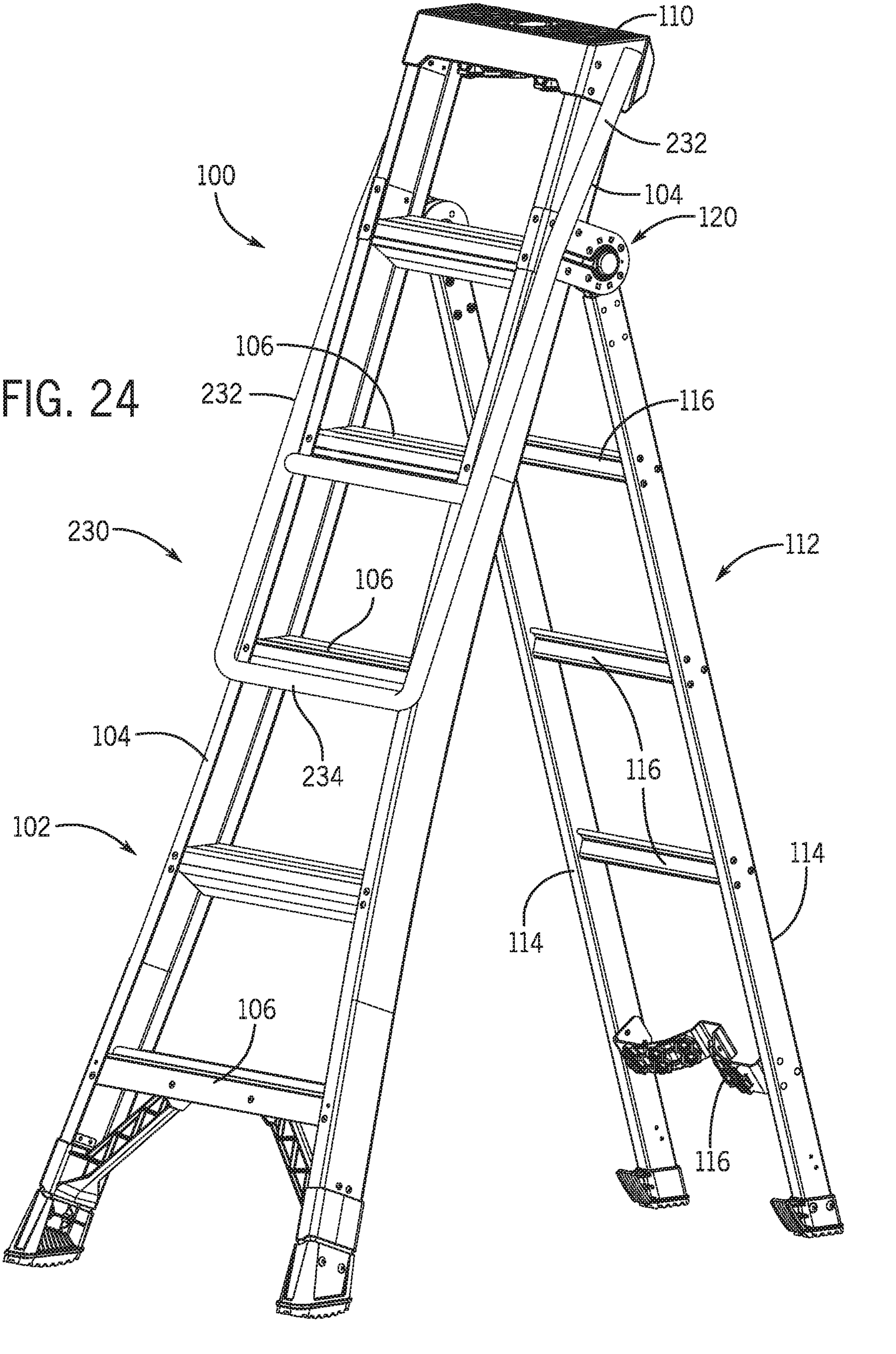
FIG. 24 is a perspective view of a ladder in accordance with an embodiment of the present disclosure.

Referring briefly to FIG. 24, in other embodiments, a rail member 230, similar to that shown and described with respect to FIGS. 19-23, may be associated with the first assembly 102 rather than the second assembly 112. For example, the rail member 230 may be pivotally or rotatably coupled to the front rails 104, and selectively rotatable from the position shown in FIG. 24, to an upright position such that a substantial portion thereof extends upwards and above the top cap (similar to the rail member 220 shown in FIG. 22). As with the embodiment shown and described with respect to FIGS. 19-23, the rail member 230 may include side members 232 and cross-members 234 extending between, and coupled to, the side members 232. At least some of the cross-members 234 may be aligned with associated front rungs 106, acting as depth extenders and providing an increased surface area on which a user may stand. As with the rail member 220 previously described, the rail members 230 may be locked into various positions by appropriate mechanisms.

Referring now to FIGS. 25A-38, a hinge assembly 120 is shown. The hinge assembly 120 includes a first mounting leg 250 and a second mounting leg 252. In some embodiments, the first mounting leg 250 may be configured for fixed coupling with the first assembly 102 (e.g., direct coupling with an associated front rail 104). The second mounting leg 252 may be configured for fixed coupling with the second assembly (e.g., direct coupling with an associated rear rail 114). As will be described hereinbelow, the first leg 250 and second leg 252 are selectively rotatable, relative to each other, about an axis 240, and may be locked in a variety of different positions relative to each other.

Figure 27:
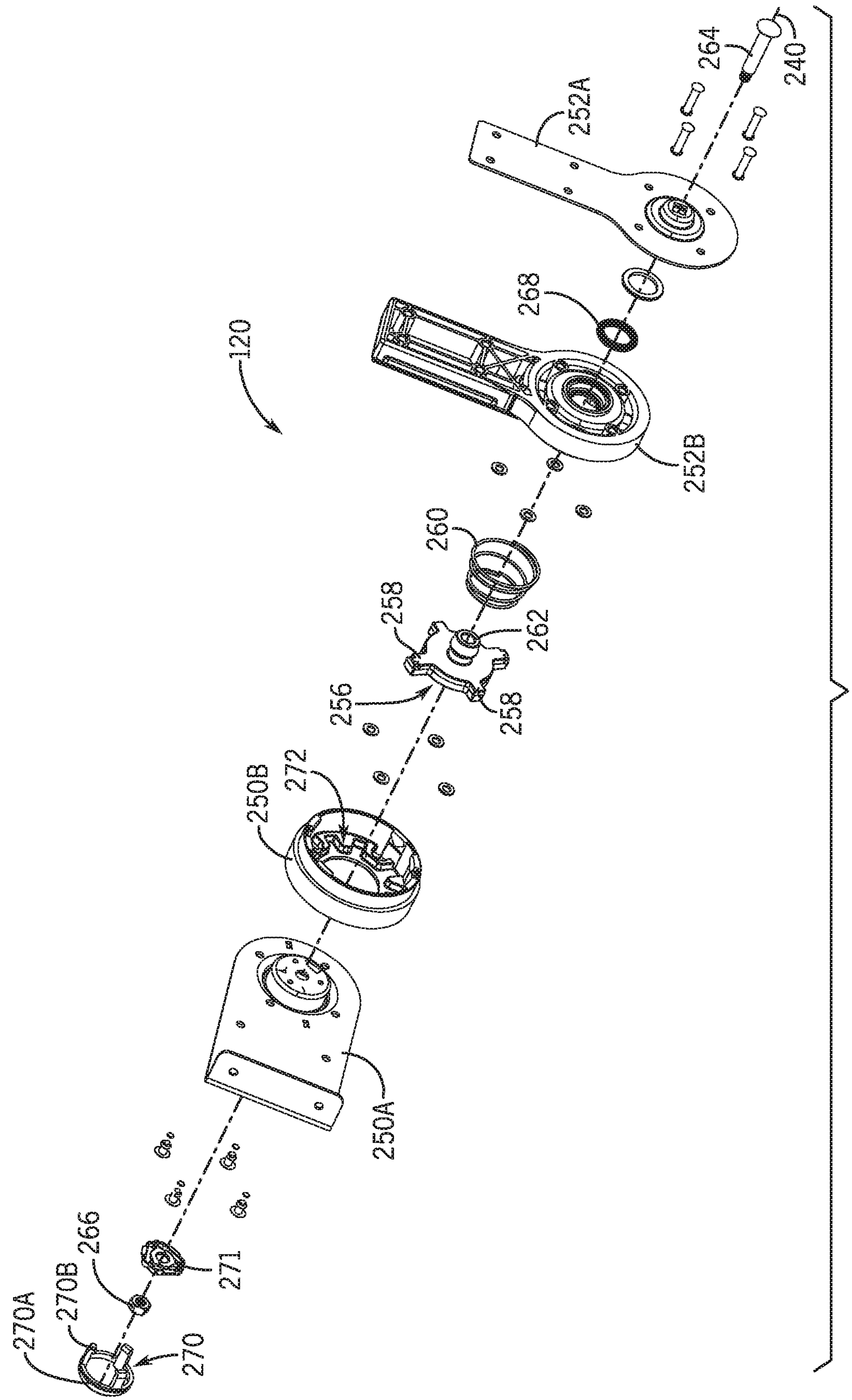
FIG. 27 is an exploded view of the hinge assembly shown in FIGS. 25A and 25B.
Figure 28:
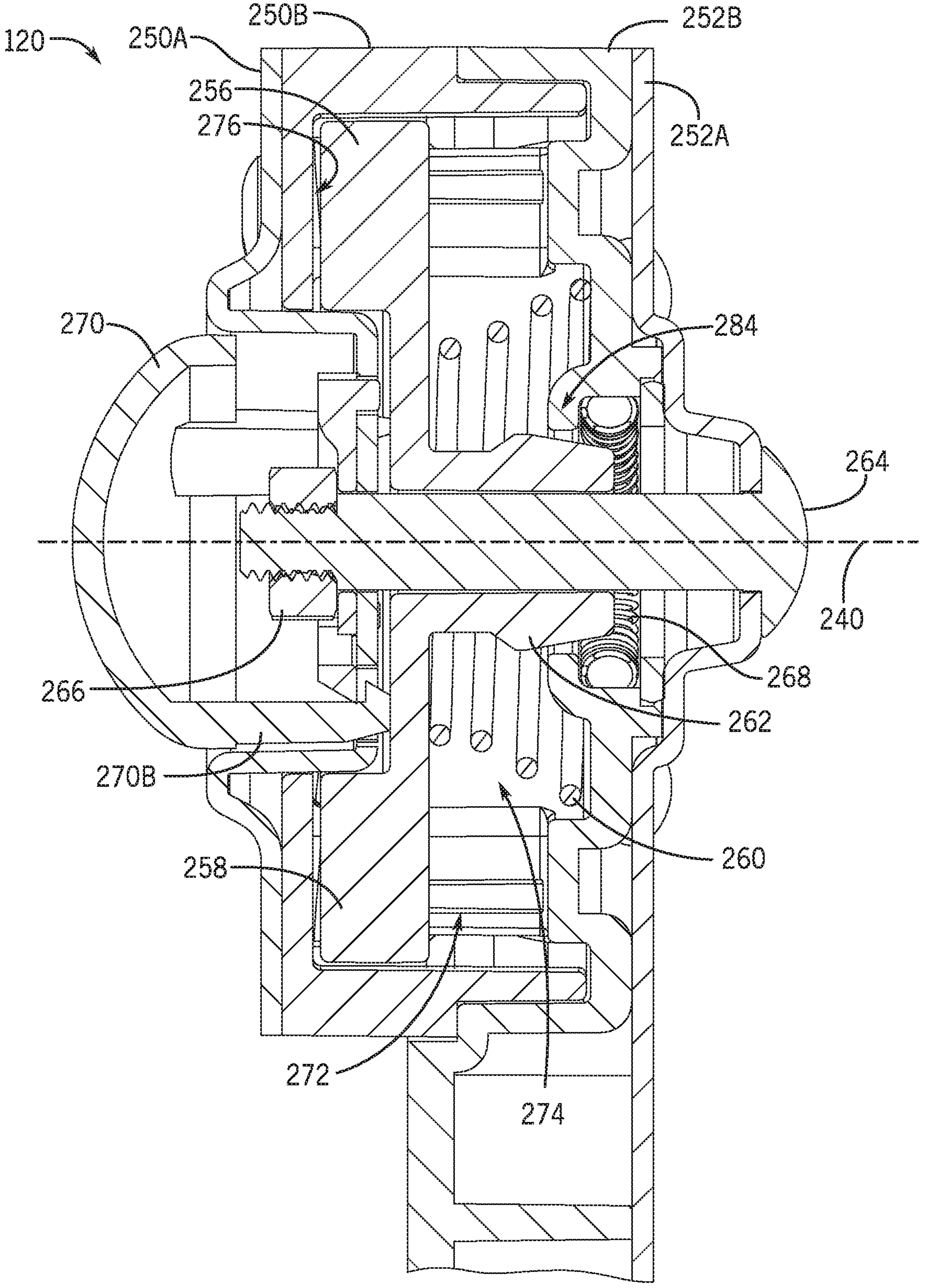
FIG. 28 is a sectional view of the hinge assembly shown in FIGS. 25A and 25B while in a locked state.
Figure 29:
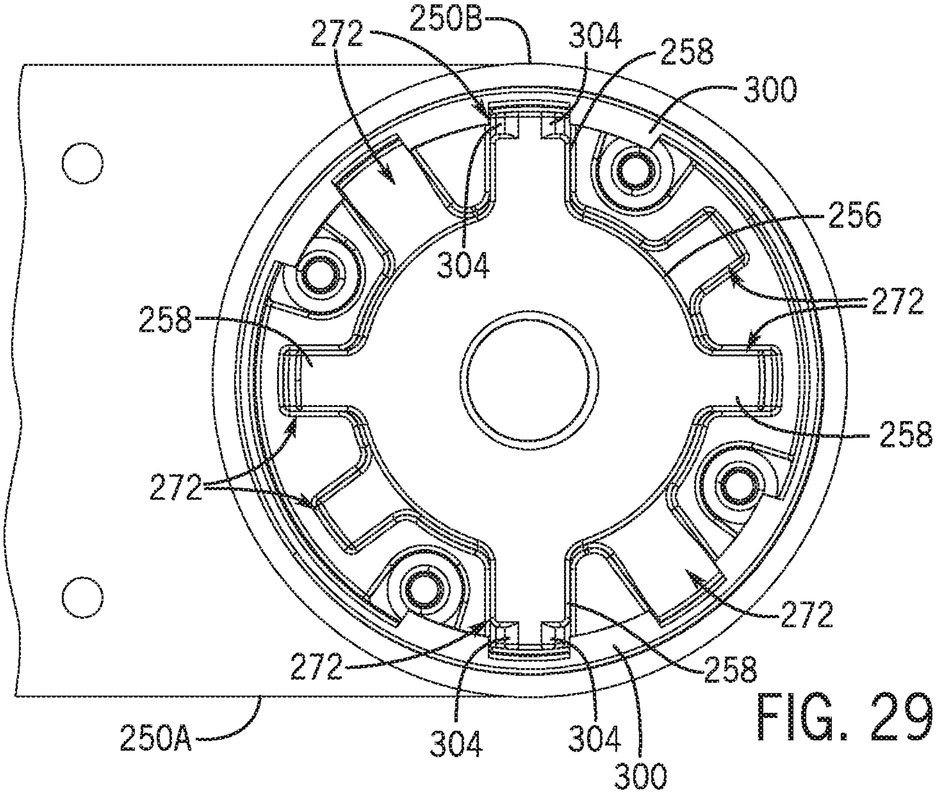
FIGS. 29-31 are various additional views of the hinge assembly shown in FIGS. 25A and 25B while in a locked state.
Figure 30:
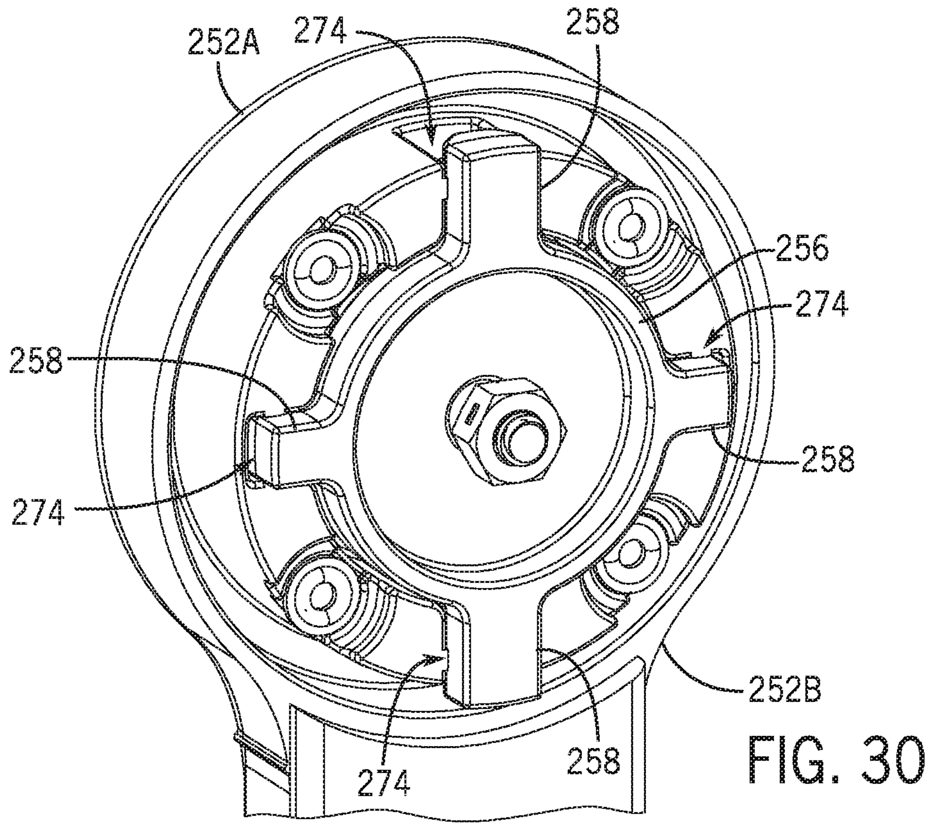
Figure 31:
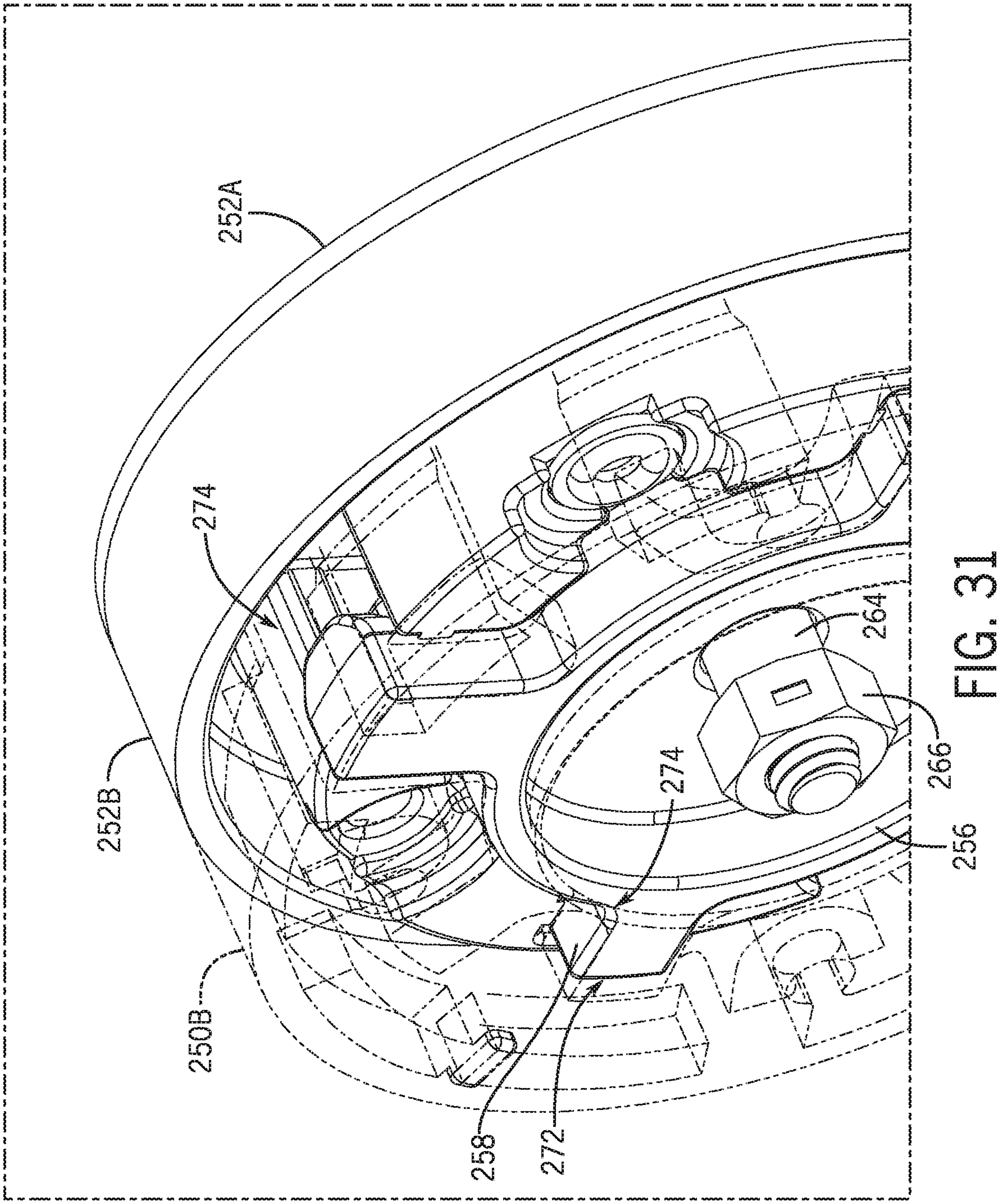

FIG. 27 depicts an exploded view of the hinge assembly 120 and its various parts according to an embodiment of the present disclosure. In one embodiment, the first leg 250 may include a plate member 250A and a lock ring 250B fixedly coupled therewith. Likewise, the second leg 252 may include a plate member 252A and a lock ring 252B fixedly coupled therewith. A geared member 256 (e.g., a member having one or more projecting cogs 258 extending from a periphery thereof) and a biasing member, such as a spring 260, are positioned between the two lock rings 250B and 252B. The geared member 256 includes a shaft member 262 that extends along the rotational axis 240 of the hinge assembly 120 and, in some embodiments, may at least partially extend through an opening in the second lock ring 252B. In other embodiments, the second lock ring 252B may not have an opening, and the shaft 262 may not extend beyond the second lock ring 252B.

A hinge pin 264 extends through openings in the plates 250A and 250B, the lock rings 252A and 252B, and the geared member 256 along the rotational axis 240. A nut 266 or other fastener may be coupled with the pin 264 to couple the assembly together.

A detent member or mechanism may be associated with the geared member 256 to hold the geared member 256 in a desired position along the axis 240 between the two lock rings 252A and 252B as will be described in further detail below. In some embodiments, the detent mechanism may include an annular coiled spring 268 (sometimes referred to as a canted spring) positioned in a recessed portion of the second lock plate 252B and adjacent the associated plate member 252A (although other configurations are also contemplated for the location of the spring and associated structures). An actuating button 270 may have a first portion 270A located externally of the first plate member 250A, and have at least another portion 270B thereof (e.g., axial fingers) that extends through the plate member 250A as well as a retainer member 171 (also shown in FIG. 26) and is configured for establishing contact with the geared member 256. Various fasteners (e.g., bolts, screws, rivets, clips, washers, etc.) may be used to couple the components of the hinge assembly together, in addition to the pin 264 and nut 266.

Figure 25A:
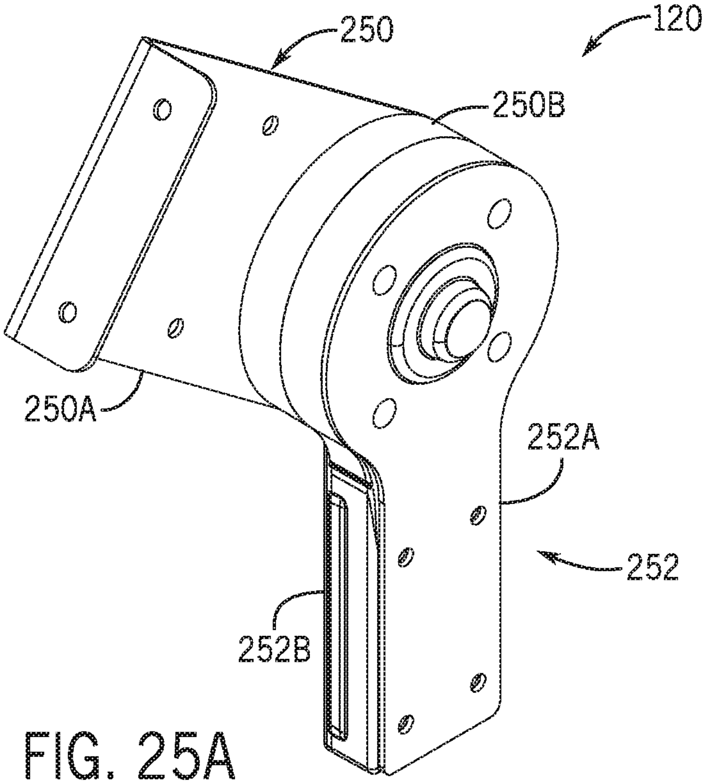
FIGS. 25A and 25B are right and left perspective views of a hinge assembly which may be used with a ladder according to an embodiment of the present disclosure.
Figure 25B:
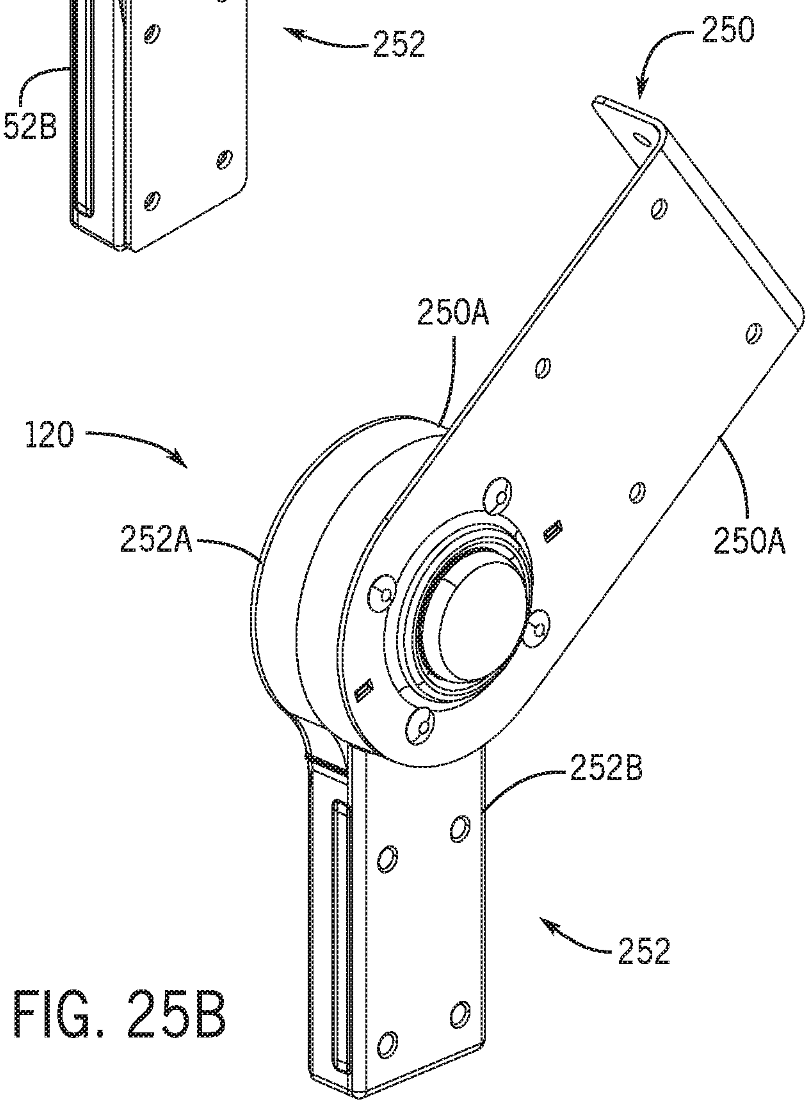
Figure 26:
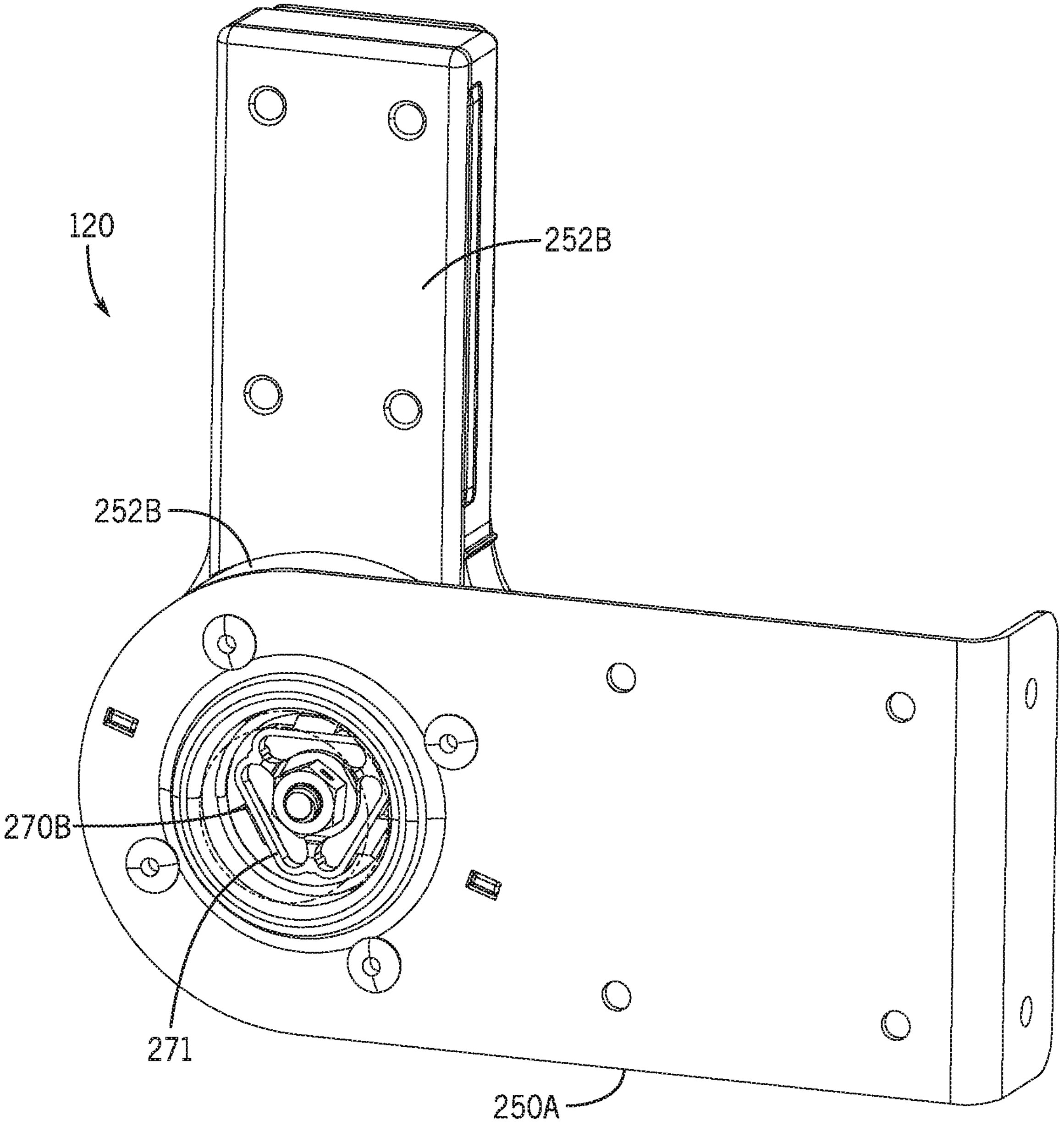
FIG. 26 is a front view of the hinge assembly shown in FIGS. 25A and 25B with a portion made transparent to depict certain components.

In operation, the two legs 250 and 252 may be locked at a given angular orientation relative to each other, such as in the position shown in FIGS. 25A and 25B, or at a variety of other positions. As illustrated in FIGS. 28-31, when the hinge assembly 120 is in a locked state, the geared member 256 is axially positioned such that one or more of its cogs 258 are partially disposed in an associated recess 272 of the first lock ring 250B and partially disposed within an associated recess 274 of the second lock ring 252B—the two recesses 272 and 274 being aligned with one another. Thus, the cog 258 provides an interference structure, preventing the first lock ring 250B and the second lock ring 252B from rotating relative to one another about the axis 240. As seen best in FIG. 28, when in a locked position, the geared member 256 is biased axially against an inner face 276 of the first lock ring 250B by the biasing spring 260. The biasing spring 260 may be placed between the second lock ring 252B and the geared member 256, and in some embodiments, positioned concentrically about the shaft member 262 of the geared member 256.

Figure 32:
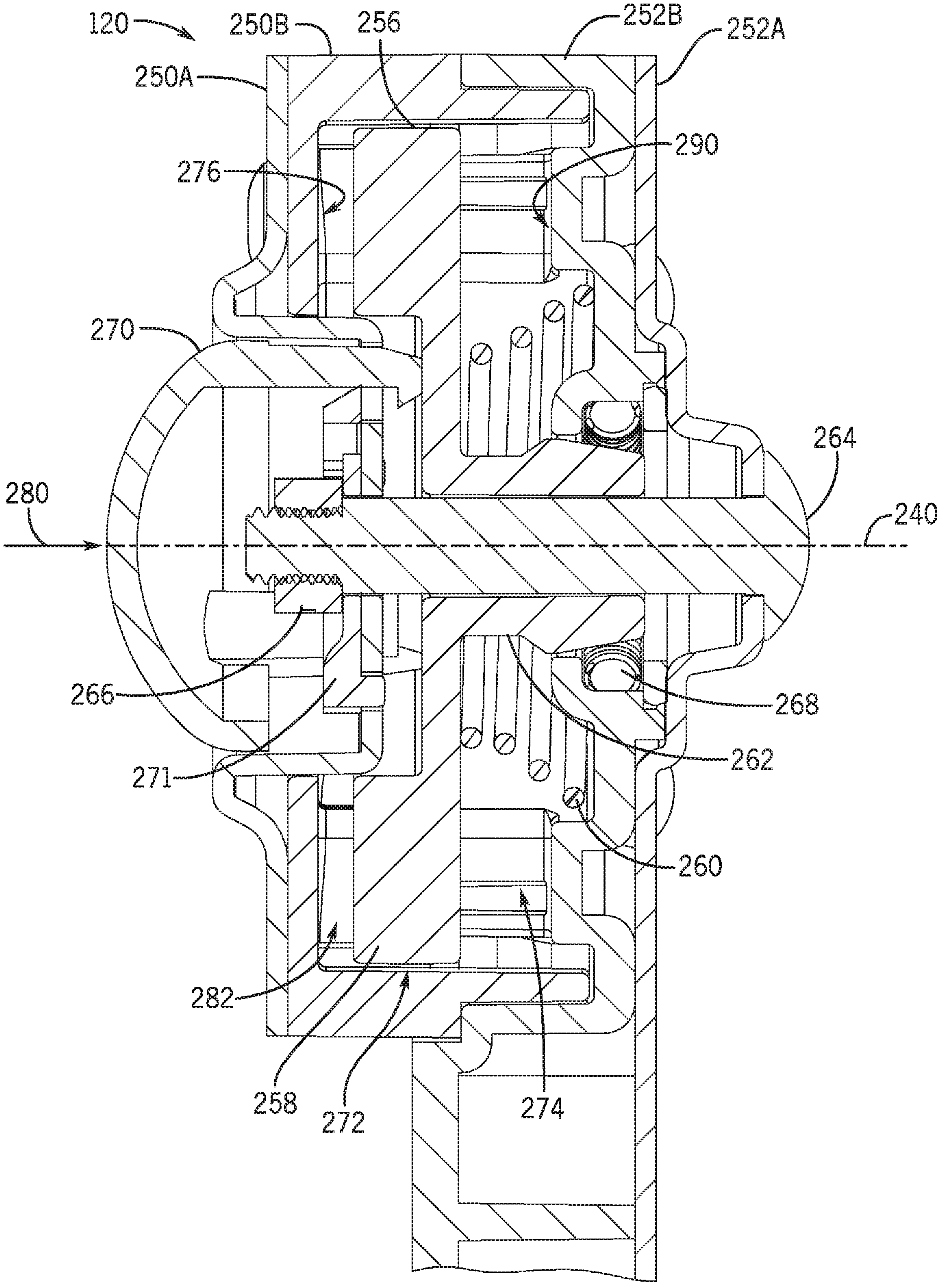
FIGS. 32 and 33 are sectional views of the hinge assembly shown in FIGS. 25A and 25B while transitioning from a locked state to and unlocked state.
Figure 33:
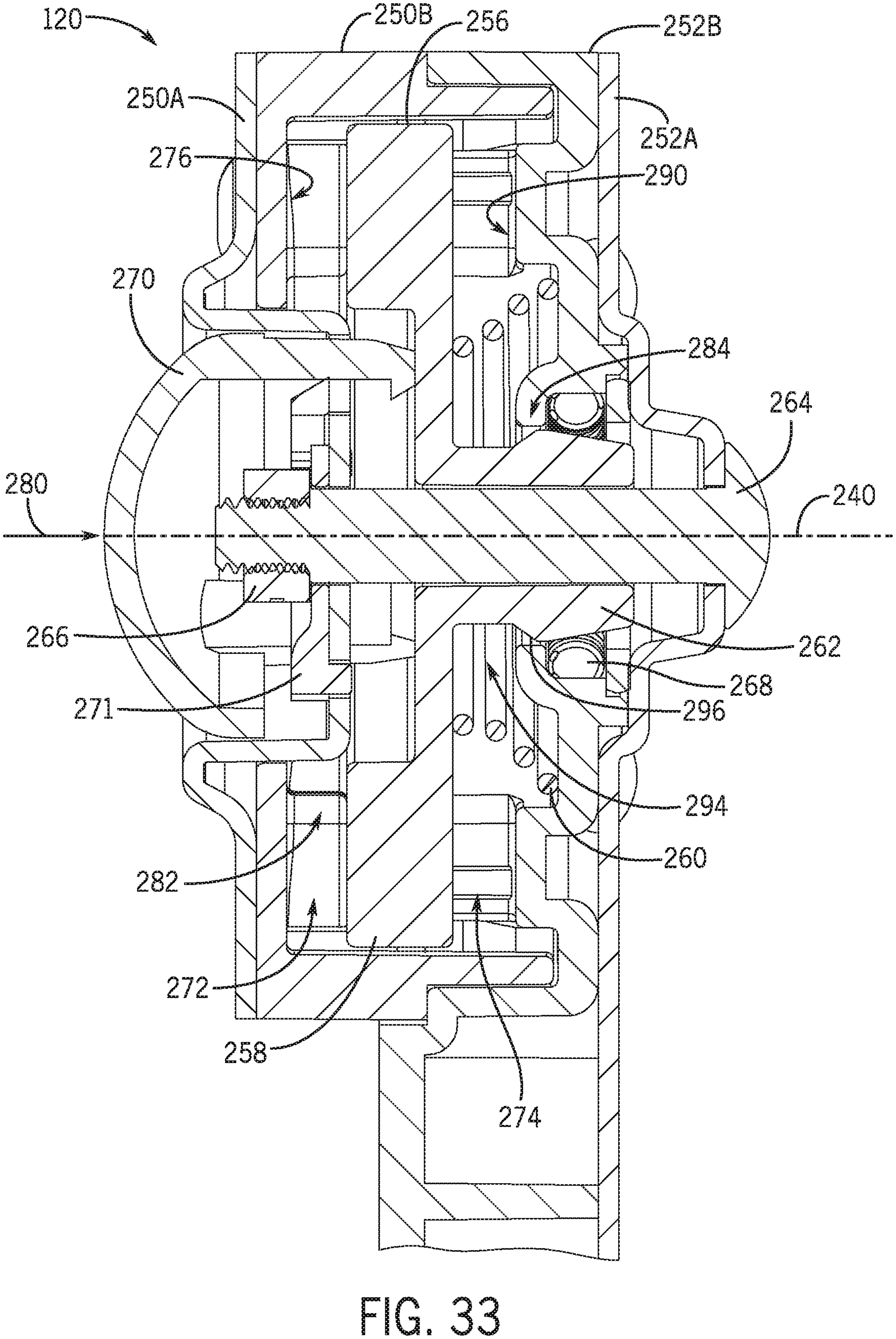

Referring to FIGS. 32 and 33, when a user desires to unlock the hinge 120 and rotate the leg members 250 and 252 to different relative positions, a force is applied to the button 270 in the axial direction towards the geared member 256 as indicated by arrow 280. This force overcomes the biasing force of the spring 260 and effects displacement of the button 270, and thus displacement of the geared member 256, toward the second lock ring 252B. For example, comparing FIG. 32 with FIG. 28, a gap 282 is shown in FIG. 32 between the geared member 256 and the inner face 276 of the first lock ring 250B. Similarly, the gap 282 is enlarged in FIG. 33 as compared to that shown in FIG. 32, showing further displacement of the geared member 256 along the axis 240 away from the inner face 276 of the first lock ring along the axis 240. Additionally, in reviewing FIGS. 32 and 33, one can see the shaft member 262 being displaced along the axis 240 through an opening 284 of the second lock ring 252B and toward the second plate member 252A.

Figure 34:
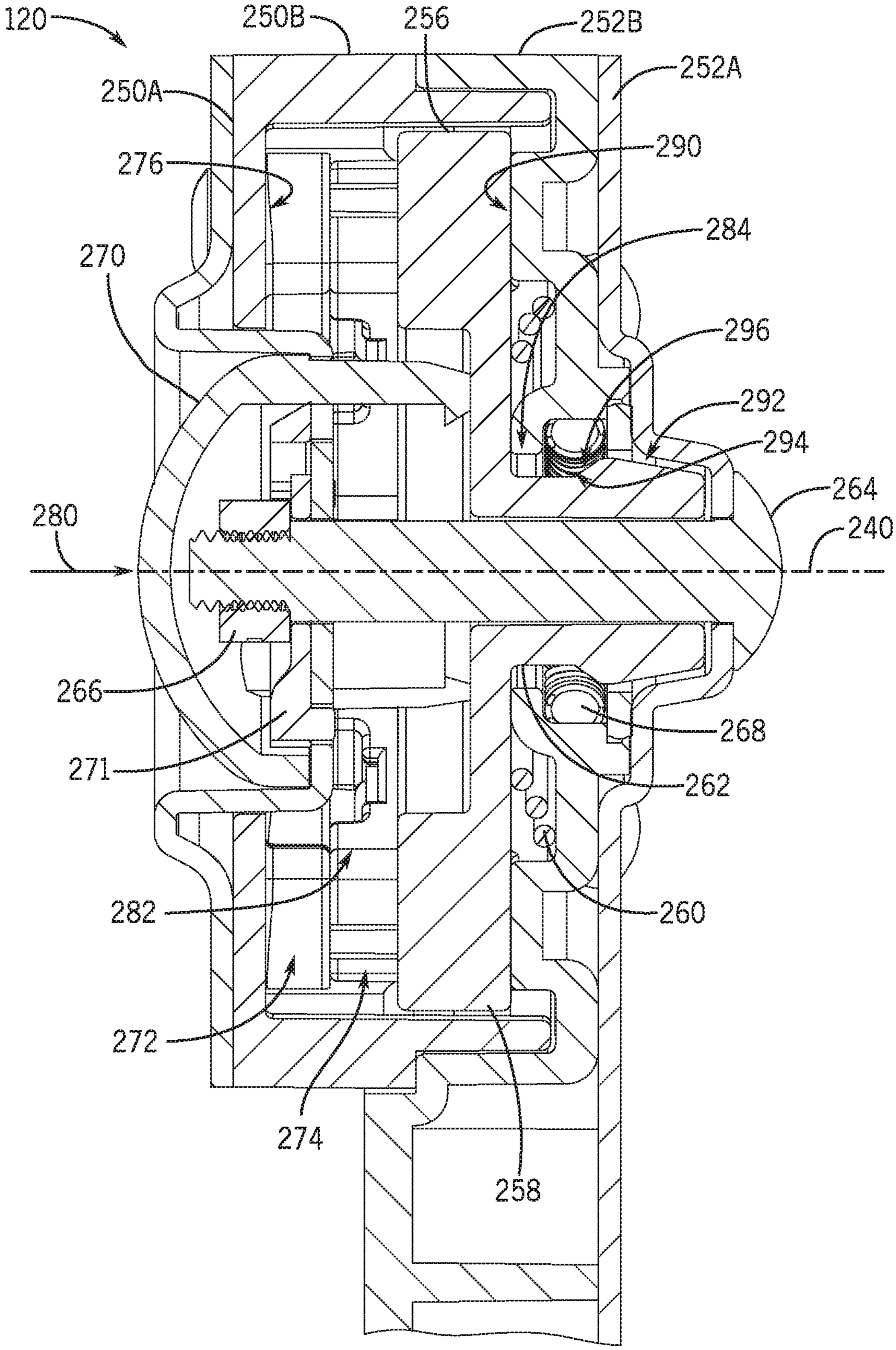
FIG. 34 is a sectional view of the hinge assembly shown in FIGS. 25A and 25B while in an unlocked state.
Figure 36:
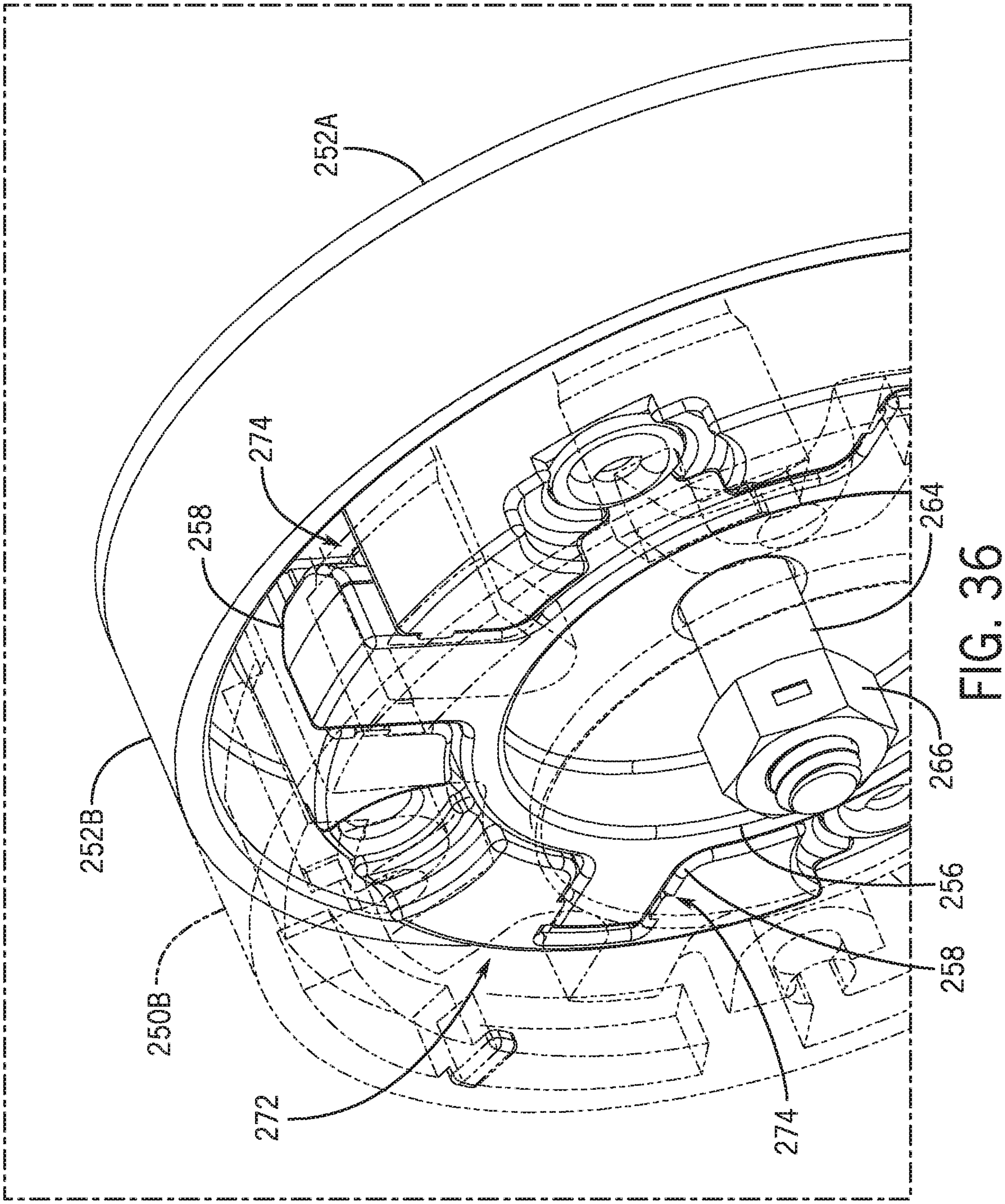
FIGS. 35-37 are various additional views of the hinge assembly shown in FIGS. 25A and 25B while in an unlocked state.
Figure 37:
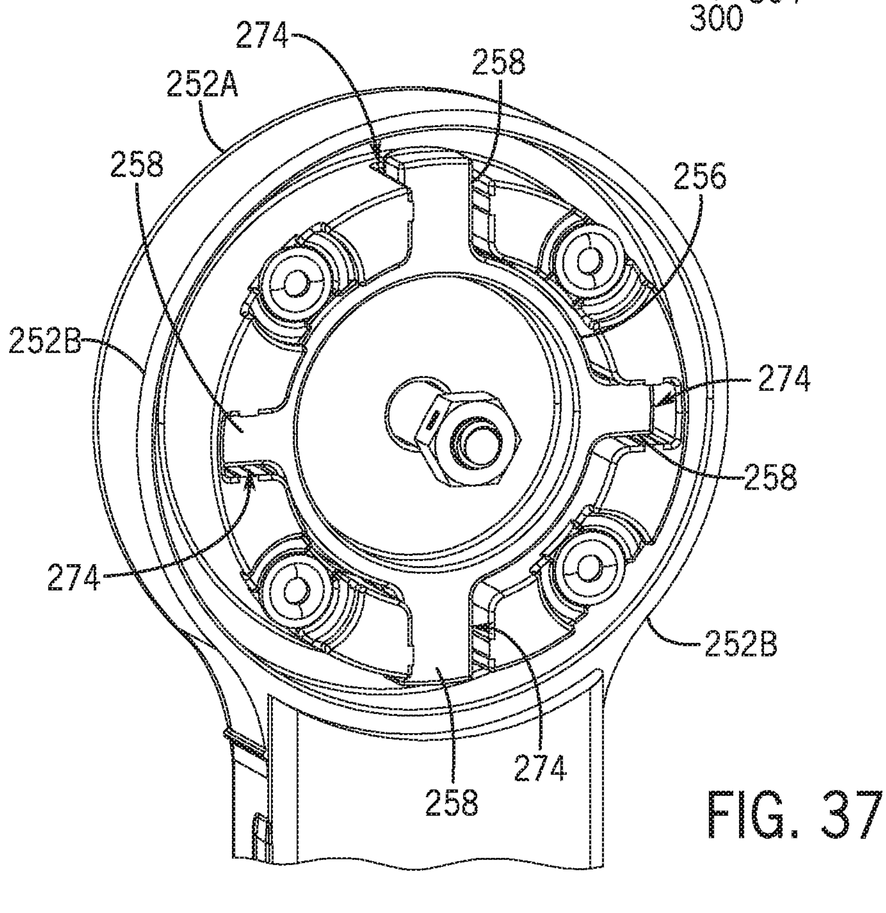
Figure 40:
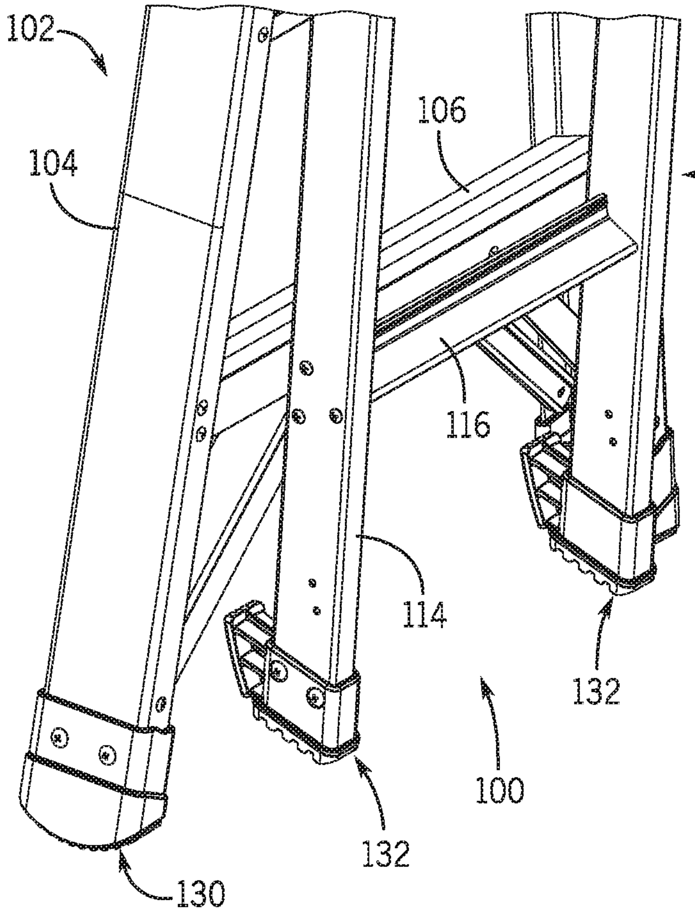
FIG. 40 shows a lower portion of a ladder incorporating the foot shown in FIG. 39 in a stored or collapsed state.

Referring to FIGS. 34-37, when the geared member 256 has become sufficiently displaced along the axis 240, the cogs 258 become axially displaced and disengaged from the recesses 272 of the first lock ring 250B while being further displaced into the recesses 274 of the second lock ring 252B. For example, as shown in FIGS. 36 and 37, the cogs 258 may be completely positioned within the recesses 274 of the second lock ring 252B while FIG. 34 shows the geared member 256 being axially positioned to contact an inner face 290 of the second lock ring 252B. Of course, other configurations are contemplated wherein the cogs are disengaged from the recesses 272 of the first lock ring 250B without necessarily abutting any axial surface (e.g., inner face 290) of the second lock ring 252B.

When in this position, the shaft member 262 has become displaced such that a first ramped section 292 is displaced through the opening 284 of the second lock ring 252B and beyond the annular spring 268 (which may be axially held in place by a washer or other structure) which radially contracts about an annular recessed portion 294 of the shaft and abuts a shoulder 296 positioned between the ramped section 292 and the recessed portion. The annular spring thus holds the shaft member 262 and gear member 256 in the position shown in FIGS. 34-37 (keeping the hinge assembly "unlocked") until action is taken to release the shaft member 262 and gear member 256 from this position as will be described below. It is noted that the configuration of the shaft member 262 and the annular spring 268 acts as a detent or detent-like mechanism in holding the geared member 256 in a desired position until a prescribed force is applied to the gear member for its release. In other embodiments, other locking mechanisms, including other detent arrangements, may be used to hold the geared member 256 in a desired position during operation of the hinge.

Figure 38:
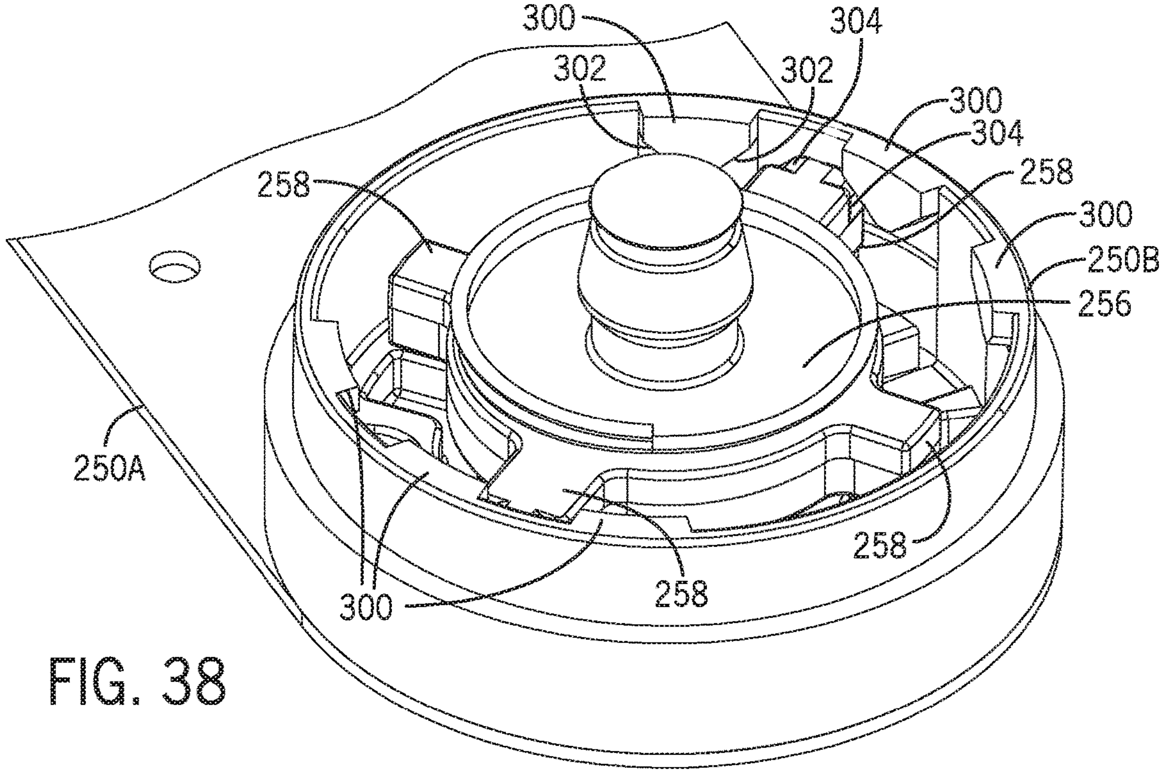
FIG. 38 shows a portion of the hinge assembly according to an embodiment of the present disclosure.

Referring to FIG. 38, the first lock ring 250B may include a plurality of circumferentially-spaced, radially-inward extending protrusions 300 that may each include a pair of ramped or angled surfaces 302. One or more of the cogs 258 of the geared member 256 may additionally include chamfers 304 (which may referred to as circumferentially oriented chamfers) formed at or near their radially outermost extents which are positioned and oriented to engage the ramped surfaces 302. When the hinge assembly 120 is in an unlocked state (e.g., see FIGS. 34-37), and the leg members 250 and 252 are rotated relative to each other, the ramped surfaces 302 of the radial protrusions 300 engage with the cogs 258 (e.g., with the chamfered portions 304), pushing the geared member 256 axially back towards the first lock ring 250B until the shaft member 262 is retracted a sufficient distance to become released from the annular spring 262 (placing the geared member 256 in axial position similar to that shown in FIG. 33). Upon further rotation of the leg members 250 and 252 relative to each other, some of the recesses 272 of the first lock ring 250B become aligned with the cogs 258 of the geared member 256 and the spring 260 forces the geared member 256 axially further towards the first lock ring 250B, locking the two leg members 250 and 252 from moving relative to each other. The hinge 120 may be repeatedly unlocked, rotated, and locked using a similar sequence of events, enabling the leg members 250 and 252 to be selectively locked in a variety of different relative positions including those that correspond with a step ladder configuration, a straight ladder configuration, and a leaning ladder, or stored ladder configuration.

It is noted that, in other embodiments, other hinge assemblies may be used with the ladder 100. Other, non-limiting examples of hinges that may be used with ladders described herein is set forth in U.S. patent application Ser. No. 15/622,343, filed on Jun. 14, 2017, and U.S. Provisional Patent Application No. 62/514,348, filed on Jun. 2, 2017, the disclosures of which are incorporated by reference herein in their entireties.

Figure 39:
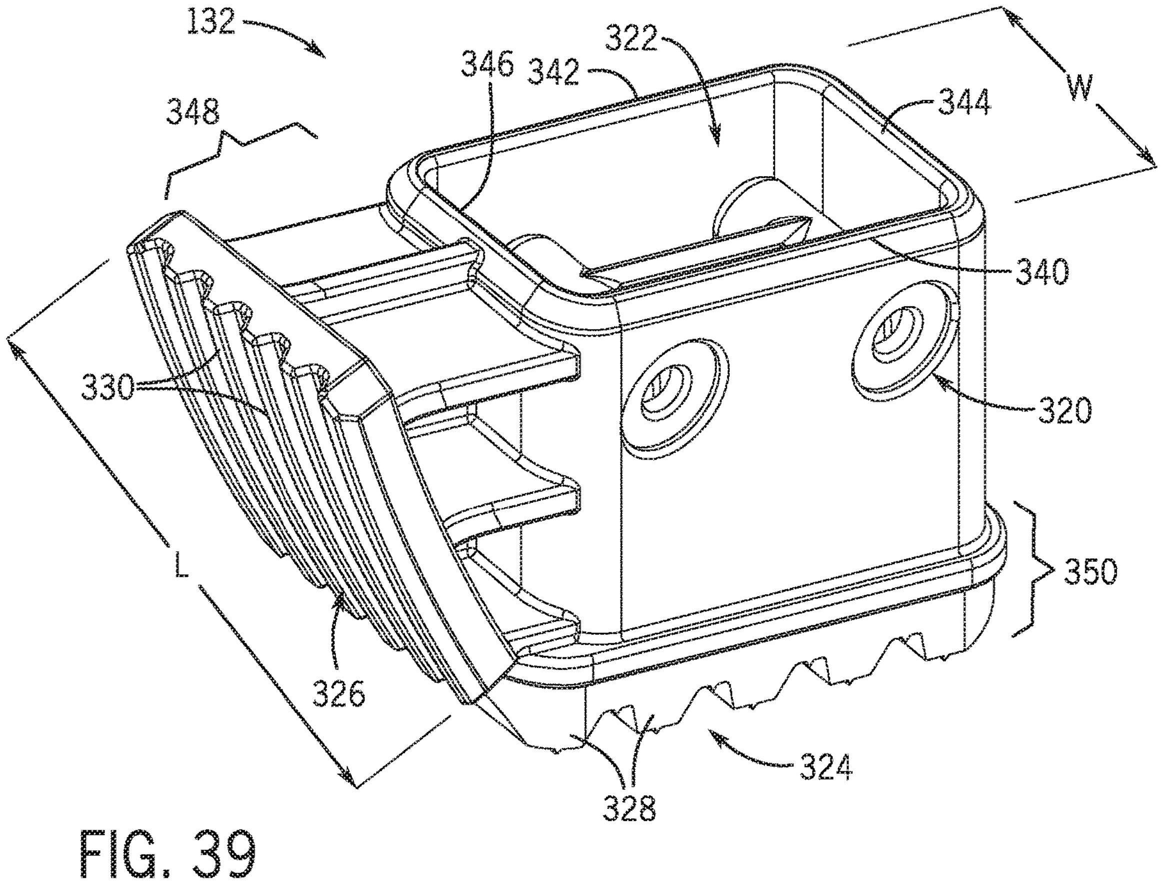
FIG. 39 is a perspective view of a foot for a ladder having an integrated wall pad according to an embodiment of the disclosure.
Figure 35:
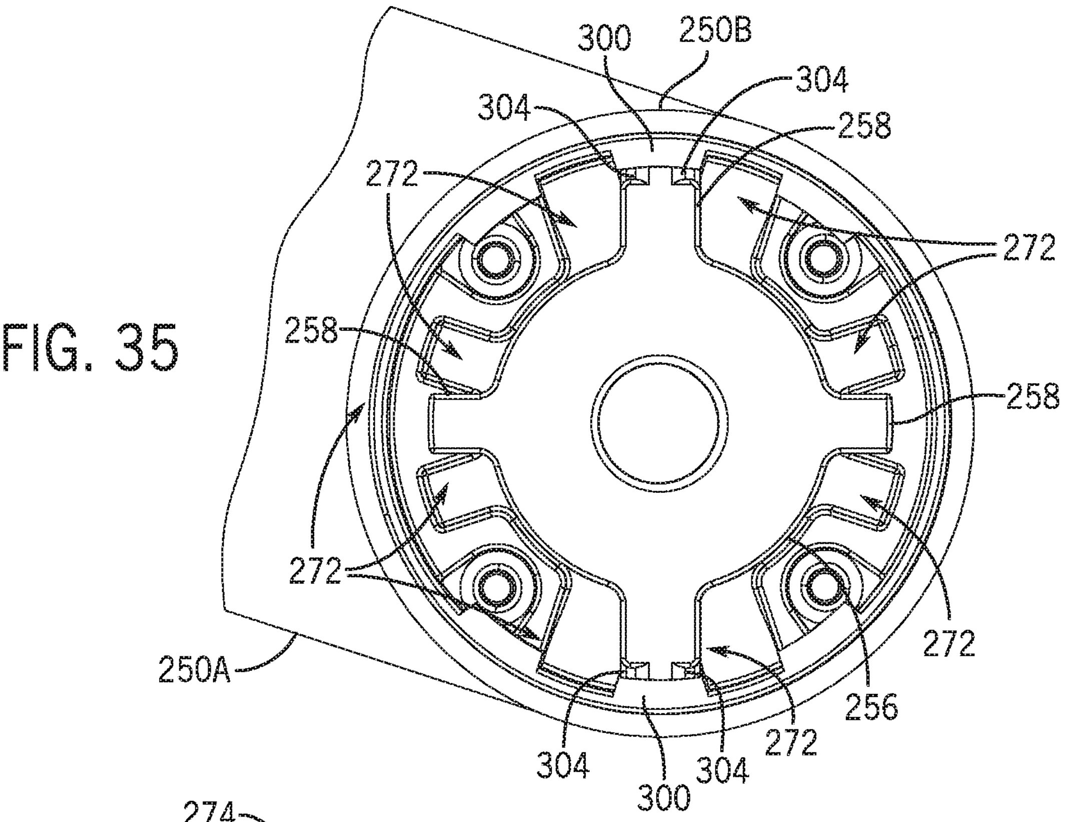

Referring to FIGS. 39-43, a foot 132 is shown in accordance with another embodiment of the disclosure. The foot 132 may include a body portion 320 having an opening 322 formed therein to receive a portion of a rail (e.g., rail 114 of the second assembly 112). In one embodiment, the opening 322 may be configured as to receive a rail having a rectangular- or square-shaped profile such as shown in FIG. 39. In other embodiments, the opening may be configured to receive other profiles or cross-sectional shapes including, for example, rails having a C-shaped or H-shaped cross-sectional profile.

Figure 41:
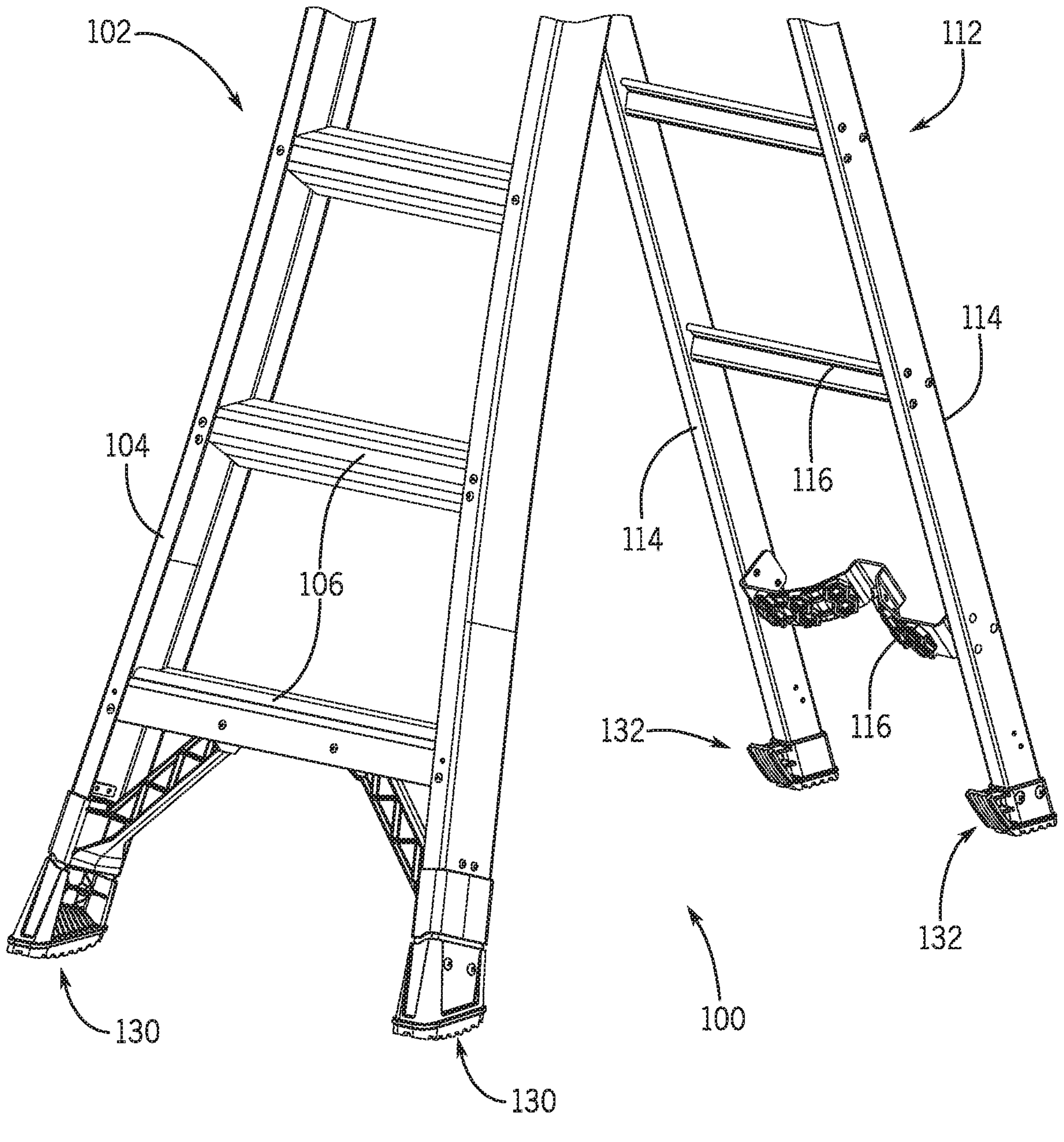
FIG. 41 shows a lower portion of a ladder incorporating the foot shown in FIG. 39 with the ladder in a deployed, step-ladder configuration.
Figure 43:
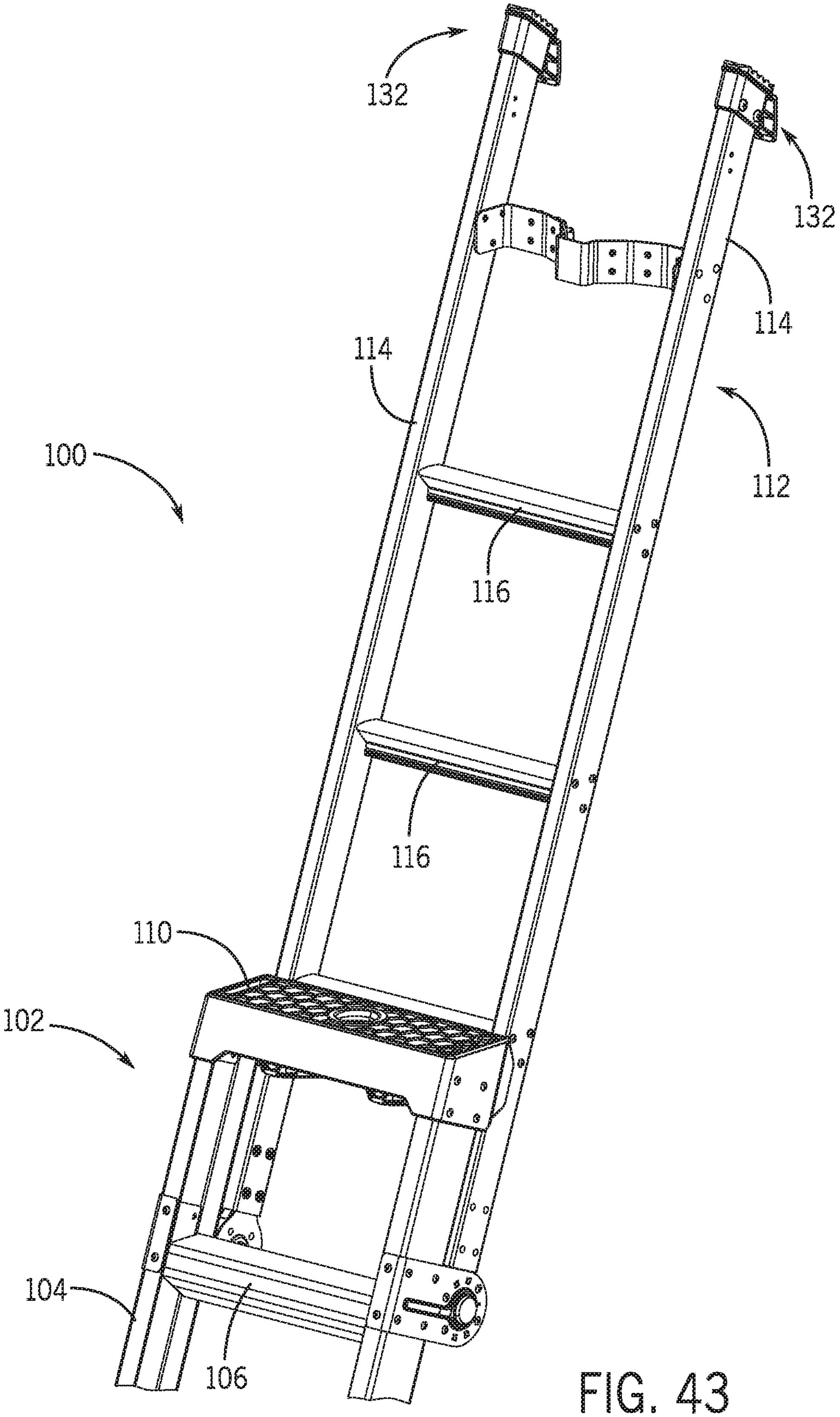
FIG. 43 is a perspective view of a portion of a ladder incorporating the foot shown in FIG. 39 with the ladder in a deployed, straight-ladder configuration.

The foot includes a first surface engaging portion 324, which may be referred to as a horizontal surface engaging portion, and a second surface engaging portion 326, which may be referred to as a vertical surface engaging portion. Each of the first and second surface engaging portions 324 and 326 may be configured to engage a support surface and resist movement of the foot 132 (and, thus, the ladder) relative to the support surface. The surface engaging portions 324 and 326 may include a variety of surfaces having grooves, ribs, or other traction features formed therein. For example, the first surface engaging portion 324 may include a plurality of ribs or ridges 328 extending across a width 'W' of the foot 132 (e.g., extending in a direction parallel with, or substantially parallel with, an axis that extends through both feet 132 of the ladder 100). Adjacent ridges or ribs 328 may define parallel grooves extending therebetween. Thus, when the ladder 100 is in a step ladder state (e.g., as shown in FIG. 41), the first surface engaging portion 324 will assist in resisting sliding or slipping, relative to the ground or other support surface, in a direction that is substantially perpendicular to the length of the ribs or ridges 328. It is noted that the general surface geometry of the first surface engaging portion 324 may be arcuate, such as shown in the drawings, or may be generally flat or planar, or exhibit some other geometry.

Additionally, in one embodiment, the second engaging surface 326 may include a plurality of ribs or ridges 330 extending along a length 'L' in a direction that is substantially perpendicular to the ribs or ridges 328 of the first surface engaging portion 324. It is noted that the second surface engaging portion 326 may extend the entire height of an adjacent rear wall 346. Stated another way, the second surface engaging portion 326 may extend from approximately an upper end of the foot 132 (along a plane where the opening 322 is located) down to the first surface engaging portion 324.

The second set of ribs or ridges 330 may also define generally parallel grooves between adjacent ridges 330 and be configured to resist or impede sliding or slipping, relative to a vertical wall or other support surface, in a direction substantially perpendicular to the length of the ribs or ridges 330. Thus, when the ladder 100 is in a straight ladder configuration (FIGS. 42 and 43), the second surface engaging portion 326 may rest against a wall (or other support structure) and resist sliding "sideways" along the surface of the wall. Of course, other anti-slip features, and other orientations or arrangements of anti-slip features are also contemplated as being formed in the surface engaging portions (e.g., patterns of raised protrusions having round, diamond or other polygonal geometries).

The body 320 may be defined by spaced apart side walls 340 and 342, a front wall 344 extending between the side walls and a rear wall 346 spaced from the front wall 344 and extending between the side walls (it being noted that "front" and "rear" are simply used for purposes of convenience in designation of the different walls and that such should not be considered limiting). A thickened section 348, which may also be referred to as a cushioned section, is positioned adjacent the rear wall 346 of the body 320. Likewise, a thickened or cushioned section 350 may be positioned at the bottom of the foot 132, opposite the opening 322 and below a floor of the body 320 (not shown), which is coupled with at least one of the walls (340, 342, 344, 346) or any combination of the walls, including all of them. The thickened or cushioned portions 348 and 350 may comprise a material that is softer and more yielding than that of the body 320 (e.g., the walls 340, 342, 344, 346 and the floor). In some embodiments, the thickened portions 348 and 350 may include a non-marking rubberized or elastomer material that is overmolded onto a plastic body material. In other embodiments, the entire foot 132 may be formed as a unitary, homogenized component (or a substantially unitary, homogenized component) comprising a non-marking rubberized or elastomer material. The ridges and grooves of the surface engaging portions 324 and 326 may be formed in a surface of the thickened portions 348 and 350, respectively.

Figure 42:
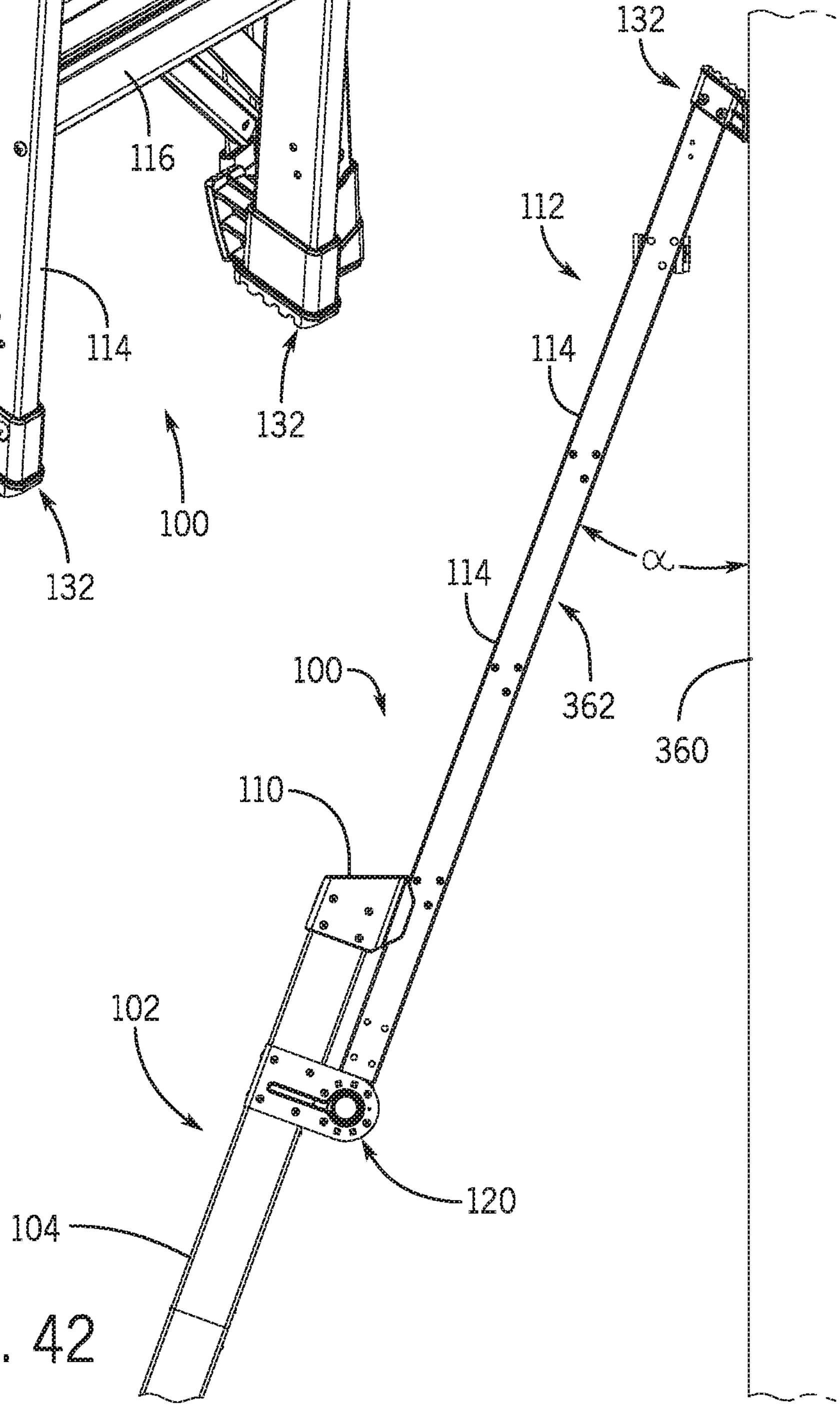
FIG. 42 is a side view of a portion of a ladder incorporating the foot shown in FIG. 39 with the ladder in a deployed, straight-ladder configuration.

The second surface engaging portion 326 (associated with the thickened or cushioned portion 348 positioned along the rear wall 346 of the body 320) may be configured to exhibit a surface oriented at a desired angle relative to the longitudinal length of the rail to which it is coupled. Thus, for example, when the ladder 100 is in a straight ladder configuration and placed against a wall or other vertical support surface 360 (as shown in FIG. 42), the second surface engaging portion 326 may form a projected angle $\alpha$ with respect to a rear surface 362 of the associated rear rail 114. In some embodiments, the angle $\alpha$ may be between approximately 13 degrees and 17 degrees. In some embodiments, the angle $\alpha$ may be between approximately 14 degrees and 16 degrees. In one embodiment, the angle $\alpha$ may be approximately 15 degrees. Stated another way, the second surface engaging portion 326 may be angled such that when a ladder is leaned against a vertical support at a desired angle, the surface plane of the second surface engaging portion 326 is parallel, or substantially parallel, with the vertical support surface 360.

In some embodiments, the foot 132 may be coupled to a rear rail 114 by fasteners (e.g., rivets, screws, etc.). In other embodiments, the foot 132 may be coupled with a rear rail 114 by adhesives. In other embodiments, the foot 132 may be coupled with the rear rail 114 by way of compression fit, interference fit, or by overmolding techniques. In one embodiment, the foot 132 may be coupled with a rear rail 114 using techniques and constructions describe in U.S. Provisional Patent No. 62/732,997, filed on Sep. 18, 2018, entitled COMBINATION LADDERS AND FOOT FOR COMBINATION LADDERS, the disclosure of which is incorporated by reference herein in its entirety.

Figure 44:
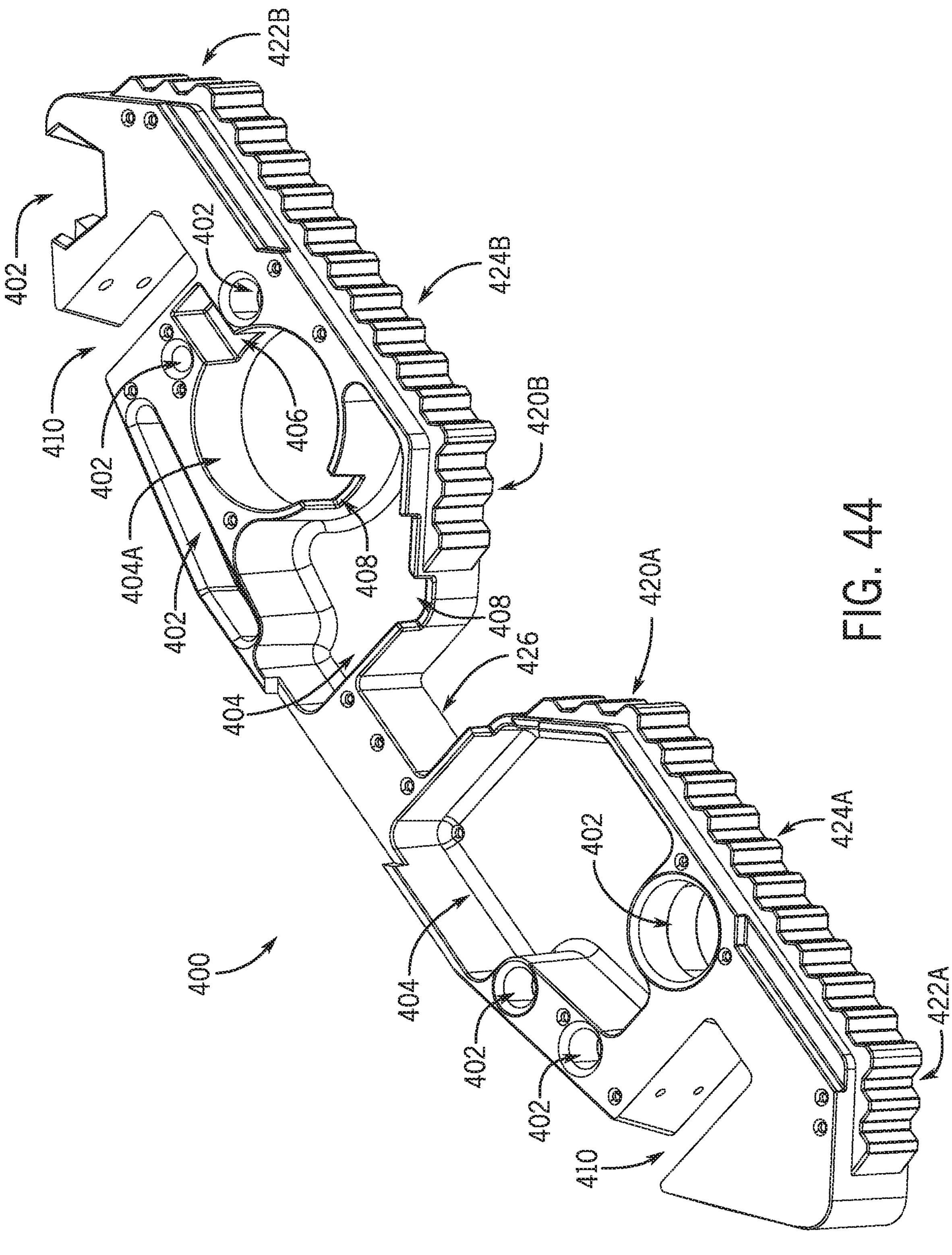
FIG. 44 is a perspective view of a ladder component according to an embodiment of the present disclosure.

Referring now to FIG. 44, an accessory 400 is shown in accordance with an embodiment of the present disclosure. The in one embodiment, the accessory 400 may be configured such as shown in U.S. Design patent application Ser. No. 29/667,357, filed Oct. 19, 2018, and entitled "Accessory for Ladder," the disclosure of which is incorporated by reference herein in its entirety.

The accessory 400 may include a variety of features including, for example, hooks, slots, and/or openings (generally indicated as 402) for placing or attaching tools or other components therein (e.g., screwdrivers, handles of hammers, lanyards attached to power tools, electrical cords, etc.), recesses 404 for holding tools or supplies (e.g., nails or screws), and/or features for coupling accessories with the top cap. In one embodiment, notches may be formed for holding a tablet or a smart phone or other type of communications device. For example, as shown in FIG. 44, one of the recesses (404A) may exhibit a shape and size to hold a cup or a paint can, but also include an adjacent recess 406 on a first side and one or more notches 408 aligned with the recess 406, that are collectively and cooperatively sized and shaped for receipt of an electronic tablet or smart phone, enabling the tablet or smart phone to be positioned or propped up in a viewing mode for a user to watch or view (e.g., watch a "how to" video) while standing on the ladder.

Figure 45:
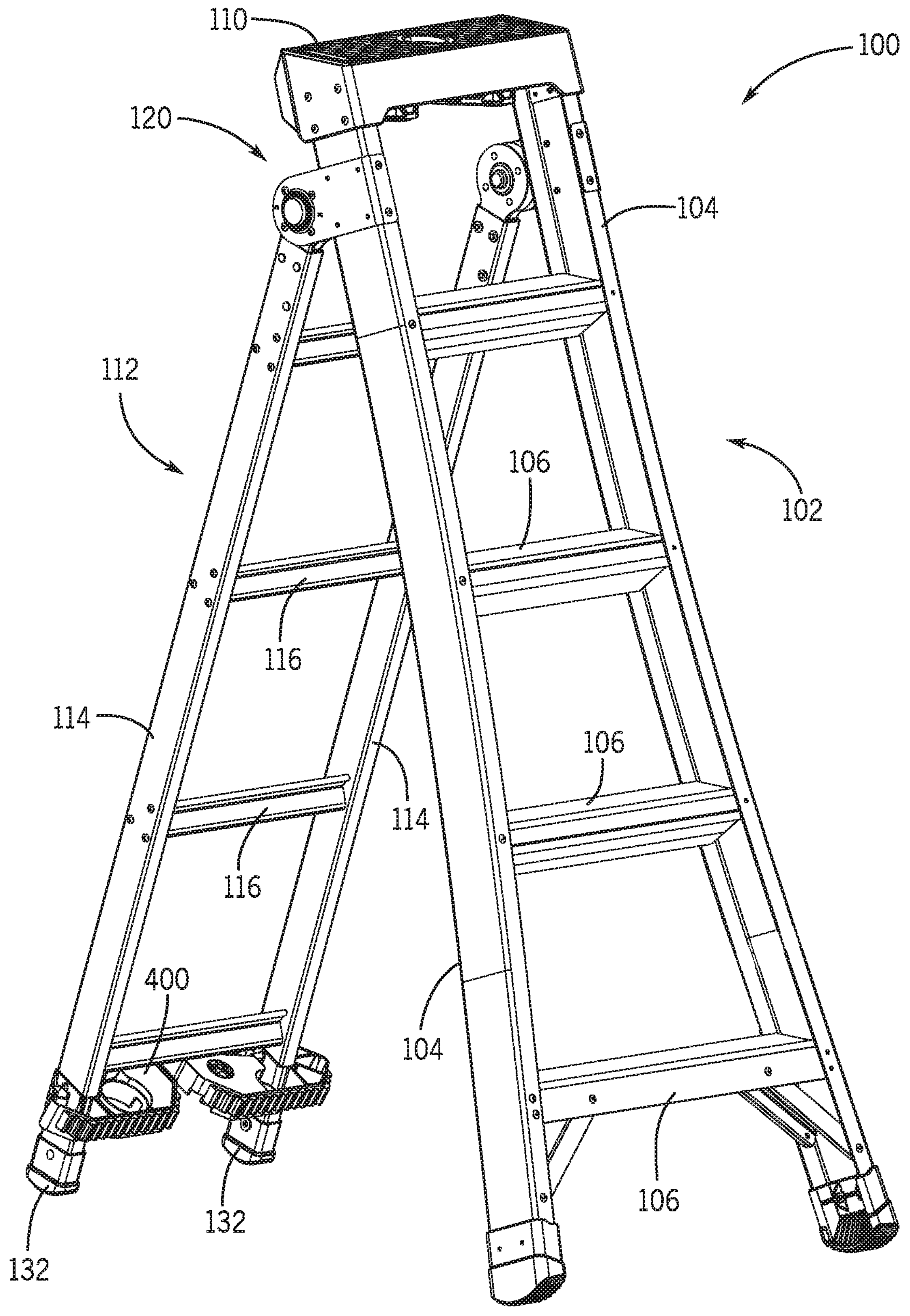
FIG. 45 is a front perspective view of a ladder in a step-ladder configuration with the component shown in FIG. 44 attached to the ladder.
Figure 46:
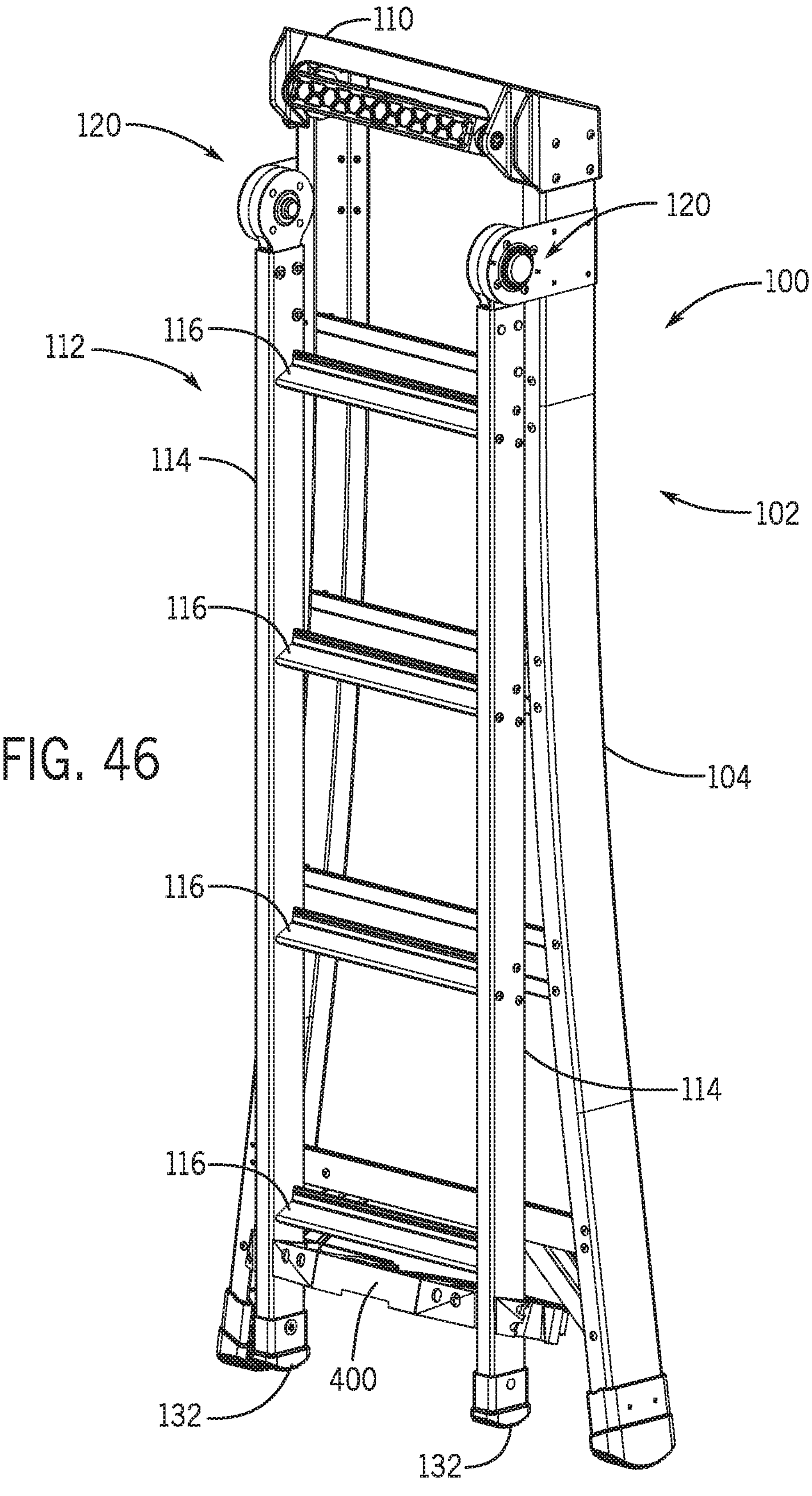
FIG. 46 is a rear perspective view of the ladder shown in FIG. 45 while in a stored or collapsed condition.

The accessory 400 may include a pair of recesses or notches 410 formed in the body for receipt of ladder rails (e.g., ladder rails 114 of the second assembly 112) for coupling the accessory 400 to a ladder. As shown in FIGS. 45-48, the accessory 400 may be coupled to the ladder rails 114 of the second assembly 112 adjacent the feet 132 of the second assembly 112. In some cases, the accessory 400 may be positioned adjacent the rung 116 that is closest to the feet 132. For example, the accessory 400 may be removably coupled with the rails 114 of the second assembly 112 (using a removable screw, bolt, or a latching device) and then be used or removed as desired by a user of the ladder. In some cases, the accessory 400 may be positioned adjacent a rung 116 or even take place of such a rung and be effectively fixed to the rails 114 of the second assembly 112 such that a user could not easily remove the accessory 400 in a nondestructive manner (e.g., such as by drilling through rivets or other fasteners or by destroying an adhesive or material bond between the accessory and the rails). Thus, when the ladder 100 is in a step ladder configuration (FIG. 45) or a stored configuration (FIG. 46), the accessory is positioned toward the "bottom" of the second assembly 112. Additionally, as seen in FIGS. 45 and 46, the accessory 400 is sized, shaped and positioned such that it doesn't cause interference between the second assembly 112 and the first assembly 102 when placed in the stored state (FIG. 45).

Figure 47:
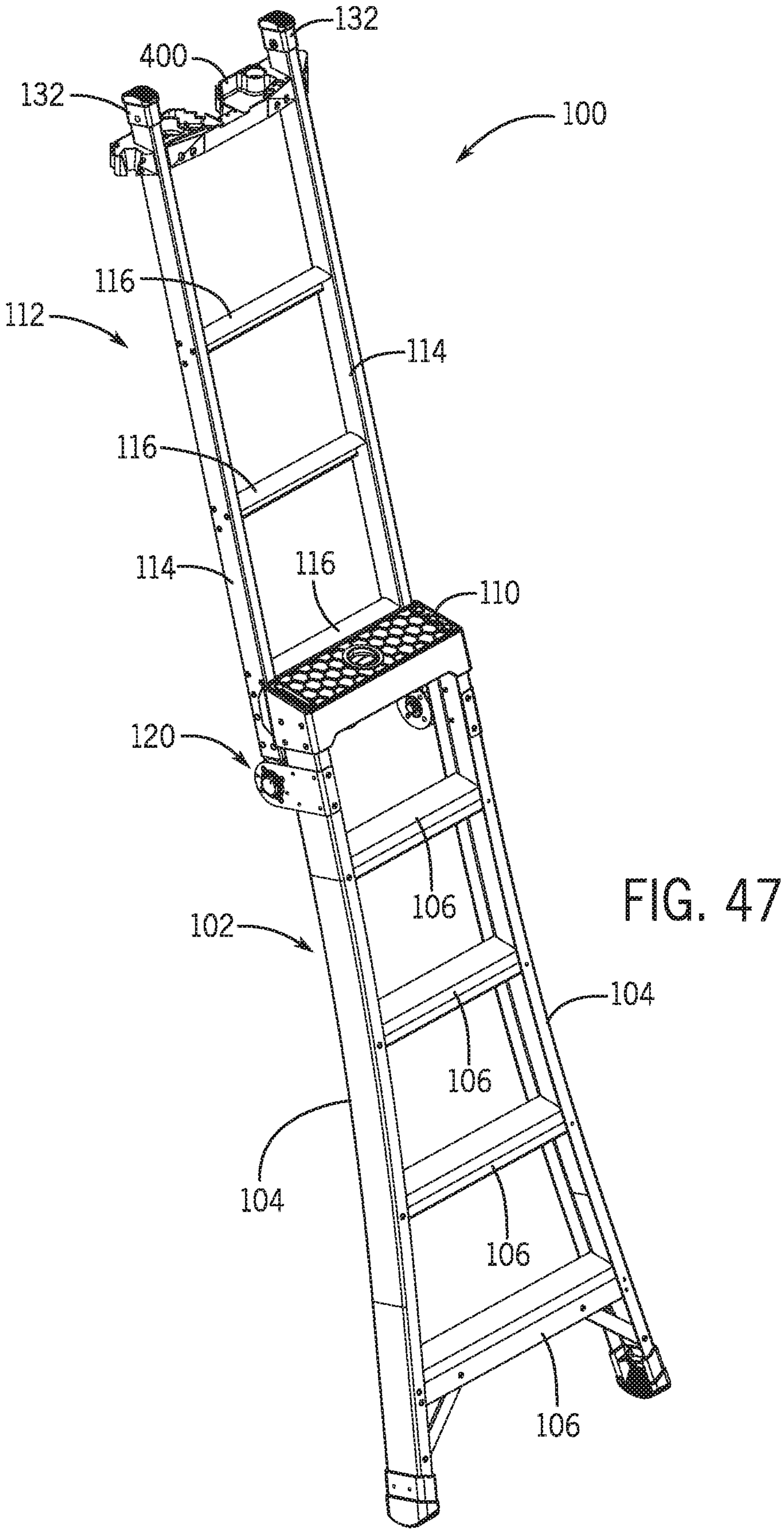
FIG. 47 is a front perspective view of the ladder shown in FIG. 45 while in an extended condition.
Figure 48:
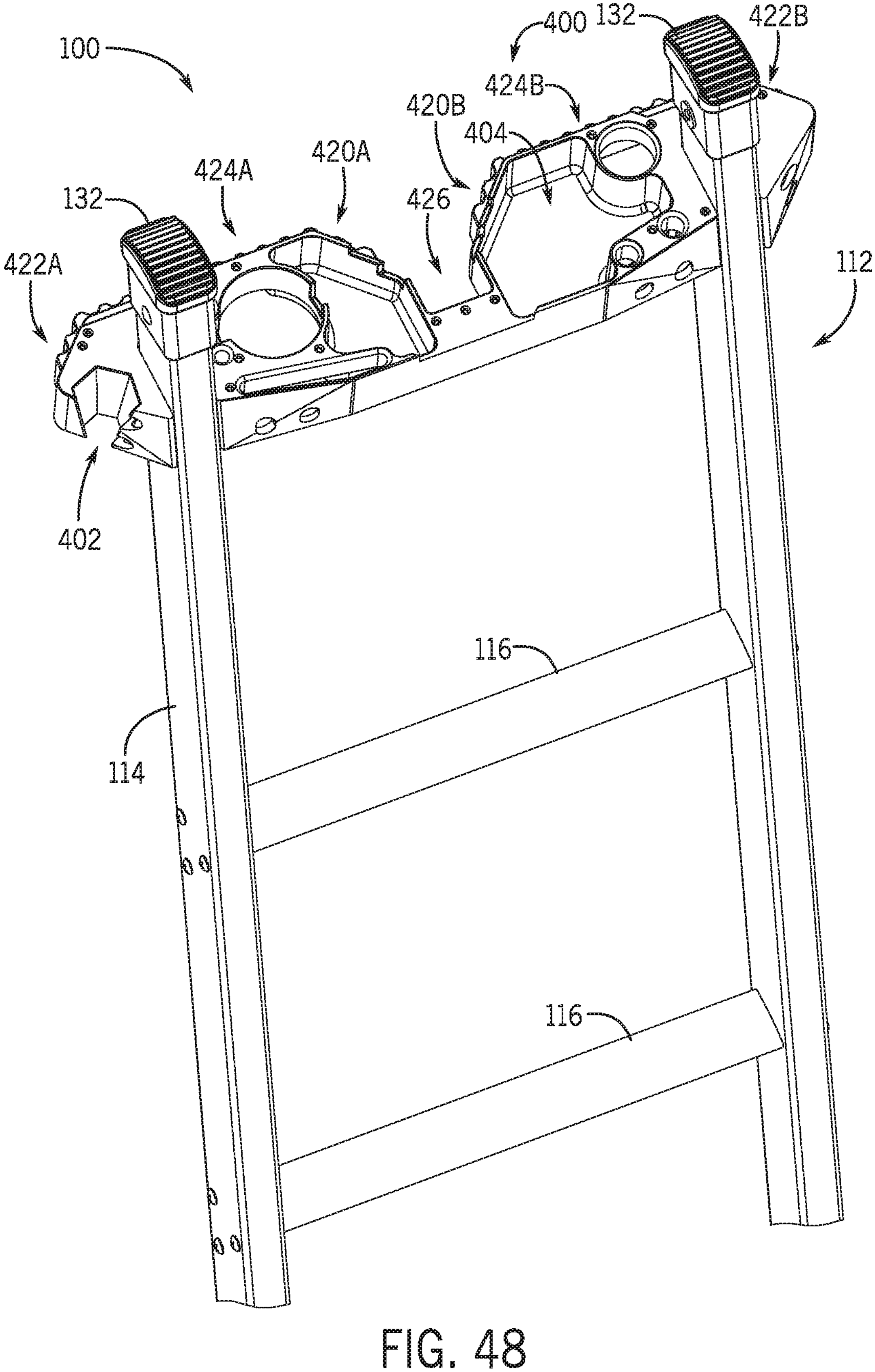
FIGS. 48 and 49 are enlarged views of the upper portion of the ladder shown in FIG. 47.
Figure 49:
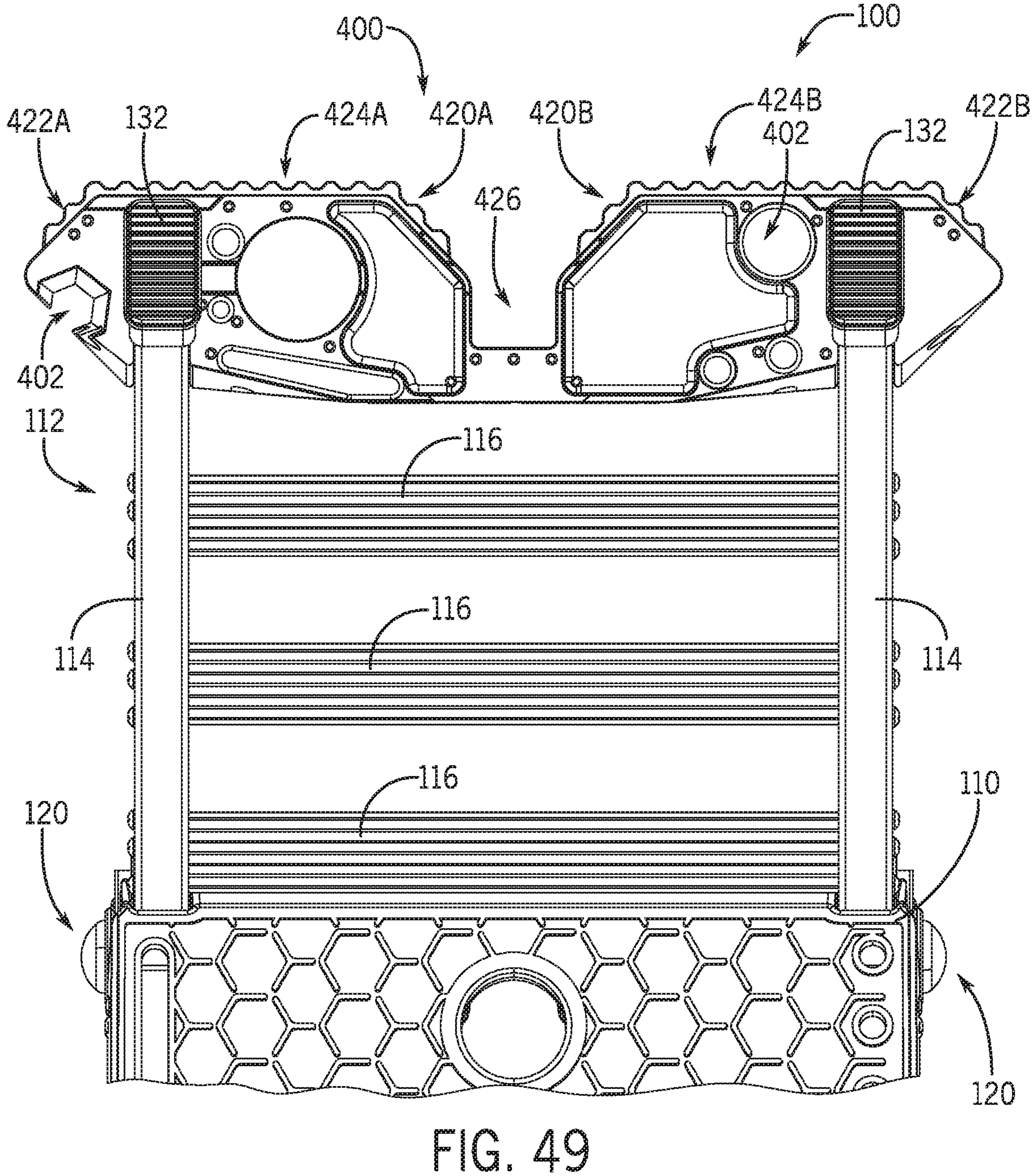

Referring to FIGS. 47-49, when the ladder 100 is in an extended state, the accessory may be positioned near the feet 132 adjacent the uppermost rung 116 (e.g., between the uppermost rung 116 and the feet 132).

The accessory 400 may include a variety of features for engaging a support surface (e.g., a wall, post, or other structure). For example, the accessory 400 may include a first pair of angled engagement surfaces 420A and 420B positioned and oriented to define an interior angle of a desired magnitude therebetween (e.g., approximately 90 degrees). The accessory may further include a second pair of engagement surfaces 422A and 422B positioned and oriented to define an exterior angle of a desired magnitude (e.g., approximately 90 degrees). A third set of engagement surfaces 424A and 424B may be located between associated ones of the angled engagement surfaces (e.g., engagement surface 424A is between angled surfaces 420A and 422A).

When the ladder is used in an extended configuration, the ladder 100 may be leaned against an exterior wall corner such that the first pair of engagement surfaces 420A and 420B each engage adjacent walls that form the exterior corner (such as described above with respect to embodiments of the top cap), providing balance and stability to the ladder 100 and enabling a user to get laterally closer to the wall. Additionally, when the ladder 100 is leaned against an interior wall corner, the second pair of engagement surfaces 420A and 420B each engage adjacent walls that form the interior corner (such as describe above with respect to embodiments of the top cap), again providing balance and stability to the ladder 100 and enabling a user to get laterally closer to the wall. Likewise, when the ladder 100 is leaned against a flat wall or support structure, the third engagement surfaces 424A and 424B may engage the flat surface to provide a stable support.

In some embodiments, the engagement surfaces may be configured with ribs and grooves to provide a traction or gripping surface. In some embodiments, additional cushions or pads may be placed on each of the engagement surfaces. The engagement surfaces may, thus, be configured to provide added traction or stability when engaging support surfaces, as well as be configured to avoid marring or marking the support surface with which they engage.

Further, a notch or recess 426 may be positioned in the center of the accessory, between the first angled engagement surfaces 420A and 420B, so that the ladder 100 may be braced against a vertical support structure, such as a stud (e.g., a vertically oriented 2×4 or 2×6) of a framed wall, by positioning the stud within the notch or recess 426, providing balance and stability to the ladder 100 and enabling a user to get laterally closer to the wall. Thus, in some embodiments, the channel 426 may be configured to exhibit a width between its side walls of approximately 1.5 inches or slightly larger (e.g., approximately 1.5625 to approximately 1.625 inches) to provide a sliding fit of a standardized stud within the channel 426.

Figure 50:
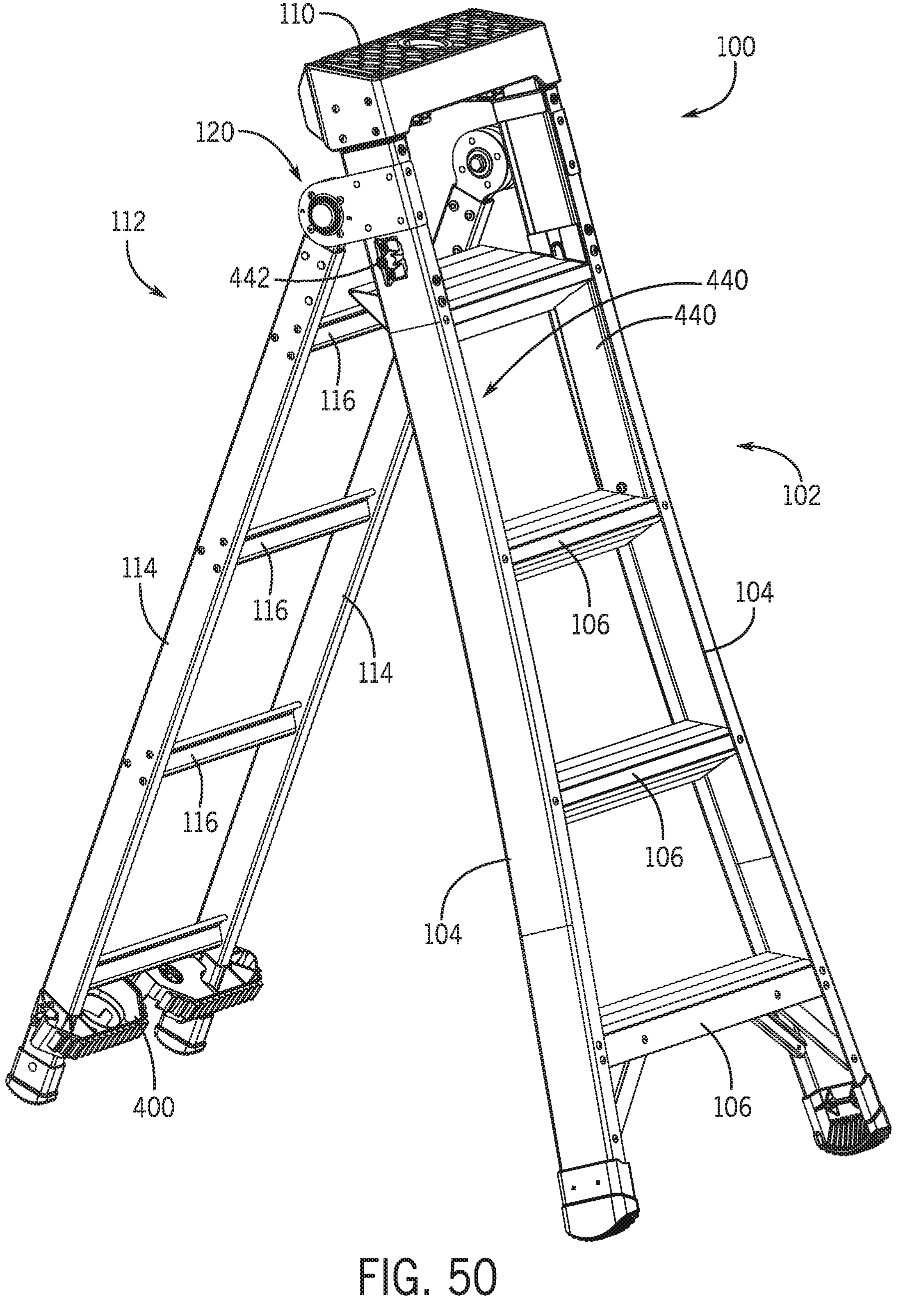
FIG. 50 is a perspective view of a ladder according to another embodiment of the present disclosure.
Figure 51:
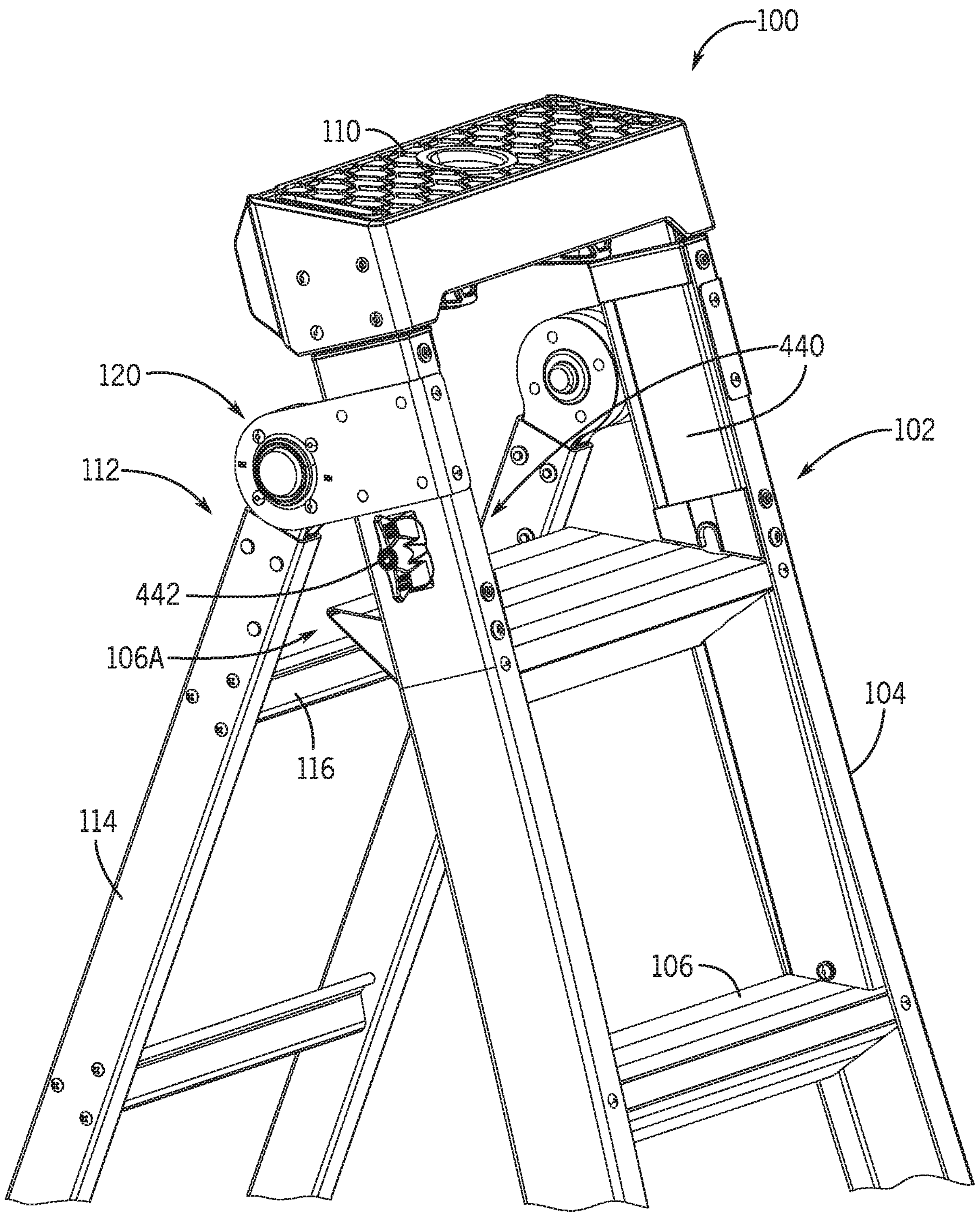
FIG. 51 is an enlarged view of an upper portion of the ladder shown in FIG. 50.
Figure 52:
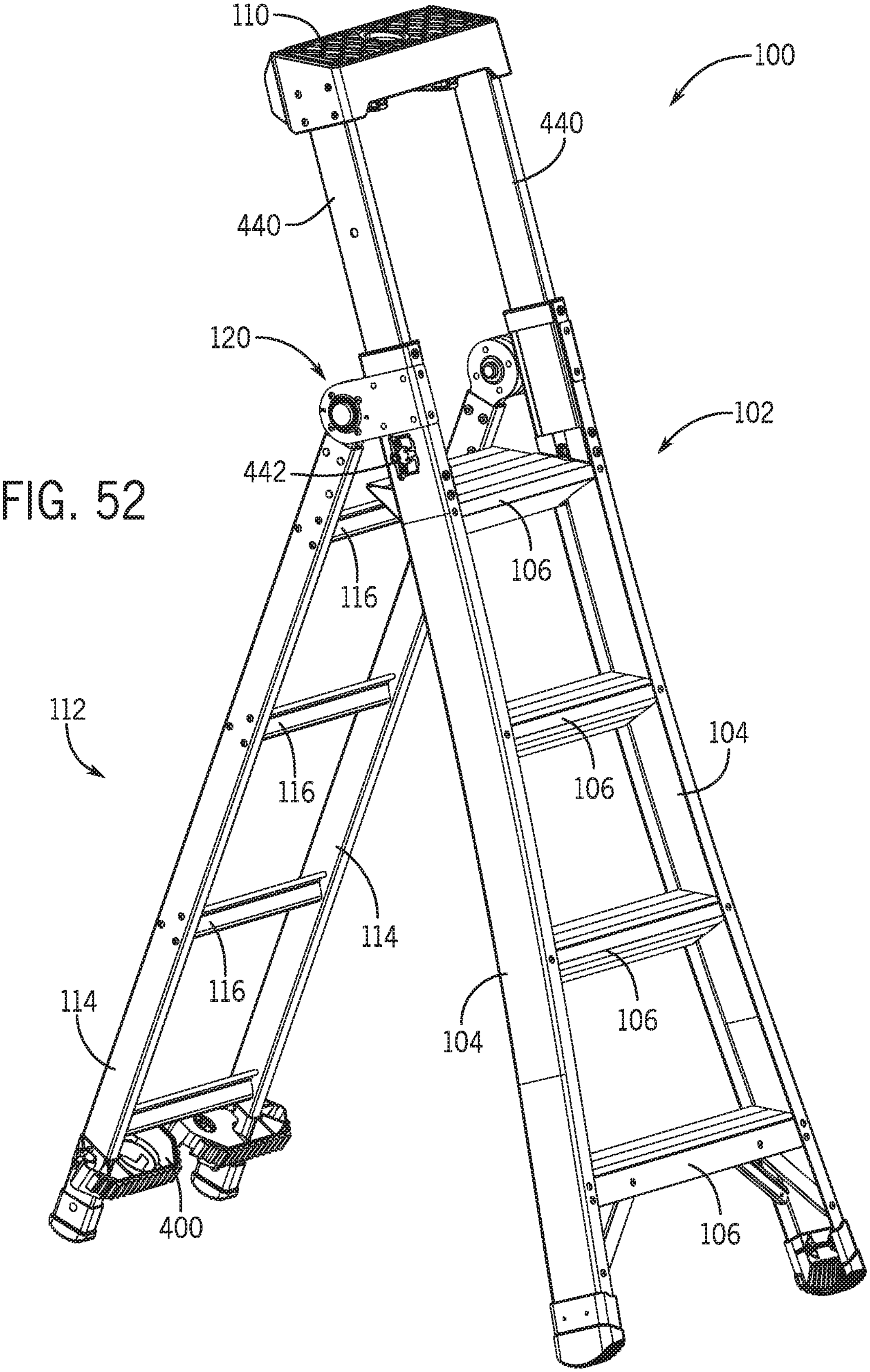
FIG. 52 is a perspective view of the ladder shown in FIG. 50 wherein the top cap is in an extended position according to another embodiment of the present disclosure.
Figure 53:
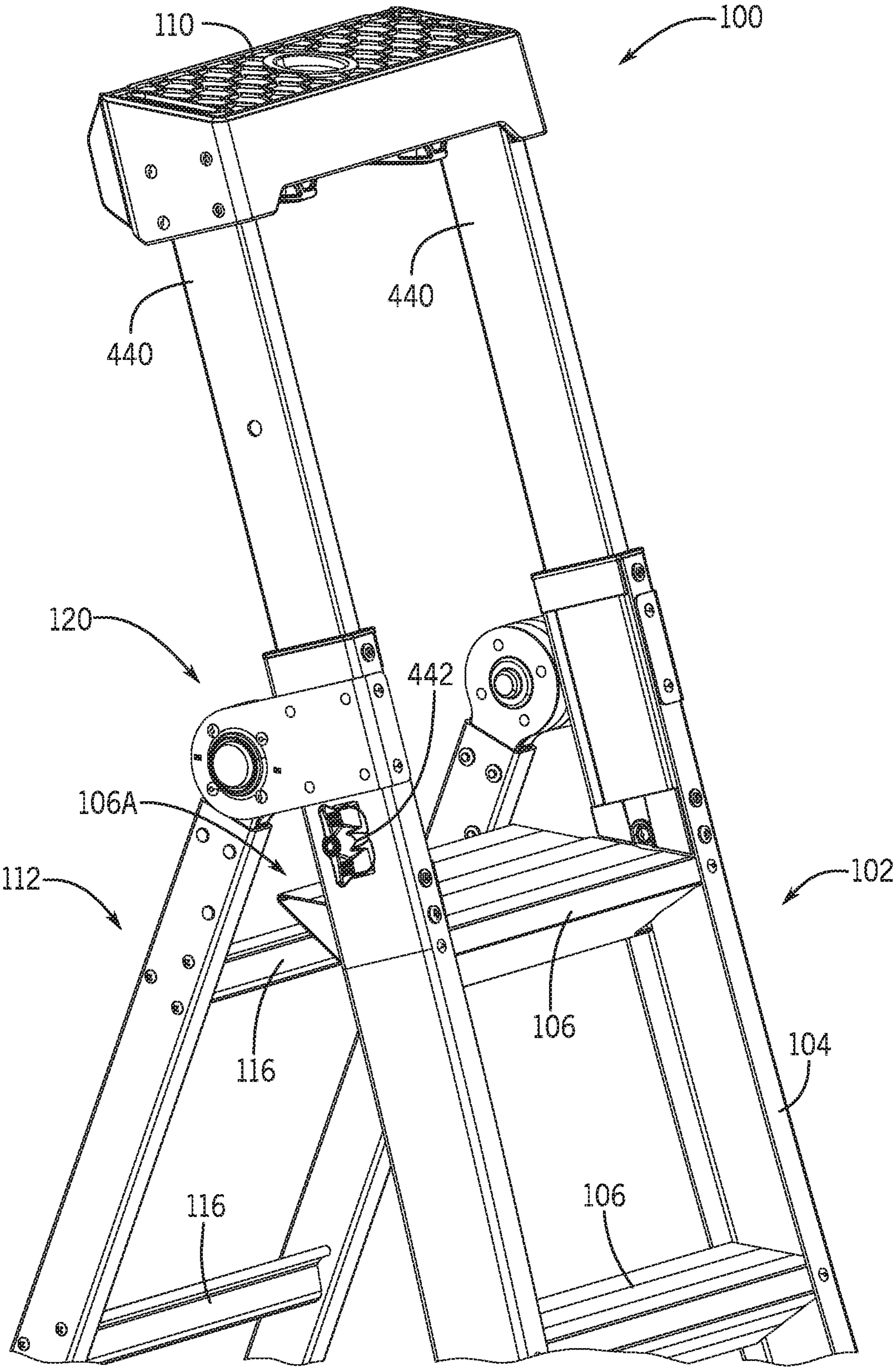
FIG. 53 is an enlarged view of an upper portion of the ladder shown in FIG. 52.
Figure 54:
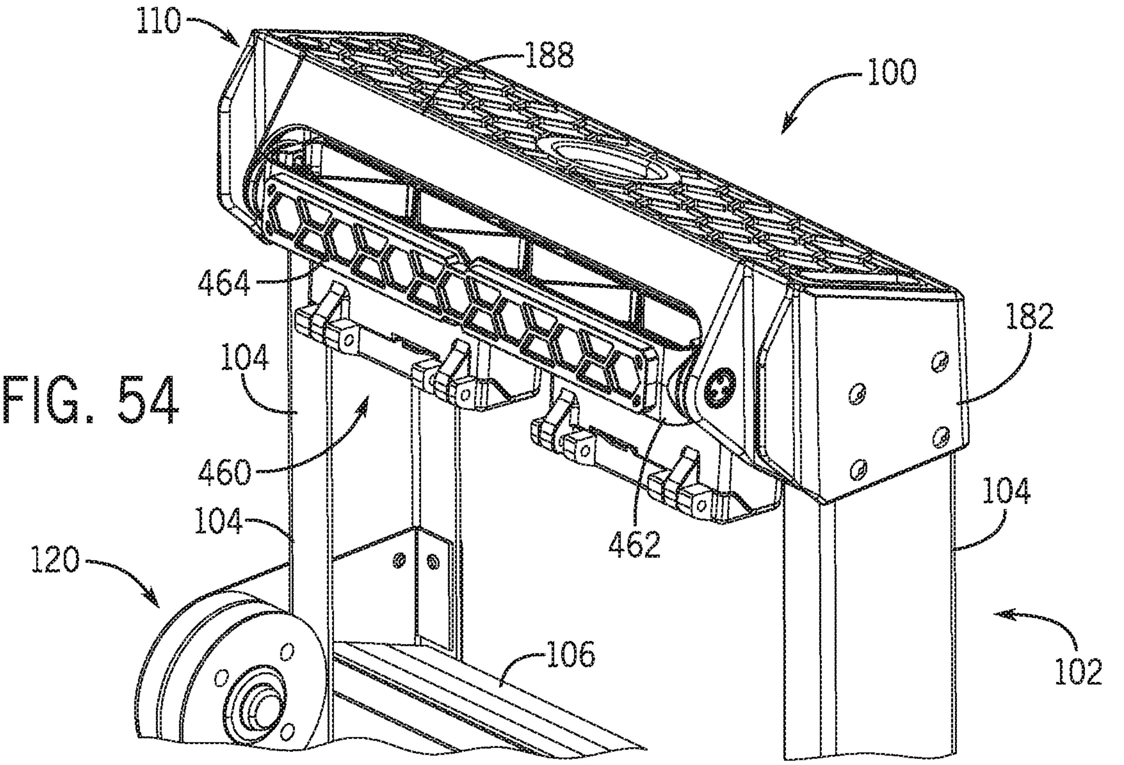
FIG. 54 is a rear perspective view of an upper portion of a ladder showing a ladder component in accordance with another embodiment of the present disclosure.

Referring now to FIGS. 50-53, a ladder 100 is shown in accordance with another embodiment of the disclosure. The ladder 100 may be configured generally similar to other embodiments described herein, but also includes a height-adjustable top cap 110. The top cap 110 is coupled to a pair of extension members 440. Each extension member 440 is slidably coupled with an upper portion of an associated front rail 104 of the first assembly 102. In one embodiment, the sliding members 440 may be at least partially disposed within a channel or recess formed by the front rails 104 (e.g., in the hollow of a c-channel from which the rails may be formed). Locking mechanisms 442 may be used to selectively lock the extension members 440 in desired positions relative to the front rails 104. For example, in one embodiment, the locking mechanisms may include a pin that extends through its associated front rail 104 and selectively extends into, and retracts out of, openings or recesses formed in the extension members 440. Thus, the top cap 110 may be locked in a collapsed or retracted position as shown in FIGS. 50 and 51 such that the ladder functions similar to previously described embodiments. However, a user may selectively actuate the locking mechanisms 442 to release the extension members 440, displace the top cap upwards to an extended position, and then release or re-actuate the locking mechanisms 442 to selectively lock the top cap in the new extended position as shown in FIGS. 52 and 53. Of course, the top cap may be positioned, and selectively locked, at a variety of additional heights (e.g., partially extended) between the two positions shown in FIGS. 50-53.

When placed in an extended position, such as shown in FIGS. 52 and 53, the top cap 110 may serve as a working surface, or as a stabilizing structure, for a user standing on an upper rung 106 of the first assembly 102. It is noted that, as shown in FIGS. 52 and 53, the uppermost rung 106 of the first assembly 102 may be configured with increased surface area for a user to stand on. For example, the uppermost rung 106 may include a portion 106A that extends beyond the edges of the front rails 104 of the first assembly 102 and towards the second assembly 112. In some embodiments, the increased surface area of this rung 106, as well as the height-extended top cap 110, may provide a more comfortable and/or stable structure to work from.

Referring now to FIGS. 54-57, a top cap 110 is shown and described with a second body portion 460, or accessory, according to another embodiment of the present disclosure. The top cap 110 may include a first body portion 182 that is coupled to the front rails 104 (or to extension members such as previously described), and a second body portion 460 (which may include a detachable accessory) that is selectively positionable (and lockable) relative to the first body portion 182. For example, the second body portion 460 may be positioned in a first position such that a surface 462 (on which a cushion or pad 464 may be located) is positioned generally adjacent to the rear face 188 of the first body portion 182. It is noted that in some embodiments, the surface 462 and adjacent rear face 188 may be angled relative to each other (e.g., an angle measuring greater than 180 degrees when measuring from the surface 462 to the rear face 188) such as has been described with respect to other embodiments herein. In some embodiments, the rear face 188 may be angled such that it abuts against a surface of a rear rung 116 when in a straight ladder or extended configuration, providing enhanced strength and rigidity to the ladder 100. In other embodiments, there may be a gap or small space between the rear face 188 and the adjacent rear rung 116.

In some embodiments, the second body portion 460 may be pivotally coupled with the first body portion 182 by way of a pivoting structure (e.g., such as associated with locking buttons 190 previously described herein), such that the second body portion 460 may rotate to at least a second position relative to the first body portion 182. When the second body portion 460 is rotated to a second position (e.g., such as shown in FIG. 55), the second portion 184 may be locked into place relative to the first portion 182.

Figure 55:
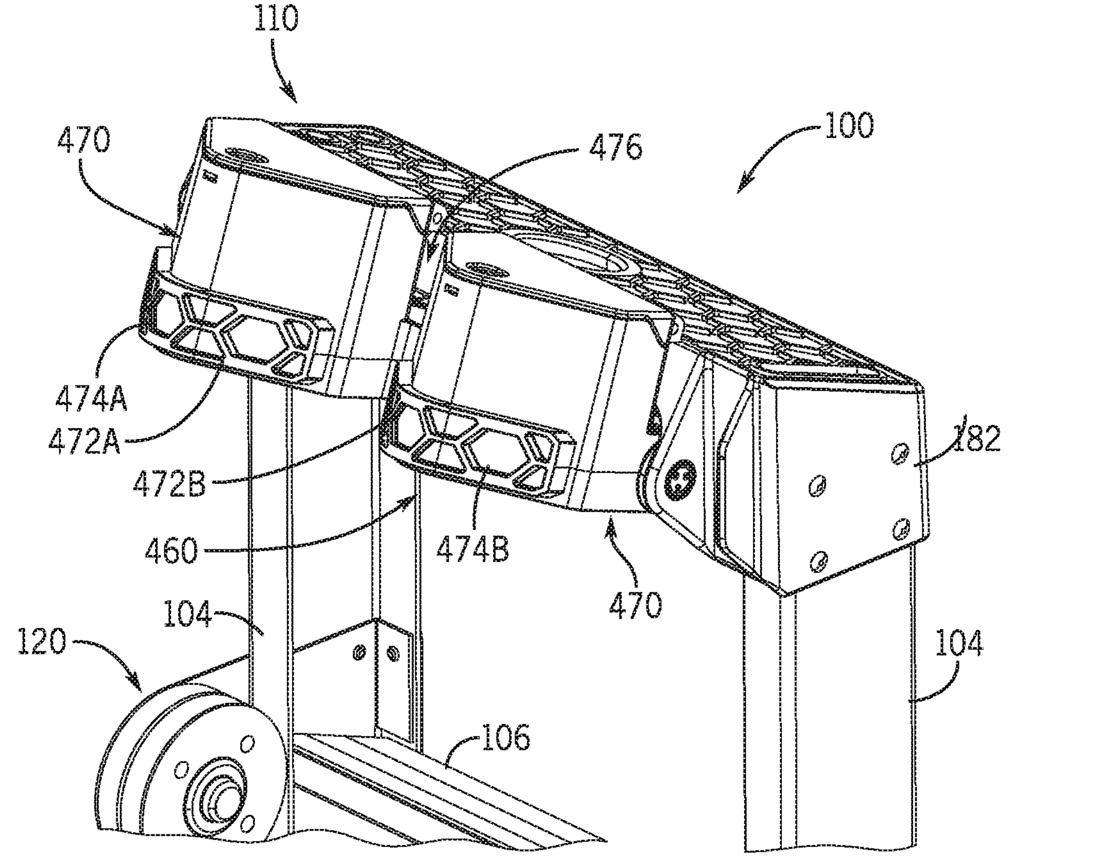
FIGS. 55 and 56 are perspective views.

As seen in FIG. 55, when the second body portion 460 is rotated into a second position, various features of the second body portion 460 may protrude outwardly from the rear face 188 of the first body portion 182. For example, the second body portion 460 may include a pair of protruding bodies or structures 470 providing a first pair of angled engagement surfaces 472A and 472B, a second pair of angled engagement surfaces 474A and 474B, and a channel 476 that is located adjacent to, and in between, the first pair of engagement surfaces 472A and 472B (see, also, FIG. 57).

With the second body portion 460 selectively locked in the second position by locking buttons 190 (or by other appropriate mechanisms or structures such as detent mechanisms, latches, frictional arrangements, etc.), the first pair of angled engagement surfaces 472A and 472B may be positioned and oriented to define an interior angle of a desired magnitude therebetween (e.g., approximately 90 degrees). The second pair of engagement surfaces 474A and 474B may be positioned and oriented to define an exterior angle of a desired magnitude (e.g., approximately 90 degrees). In some embodiments, cushions or pads may be placed on the engagement surfaces.

As with previously described embodiments, when used in a leaning configuration, the ladder 100 may be leaned against an exterior wall corner such that the first pair of engagement surfaces 472A and 472B each engage adjacent walls that form the exterior corner, providing balance and stability to the ladder 100 and enabling a user to get laterally closer to the wall. Additionally, the ladder 100 may be leaned against an interior wall corner such that the second pair of engagement surfaces 474A and 474B each engage adjacent walls that form the interior corner, again providing balance and stability to the ladder 100 and enabling a user to get laterally closer to the wall.

Further, when used in a leaning configuration the ladder 100 may be braced against a vertical support structure, such as a stud or a post or pole (e.g., a vertically oriented 2×4, 2×6, etc.) of a framed wall, by positioning the stud within the channel 476, providing balance and stability to the ladder 100 and enabling a user to get laterally closer to the wall. Thus, in some embodiments, the channel 476 may be configured to exhibit a width between its side walls of approximately 1.5 inches or slightly larger (e.g., approximately 1.5625 to approximately 1.625 inches) to provide a sliding fit of a standardized stud within the channel 476.

When the second body portion 460 is in the first position (see FIG. 54), the pad 464 and/or surface 462 may be abutted against a generally planar support surface to provide stability to the ladder 100 while in a leaning configuration.

Figure 56:
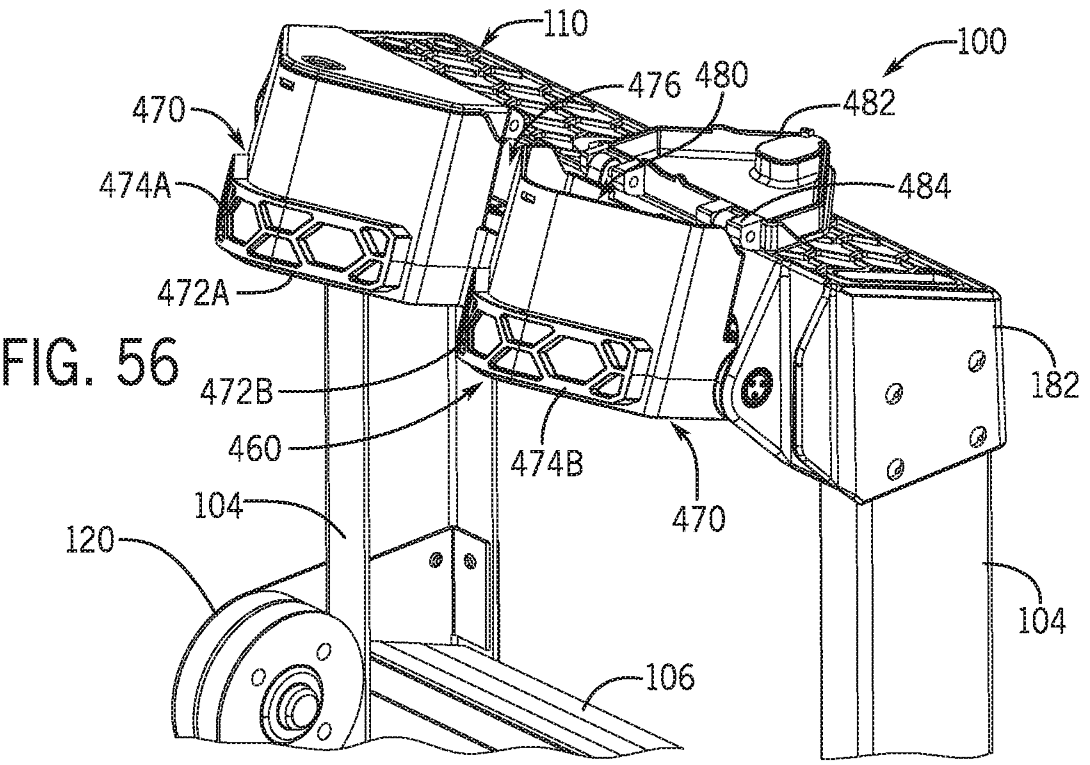
Figure 57:
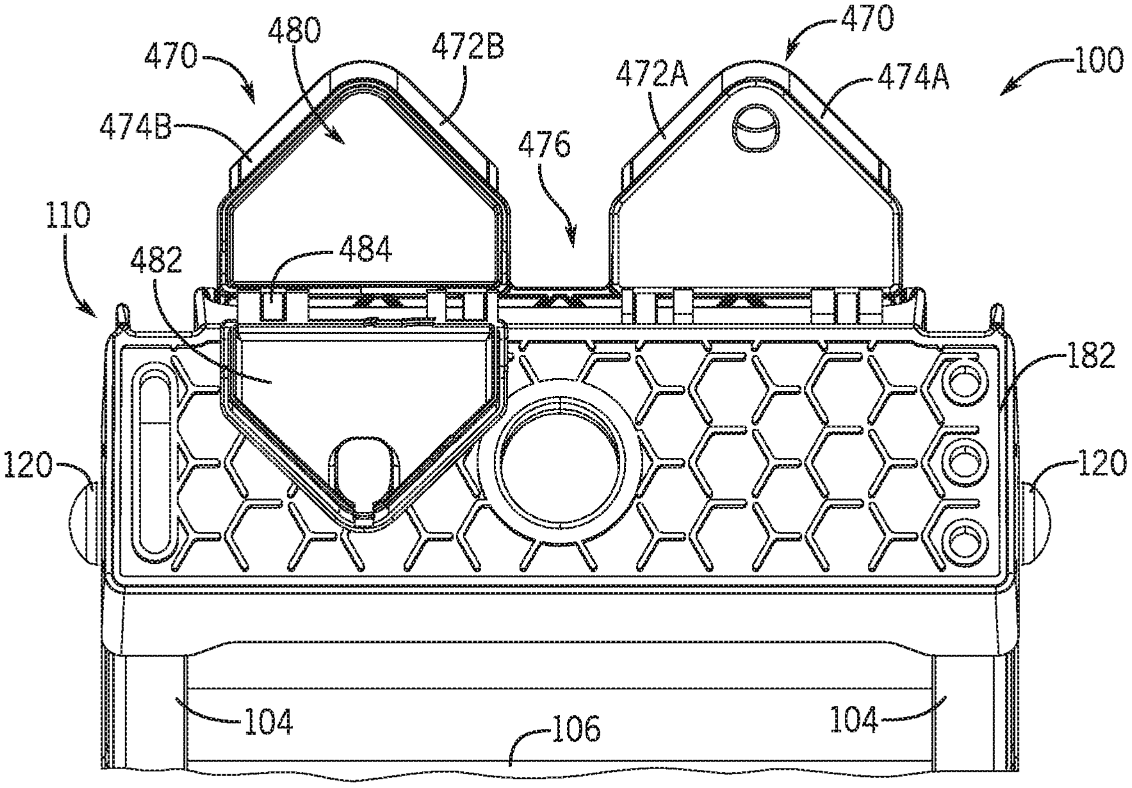
FIG. 57 is a top view, of the ladder and component shown in FIG. 54 while in various states or configurations.
Figure 58:
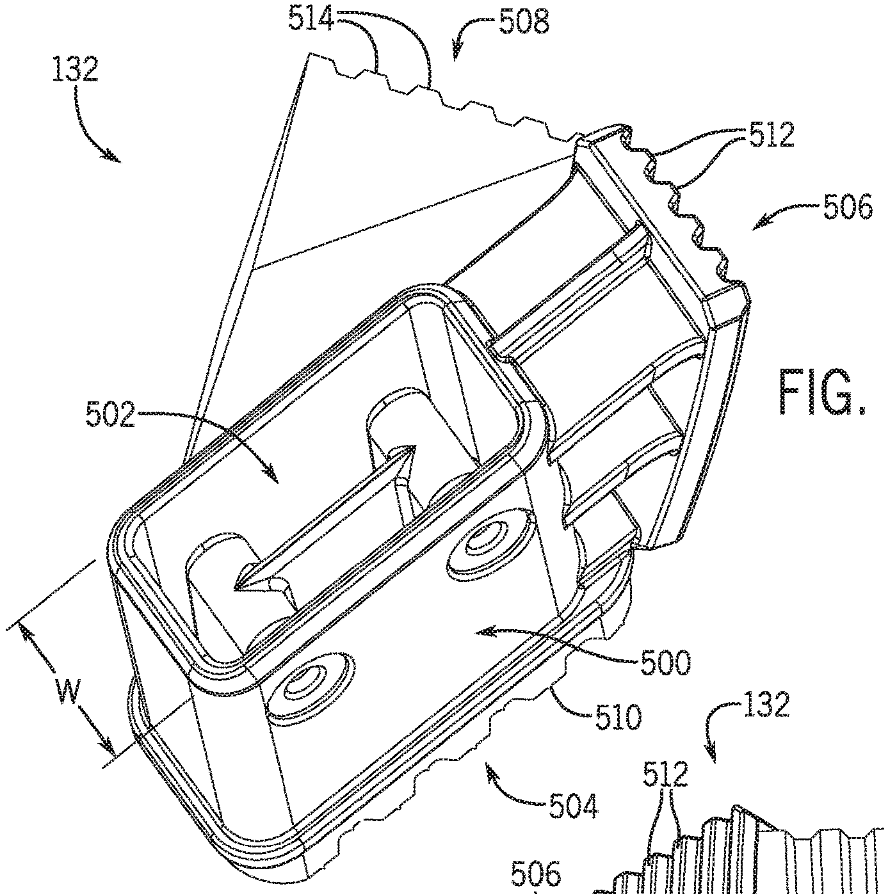
FIG. 58 is a top perspective view of a foot for a ladder having an integrated wall pad according to an embodiment of the disclosure.
Figure 59:
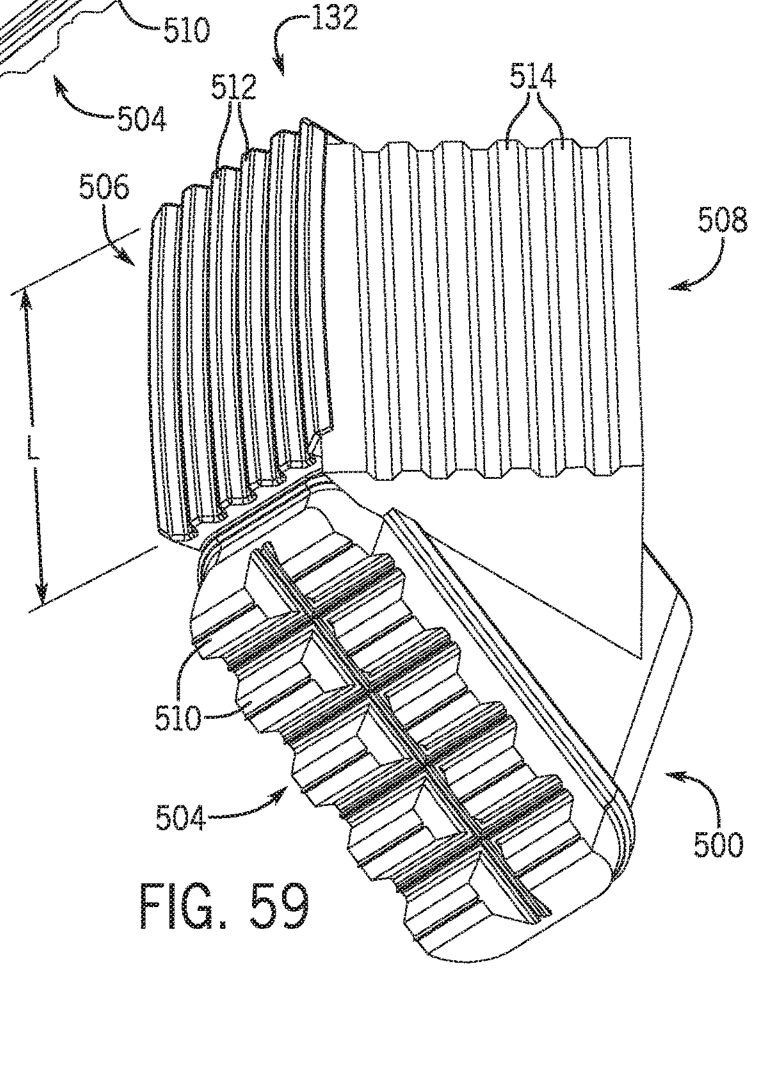
FIG. 59 is a bottom perspective view of the foot shown in FIG. 58.

As further depicted in FIGS. 56 and 57, it is additionally noted that the protruding bodies or structures 470 may be configured as containers, having a substantially hollow internal space 480 or cavity and a removable lid 482. In one embodiment, the lid 482 may be coupled with the protruding structure 470 by way of a hinge 484. Thus, the second body portion 460 may serve multiple functions, including providing a convenient storage space for supplies, tools or other resources that can stay within the container even when the ladder 100 is not being used or while its being transported or stored.

Referring to FIGS. 58-61 a foot 132 is shown in accordance with another embodiment of the disclosure. The foot 132 may include a body portion 500 having an opening 502 formed therein to receive a portion of a rail (e.g., rail 114 of the second assembly 112). In one embodiment, the opening 502 may be configured as to receive a rail having a rectangular- or square-shaped profile. In other embodiments, the opening may be configured to receive other profiles or cross-sectional shapes including, for example, rails having a C-shaped or H-shaped cross-sectional profile.

The foot 132 includes a first surface engaging portion 504, which may be referred to as a horizontal surface engaging portion, a second surface engaging portion 506, which may be referred to as a planar vertical surface engaging portion, and a third surface engaging portion 508, which may be referred to as an angular or corner surface engaging portion. Each of the first, second and third surface engaging portions 504, 506 and 508 may be configured to engage a support surface and resist movement of the foot 132 (and, thus, the ladder) relative to the support surface. The surface engaging portions 504, 506 and 508 may include a variety of surfaces having grooves, ribs, or other traction features formed therein. For example, the first surface engaging portion 504 may include a plurality of ribs or ridges 510 extending across a width 'W' of the body 500 (e.g., extending in a direction parallel with, or substantially parallel with, an axis that extends through both feet 132 of the ladder 100). Adjacent ridges or ribs 510 may define parallel grooves extending therebetween. Thus, when the ladder 100 is in a step ladder state, the first surface engaging portion 504 will assist in resisting sliding or slipping, relative to the ground or other support surface, in a direction that is substantially perpendicular to the length of the ribs or ridges 510. It is noted that the general surface geometry of the first surface engaging portion 504 may be planar (with the peaks of the ridges extending to a common plane), such as shown in the drawings, or may be generally arcuate, or exhibit some other geometry.

Additionally, in one embodiment, the second engaging surface 506 may include a plurality of ribs or ridges 512 extending along a length 'L' in a direction that is substantially perpendicular to the ribs or ridges 510 of the first surface engaging portion 504. In one embodiment, the second surface engaging portion 506 may extend from approximately an upper end of the foot 132 (along a plane where the opening 502 is located) down to the first surface engaging portion 504.

The second set of ribs or ridges 512 may also define generally parallel grooves between adjacent ridges 512 and be configured to resist or impede sliding or slipping, relative to a vertical wall or other support surface, in a direction substantially perpendicular to the length of the ribs or ridges 512. Thus, when the ladder 100 is in a straight ladder configuration (such as previously described with respect to FIGS. 42 and 43 hereinabove), the second surface engaging portion 506 may rest against a wall (or other support structure) and resist sliding "sideways" along the surface of the wall. Of course, other anti-slip features, and other orientations or arrangements of anti-slip features are also contemplated as being formed in the surface engaging portions (e.g., patterns of raised protrusions having round, diamond or other polygonal geometries).

The third engaging surface 508 may be oriented generally at an angle relative to the second engaging surface 506. For example, in one embodiment, the third engaging surface 508 may be oriented generally at an angle of approximately 45 degrees relative to the second engaging surface. In one embodiment, the third engaging surface 508 may include a plurality of ribs or ridges 514 extending along a length in a direction that is substantially parallel to the ribs or ridges 512 of the second surface engaging portion 504. In one embodiment, the third surface engaging portion 508 may extend from approximately an upper end of the foot 132 (along a plane where the opening 502 is located) down to the first surface engaging portion 504.

Figure 60:
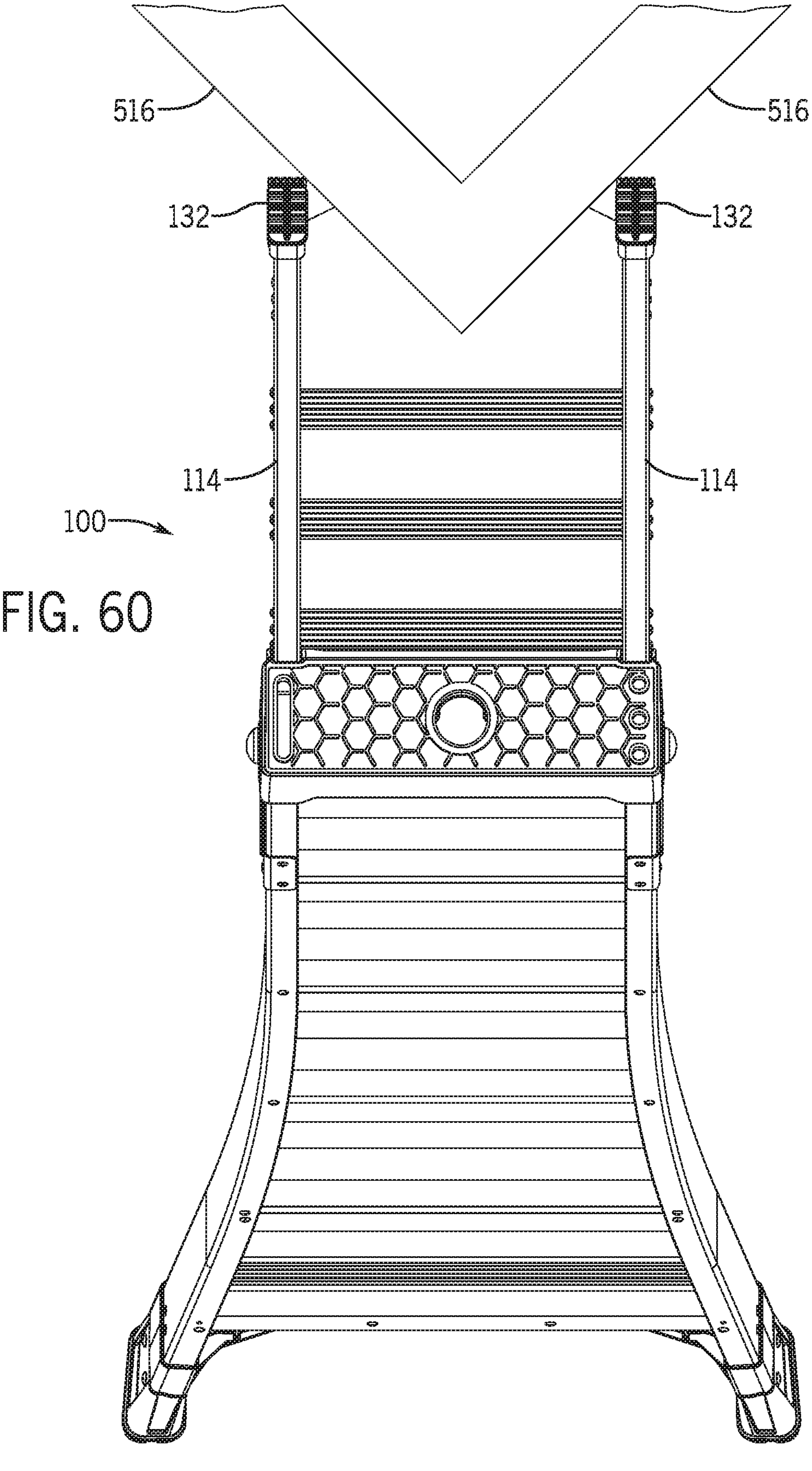
FIG. 60 is a top view of a ladder incorporating the foot shown in FIG. 58 with the ladder in a deployed, straight-ladder configuration against a support exhibiting an exterior corner.
Figure 61:
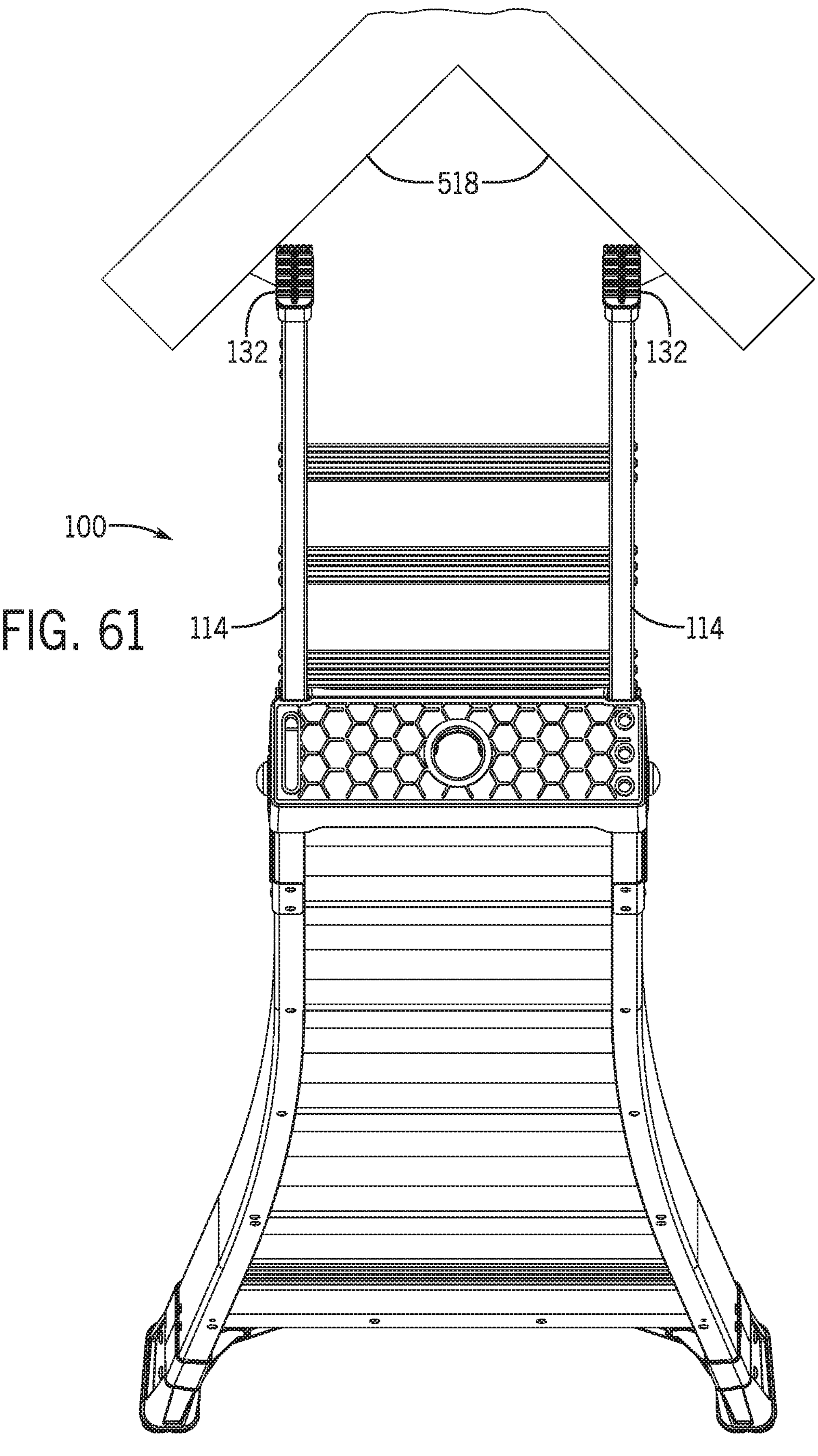
FIG. 61 is a top view of a ladder incorporating the foot shown in FIG. 58 with the ladder in a deployed, straight-ladder configuration against a support exhibiting an interior corner.

The third set of ribs or ridges 514 may also define generally parallel grooves between adjacent ridges 514 and be configured to resist or impede sliding or slipping, relative to a vertical wall or other support surface, in a direction substantially perpendicular to the length of the ribs or ridges 514. In one embodiment, the feet 132 may be placed on the rear rails 114 of a ladder such that the third engagement surfaces 508 face generally inwardly (toward each other) so that, when the ladder is in a straight ladder configuration, the third engagement surfaces 508 can engage the adjacent walls 516 (or other support structures) that form an exterior 90 degree corner such as shown in FIG. 60. In another embodiment, the feet 132 may be placed on the rear rails 114 of a ladder such that the third engagement surfaces 508 face generally outwardly (toward each other) so that, when the ladder is in a straight ladder configuration, the third engagement surfaces 508 can engage the adjacent walls 518 (or other support structures) that form an interior 90 degree corner such as shown in FIG. 61. The feet 132 may be removable from the rear rails 114 to accommodate a change in engaging interior corners and exterior corners.

In other embodiments, the feet 132 may include a fourth engagement surface positioned such that the second engagement surface 506 is located between the third engagement surface 508 and the fourth engagement surface. The fourth engagement surface may be configured generally similarly to the third engagement surface 508 and be generally oriented at an angle of approximately 90 degrees from the third engagement surface such that a single foot may be used to engage flat, vertically planar surfaces (see FIG. 42), exterior corners (see FIG. 60) and interior corners (see FIG. 61).

For embodiments having three or four (or more) engagement surfaces, the foot 132 may be generally configured similar to that which is described above regarding FIGS. 39-42 with respect to materials, wall segments, thickened or cushioned portions, etc.

Figure 62:
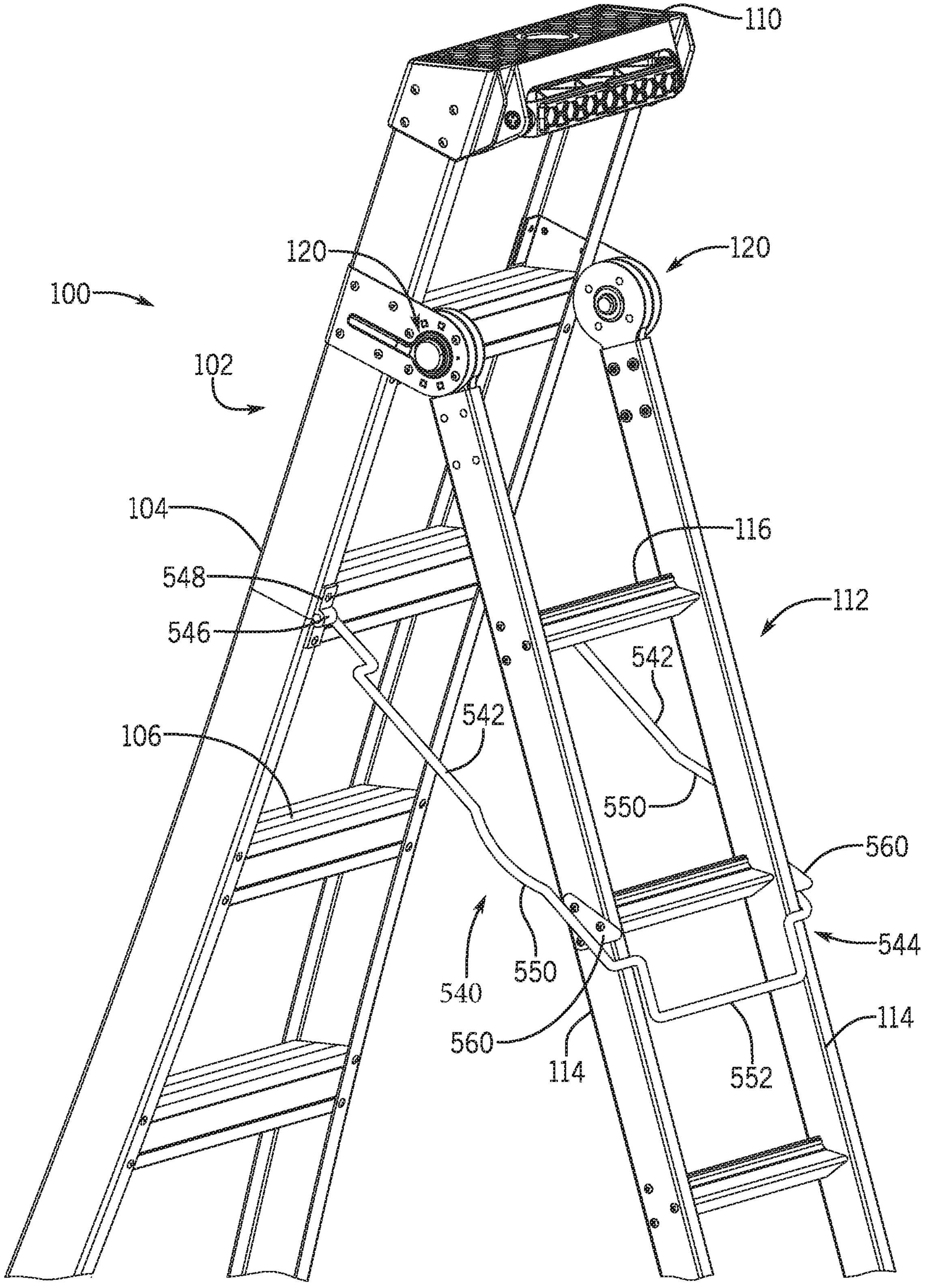
FIG. 62 is a perspective view of a portion of a ladder incorporating a spreader structure with the ladder in a step ladder configuration.
Figure 63:
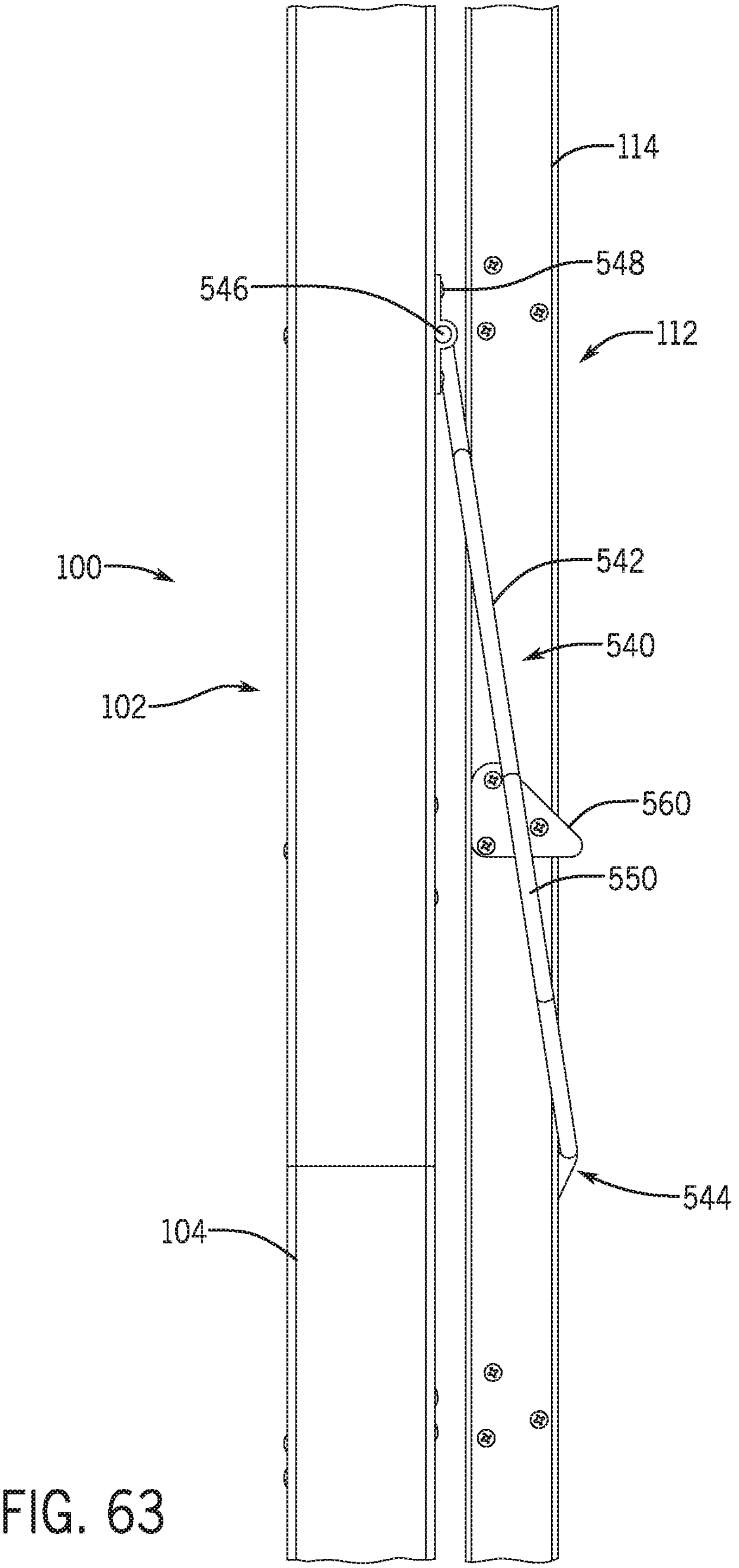
FIG. 63 is a side view of a portion of the ladder shown in FIG. 62 with the ladder in a leaning ladder configuration.
Figure 64:
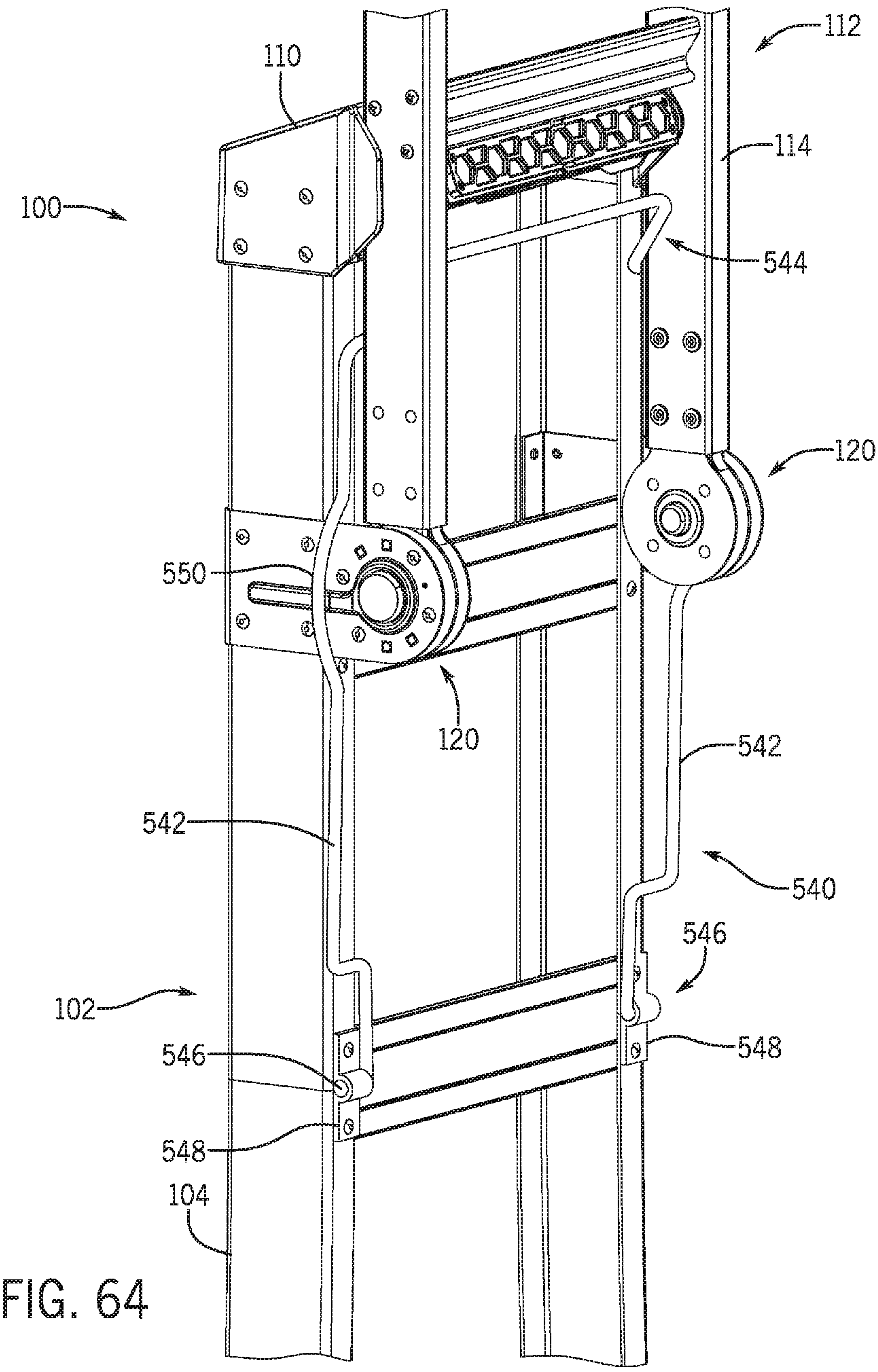
FIG. 64 is a side perspective view of a portion of the ladder shown in FIG. 62 with the ladder in a straight-ladder configuration.

Referring to FIGS. 62-64, a ladder 100 is shown having a spreader structure 540. The spreader structure 540 may include a generally U-shaped bar or hoop having a pair of laterally spaced legs 542 and an end portion or a connecting leg 544 extending between the laterally spaced legs 542. Each of the laterally spaced legs 542 may have an end 546 thereof hingedly or pivotally coupled to the first assembly 102 by way of associated brackets 548. The spreader structure may include a laterally outward extending bend 550 formed in each of the laterally spaced legs 542. The connecting leg 544 may have a discrete section 552 configured to exhibit a width that is less than a width of the space between the rear rails 114. When the ladder 100 is in a step ladder configuration, such as shown in FIG. 62, the spreader structure 540 extends rearwardly from the first assembly 102 and encircles the second assembly 112. The spreader structure 540 serves to reinforce the locking hinge mechanisms 120 and prevent the second assembly 112 from splaying relative to the first assembly 102. If the second assembly 112 attempts to splay relative to the first assembly 102, the connecting portion 544 will catch on a portion of an abutment bracket 560 that protrudes rearwardly from a rear surface of the rear rails 114, preventing the spreader structure from sliding further upwards on the rear rails 114, thereby preventing the splaying of the second assembly 112 relative to the first assembly 102 when the ladder 100 is in a step ladder configuration.

Thus, with larger ladders (e.g., 8 foot ladders or taller, when in a step ladder configuration), the spreader structure 540 may provide additional strength and stability to the ladder 100.

As seen in FIG. 63, when the ladder 100 is in a leaning or stored configuration, the spreader structure 540 pivots to collapse against the second assembly 112, with the discrete section 552 of the connecting leg 544 extending between the rear rails 114. Additionally, when the ladder 100 is in a straight ladder configuration, as shown in FIG. 64, the spreader structure 540 pivots upward such that lateral extending bends 550 pass over the hinge mechanisms 120 (and any associated bracketing). Again the discrete section 552 of the connecting leg 544 extends between the rear rails 114. Thus, the spreader structure 540 may pivot automatically as the ladder 100 transitions from a straight ladder configuration, to a step ladder configuration, and then to a leaning configuration.

Figure 65:
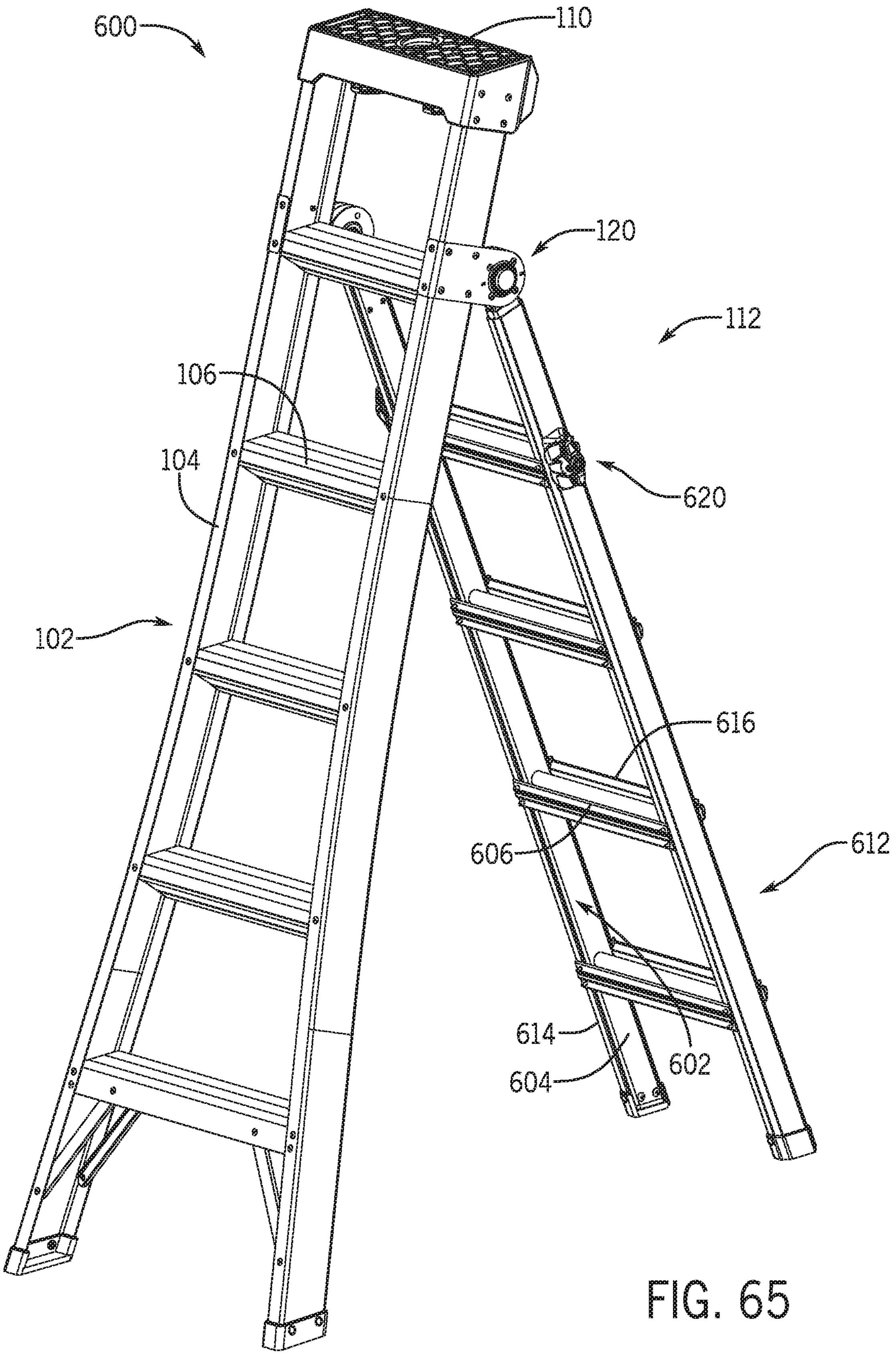
FIG. 65 is a perspective view of a ladder according to another embodiment of the present disclosure in a step ladder configuration.
Figure 66:
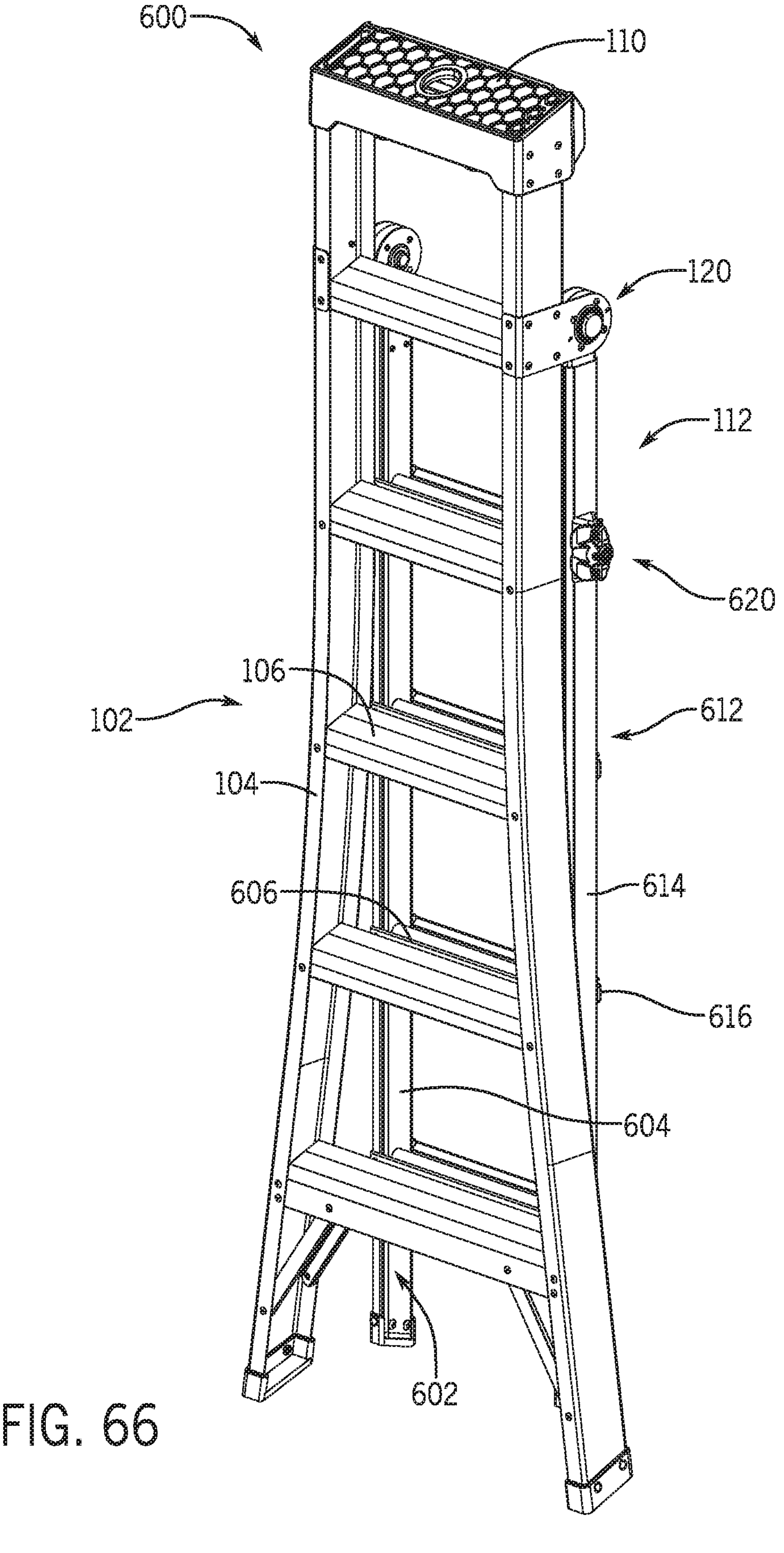
FIG. 66 is a perspective view of the ladder shown in FIG. 65 in a leaning-ladder configuration.

Referring now to FIGS. 65-68, a ladder 600 is shown according to another embodiment of the present disclosure. The ladder 600 is configured generally as described with respect to the ladder 100 described hereinabove, including a first assembly 102 coupled with a second assembly 112 by way of hinges 120. The ladder 600 may further include a top cap 110 and other features such as described hereinabove. However, the second assembly 112 may be configured with an inner rail assembly 602 having a pair of rails 604 and a plurality of rungs 606, and an outer rail assembly 612 having a pair of rails 614 and a plurality of rungs 616. The outer assembly 612 is slidably coupled with the inner rail assembly 602. Thus, the inner and outer rail assemblies 602 and 612 may be collapsed, such as shown in FIG. 65 (and FIG. 66), such that most (if not all) of the rungs 606 of the inner assembly 602 and most (if not all) of the rungs 616 of the outer assembly 612 are aligned in pairs so as to act as a single "step" when a user stands on the rungs 606 and 616.

Figure 67:
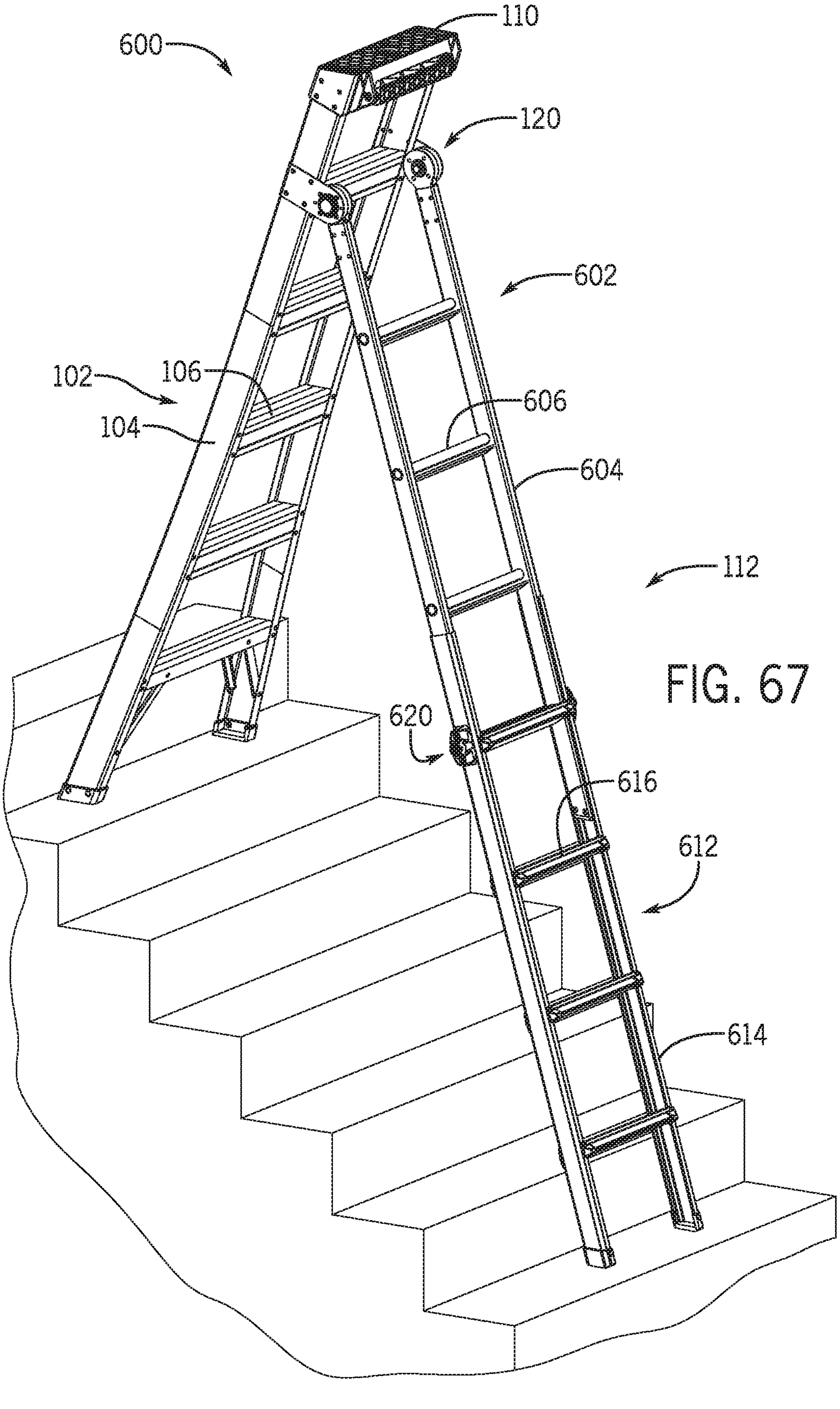
FIG. 67 is a perspective view of the ladder shown in FIG. 65 in another state with the rear assembly extended.
Figure 68:
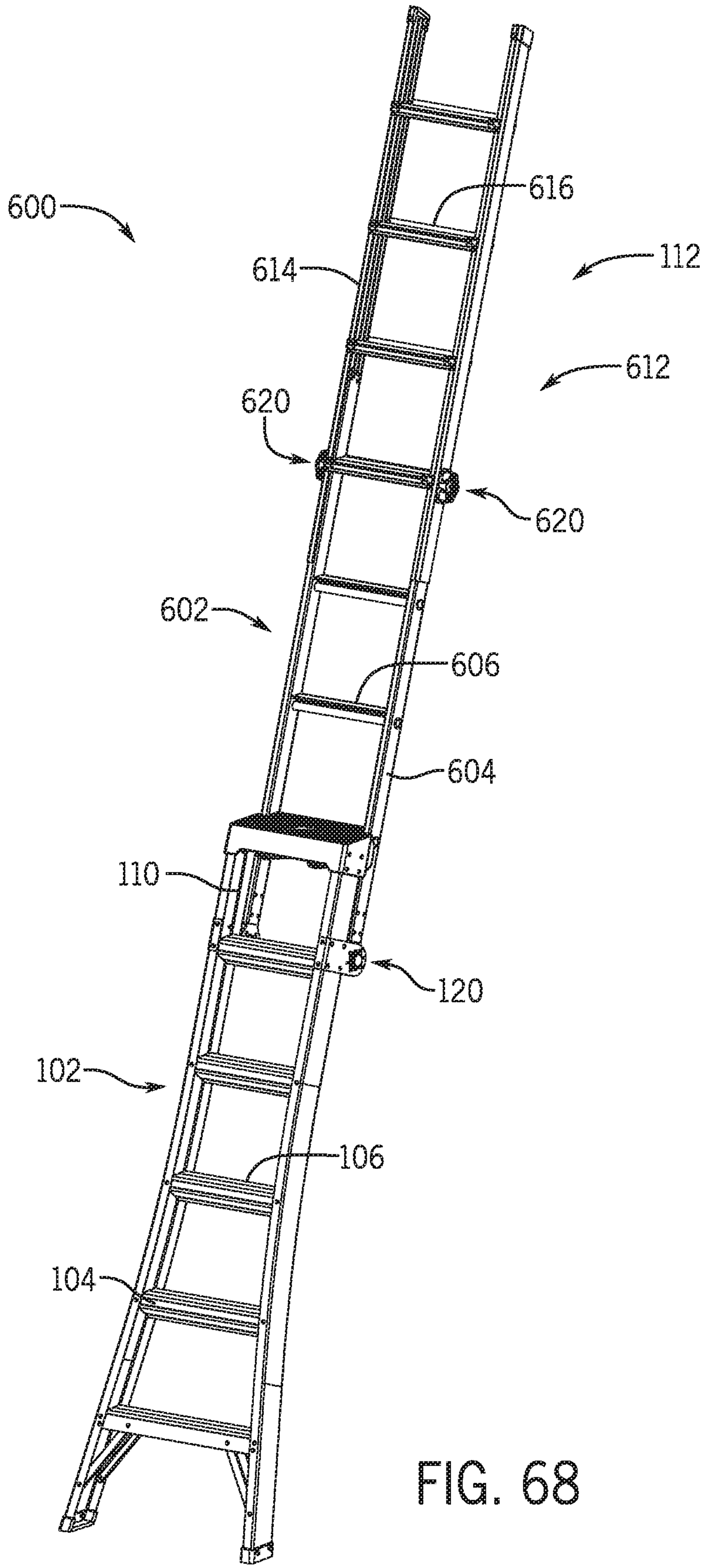
FIG. 68 is a perspective view of the ladder shown in FIG. 65 in an extended, straight-ladder configuration.

The outer assembly 612 may be extended from the inner assembly 602, such as shown in FIGS. 67 and 68 to adjust the length of the second assembly 612. For example, when in a step ladder configuration, the second assembly 612 may be extended for use on stairs or some other uneven support surface. Additionally, when in a straight ladder or extended configuration, such as shown in FIG. 68, the second assembly 602 may be extended to reach greater heights. The second assembly 612 may be adjusted to several different heights, with each height corresponding with an increment of adjustment equal to the spacing between adjacent rungs (e.g., between adjacent rungs 606 of the inner assembly 602 or between adjacent rungs 616 of the outer assembly 612).

Adjustment mechanisms 620, also referred to as locking mechanisms, may be used to selectively release the outer rail assembly 612 from the inner rail assembly 602 and to selectively lock or maintain the inner and outer rail assemblies 602 and 612 relative to each other. Examples of locking mechanisms and related inner/outer assembly configurations are described, for example, in U.S. Pat. No. 8,186,481, issued May 29, 2012, the disclosure of which is incorporated by reference herein in its entirety.

While the invention may be susceptible to various modifications and alternative forms, specific embodiments have been shown by way of example in the drawings and have been described in detail herein. However, it should be understood that the invention is not intended to be limited to the particular forms disclosed. Additionally, features, components and elements of one embodiment may be combined with features, components and elements of other embodiments without limitation. The invention includes all modifications, equivalents, and alternatives falling within the spirit and scope of the invention as defined by the following appended claims.

The invention claimed is:

1. A ladder comprising:

a first assembly comprising:

a first pair of spaced apart rails, a plurality of rungs extending between and coupled to the first pair of spaced apart rails, a second assembly comprising:

a second pair of spaced apart rails, a pair of hinges pivotally coupling the first assembly with the second assembly;

a top cap including:

a first body portion coupled with the first assembly, and a second body portion pivotally coupled with the first body portion and pivotable between a first position relative to the first body portion and a second position relative to the first body portion, the second body portion being lockable in at least the first position;

the second body portion including a substantially planar surface and at least one pair of angled engagement surfaces;

wherein when in the first position, the second body portion is angled relative to the first body portion for the substantially planar surface to engage a vertical support structure; and wherein when in the second position, the second body portion is angled relative to the first body portion for the at least one pair of angled engagement surfaces to engage a vertical support structure.

2. The ladder of claim 1, wherein the second body portion includes at least one canister.

3. The ladder of claim 2, wherein the at least one canister includes a lid hingedly coupled with a body of the at least one canister.

4. The ladder of claim 1, wherein the top cap includes a pair of channels formed in the first body portion including first channel adjacent a first side of the second body portion and a second channel adjacent a second side of the second body portion, wherein the pair of channels are configured to receive portions of the second pair of spaced apart rails when the second pair of spaced apart rails are rotated to a position such that they extend upward beyond the top cap and are substantially parallel with the first pair of spaced apart rails.

5. The ladder of claim 1, wherein the at least one pair of angled surfaces form a 90 degree interior angle.

6. The ladder of claim 1, wherein the at least one pair of angled surfaces form a 90 degree exterior angle.

7. The ladder of claim 6, wherein the second body portion further includes a second pair of angled surfaces forming a 90 degree interior angle.

8. The ladder of claim 7, wherein the second body portion further includes a channel disposed between a first protruding member and a second protruding member.

9. The ladder of claim 8, wherein the channel exhibits a width of approximately 1.5 to approximately 1.625 inches.

10. A ladder comprising:

a first assembly comprising:

a first pair of spaced apart rails, a plurality of rungs extending between and coupled to the first pair of spaced apart rails, a second assembly comprising:

a second pair of spaced apart rails, a pair of hinges pivotally coupling the first assembly with the second assembly;

a top cap including:

a first body portion coupled with the first assembly, and a second body portion coupled with the first body portion and pivotable relative to the first body portion between a first position and a second position, the second body portion having:

a first end having a substantially planar surface, and a second end having at least one pair of angled engagement surfaces, the second end being positioned on the second body portion opposite the first end;

wherein when in the first position, the second body portion presents the substantially planar surface for engagement with a vertical support structure; and wherein when in the second position, the second body portion presents the at least one pair of angled engagement surfaces for engagement with a vertical support structure.

11. The ladder of claim 10, wherein the second body portion includes at least one canister.

12. The ladder of claim 11, wherein the at least one canister includes a lid hingedly coupled with a body of the at least one canister.

13. The ladder of claim 10, wherein the top cap includes a pair of channels formed in the first body portion including first channel adjacent a first side of the second body portion and a second channel adjacent a second side of the second body portion, wherein the pair of channels are configured to receive portions of the second pair of spaced apart rails when the second pair of spaced apart rails are rotated to a position such that they extend upward beyond the top cap and are substantially parallel with the first pair of spaced apart rails.

14. The ladder of claim 10, wherein the at least one pair of angled engagement surfaces form a 90 degree interior angle.

15. The ladder of claim 10, wherein the at least one pair of angled engagement surfaces form a 90 degree exterior angle.

16. The ladder of claim 15, wherein the second body portion further includes a second pair of angled engagement surfaces forming a 90 degree interior angle.

17. The ladder of claim 10, wherein the second body portion further includes a channel disposed between angled engagement surfaces of the pair of angled engagement surfaces.

18. The ladder of claim 10, wherein the second body portion is rotatable substantially 180 degrees relative to the first body portion between the first position and the second position.

19. A ladder comprising:

a first assembly comprising:

a first pair of spaced apart rails, a plurality of rungs extending between and coupled to the first pair of spaced apart rails, a second assembly comprising:

a second pair of spaced apart rails, a pair of hinges pivotally coupling the first assembly with the second assembly;

a top cap including:

a first body portion coupled with the first assembly, and a second body portion pivotally coupled with the first body portion, the second body portion having a substantially planar surface and at least one pair of angled engagement surfaces;

wherein when in a first position, the second body portion presents the substantially planar surface for engagement with a vertical support structure and the at least one pair of angled engagement surfaces is positioned underneath the first body portion; and wherein when in a second position, the second body portion presents the at least one pair of angled engagement surfaces for engagement with a vertical support structure and the substantially planar surface is positioned underneath the first body portion.

20. The ladder of claim 19, wherein the second body portion includes at least one canister.

21. The ladder of claim 19, wherein when in the second position, the second body portion is spaced below a top surface of the first body portion.

22. The ladder of claim 19, wherein the top cap includes a pair of channels formed in the first body portion including first channel adjacent a first side of the second body portion and a second channel adjacent a second side of the second body portion, wherein the pair of channels are configured to receive portions of the second pair of spaced apart rails when the second pair of spaced apart rails are rotated to a position such that they extend upward beyond the top cap and are substantially parallel with the first pair of spaced apart rails.

23. The ladder of claim 19, wherein the at least one pair of angled engagement surfaces form a 90 degree interior angle.

24. The ladder of claim 19, wherein the at least one pair of angled engagement surfaces form a 90 degree exterior angle.

25. The ladder of claim 24, wherein the second body portion further includes a second pair of angled engagement surfaces forming a 90 degree interior angle.

26. The ladder of claim 25, wherein the second body portion further includes a channel disposed between angled engagement surfaces of the pair of angled engagement surfaces.

27. The ladder of claim 26, wherein the channel exhibits a width of approximately 1.5 to approximately 1.625 inches.

* * * * *